(12) United States Patent
Fiumara et al.

(10) Patent No.: US 11,995,729 B2
(45) Date of Patent: May 28, 2024

(54) OPERATIONS PLATFORM FOR MANAGING SERVICES AT A PROPERTY

(71) Applicant: OPTX Solutions, LLC, Las Vegas, NV (US)

(72) Inventors: Ashley Brooke Fiumara, Las Vegas, NV (US); Thomas Rafferty, Las Vegas, NV (US); Rukmangada Reddy Rupanagudi, Pleasanton, CA (US); Michael Roy Hartwig, Las Vegas, NV (US)

(73) Assignee: OPTX SOLUTIONS, LLC, Las Vegas, NV (US)

( * ) Notice: Subject to any disclaimer, the term of this patent is extended or adjusted under 35 U.S.C. 154(b) by 129 days.

(21) Appl. No.: 17/364,181

(22) Filed: Jun. 30, 2021

(65) Prior Publication Data
US 2023/0004984 A1    Jan. 5, 2023

(51) Int. Cl.
  *G06Q 30/01*    (2023.01)
  *G06Q 30/0226*  (2023.01)
  *G06Q 50/163*   (2024.01)
  *G06Q 50/16*    (2012.01)

(52) U.S. Cl.
  CPC .......... *G06Q 50/163* (2013.01); *G06Q 30/01* (2013.01); *G06Q 30/0226* (2013.01)

(58) Field of Classification Search
  CPC .. G06Q 30/016; G06Q 30/01; G06Q 30/0201; G06Q 30/0226; G06Q 50/163; G06Q 50/12; G06F 3/04842; G06F 9/451; G07F 17/3232; G07F 17/32; G07F 17/3234; G07F 17/3239; G07F 17/3255
  USPC .......................................................... 705/304
  See application file for complete search history.

(56) References Cited

U.S. PATENT DOCUMENTS

| | | | |
|---|---|---|---|
| 5,819,231 A | 10/1998 | Tremaine | |
| 10,672,229 B2 * | 6/2020 | Guinn | G07F 17/3239 |
| 2002/0152120 A1* | 10/2002 | Howington | G06Q 30/0224 |
| | | | 902/23 |
| 2002/0187834 A1* | 12/2002 | Rowe | G06Q 30/0209 |
| | | | 463/42 |
| 2004/0068441 A1* | 4/2004 | Werbitt | G06Q 30/0281 |
| | | | 705/16 |
| 2005/0039061 A1 | 2/2005 | Schultz et al. | |

(Continued)

OTHER PUBLICATIONS

Hsiao, Tsung-Chih, et al. "Application of casino management on cloud platform." 2016 International Conference on Applied System Innovation (ICASI). IEEE, 2016. (Year: 2016).*

(Continued)

*Primary Examiner* — John S. Wasaff
(74) *Attorney, Agent, or Firm* — BakerHostetler

(57) ABSTRACT

Data associated a plurality of user interface elements may be retrieved from at least one database associated with a service business, such as a casino. At a first time, a first indication to turn on a first subset of the plurality of user interface elements may be received. The user interface elements may include content management, task management, property management, action management, player profiling, comp management, player development, asset tagging and flagging, profitability and comparative analysis, etc. Each of the first subset of user interface elements may be populated with the respective data associated that user interface element.

18 Claims, 67 Drawing Sheets

(56) References Cited

U.S. PATENT DOCUMENTS

| | | | | |
|---|---|---|---|---|
| 2005/0059480 | A1* | 3/2005 | Soukup | G07F 17/32 463/25 |
| 2005/0182647 | A1* | 8/2005 | Saenz | G06Q 30/016 705/14.66 |
| 2006/0252530 | A1* | 11/2006 | Oberberger | G07F 17/3239 463/29 |
| 2007/0066364 | A1* | 3/2007 | Gil | H04M 1/72445 455/566 |
| 2007/0118813 | A1* | 5/2007 | Forstall | G06F 3/0488 715/762 |
| 2007/0155490 | A1* | 7/2007 | Phillips | G07F 17/32 463/29 |
| 2007/0260513 | A1 | 11/2007 | Pavlov | |
| 2008/0261699 | A1* | 10/2008 | Topham | G07F 17/32 463/42 |
| 2009/0172035 | A1* | 7/2009 | Lessing | G06Q 30/02 |
| 2010/0100430 | A1* | 4/2010 | Koerner | G06Q 50/34 705/14.12 |
| 2010/0223572 | A1 | 9/2010 | Upadhyaya et al. | |
| 2011/0183732 | A1* | 7/2011 | Block | G06Q 50/34 463/1 |
| 2013/0084972 | A1* | 4/2013 | Frady | G07F 17/3232 463/29 |
| 2014/0040763 | A1* | 2/2014 | Chakra | G06F 3/0482 715/748 |
| 2014/0370989 | A1* | 12/2014 | Acres | G07F 17/3234 463/42 |
| 2015/0310380 | A1* | 10/2015 | Acres | G06Q 30/016 705/7.16 |
| 2016/0019272 | A1* | 1/2016 | Liu | G06F 16/254 707/756 |
| 2016/0246490 | A1* | 8/2016 | Cabral | G06F 9/451 |
| 2017/0053487 | A1* | 2/2017 | Takeda | G07F 17/3241 |
| 2017/0097742 | A1* | 4/2017 | Kim | G06F 9/451 |
| 2017/0186270 | A1* | 6/2017 | Acres | G07F 17/3272 |
| 2018/0053194 | A1* | 2/2018 | Bond | G07F 17/3223 |
| 2018/0122188 | A1* | 5/2018 | Colvin | G07F 17/3234 |
| 2020/0363939 | A1* | 11/2020 | Fitzgerald | G06F 3/04845 |

OTHER PUBLICATIONS

"The Future of Casinos." https://www.tibco.com/blog/2018/01/17/the-future-of-casinos/. (Year: 2018).*

Ojala, A., & Tyrvainen, P. (2011). Developing cloud business models: A case study on cloud gaming. IEEE software, 28(4), 42-47. (Year: 2011).*

International Patent Application No. PCT/US2022/035023; Int'l Search Report and the Written Opinion; dated Nov. 3, 2022; 12 pages.

\* cited by examiner

Home / View / FLOOR MONITOR

FLOOR MONITOR

| Actions | Tags ⓘ | Guest ID | Guest Name | Tier | Market | Game Type |
|---|---|---|---|---|---|---|
| ☐ ⋯ | ⌸ | 254786 | Mark Twomey | Onyx | Inner | Slot |
| ☐ ⋯ | ⌸ ▽ | 148850 | Ernestine Toles | Onyx | Inner | Slot |
| ☐ ⋯ | ⌸ | 104152 | Lillian Smyth | Onyx | Inner | Slot |
| ☐ ⋯ | ⊞ | 142153 | Michael Holtzman | Onyx | Inner | Slot |
| ☐ ⋯ | ⌸ ▽ | 126330 | Charles Hoffman | Onyx | Inner | Slot |
| ☐ ⋯ | ⌸ | 134959 | Patricia Hintze | Onyx | Inner | Slot |
| ☐ ⋯ | ⌸ | 120576 | Kirk Carter | Onyx | Inner | Slot |
| ☐ ⋯ | ⌸ ◇ | 121626 | Lloyd Sanchez | Blaze | Inner | Slot |
| ☐ ⋯ | ⌸ | 148834 | Sylvia Rourke | Blaze | Inner | Slot |
| ☐ ⋯ | ⌸ | 117598 | Nancy Nguyen | Blaze | Inner | Slot |
| ☐ ⋯ | ⌸ | 145682 | Charles Newman | Blaze | Inner | Slot |
| ☐ ⋯ | ⌸ ▽ | 120427 | Carol Lachance | Blaze | Inner | Slot |

FIG. 5

62 48.4% CARDED || 66 51.6% UNCARDED || 128 TOTAL

| Denom/ Avg. Bet | Location | Current Day Theo | Current Day Actual Win | 90 Day Theo | 90 Day Actual Win |
|---|---|---|---|---|---|
| 0.01 | F-210-1 | $0 | $0 | $6,749 | $5,308 |
| 0.01 | E-220-6 | $88 | ($836) | $5,874 | $3,883 |
| 0.01 | A-20-4 | $0 | $0 | $2,120 | $2,414 |
| 0.01 | C-112-3 | $458 | $1,202 | $6,959 | $5,696 |
| 0.01 | C-108-2 | $16 | $100 | $10,064 | $7,822 |
| 0.01 | E-182-2 | $2 | ($3) | $3,703 | $2,343 |
| 0.01 | D-134-2 | $40 | ($392) | $711 | ($429) |
| 0.01 | C-102-1 | $83 | $199 | $2,242 | $1,188 |
| 0.01 | D-135-1 | $0 | $0 | $4,231 | $5,361 |
| 0.01 | B-84-1 | $11 | $40 | $4,507 | $3,849 |
| 0.01 | C-100-3 | $20 | ($254) | $11,832 | $15,330 |
| 0.01 | C-108-3 | $31 | $15 | $12,468 | $9,920 |

FIG. 5 (Continued)

MANAGE GAMING COLUMNS LIBRARY

Select Column Time Frames: Drag and drop the column names to reorganize how your columns will display within the table.

Set All Dates To: [Select Timeframe ▾]

1. [Total Theo]

[Select Timeframe ◂ ▸]
- MTD
- QTD
- YTD
- LTD
- L7 Days
- L30 Days
- L60 Days

[Back]    [Done]

| Blaze | Inner | Slot | 8-3 | $31 | $15 | $12,468 | $9,920 |

TAG LEGEND

- Anniversary
  This is the Guest's sign up anniversary month!

- Birthday
  This is the Guest's birthday month!

- Declining Player
  Player has a significant short term decline relative to their own play. A Tagged player has a high probability of being a long term decliner.

- High Priority Note
  Guest has a high priority note assigned to them.

- High Worth Low Frequency
  9 or less average visits in the past 90 days, and ADT value of $250+.

- Host Code Qualified
  Guest is qualified for coding.

- Hot Player
  Guest's current day is $500+ theo or actual.

- Inclining Player
  Player has a significant short term incline relative to their own play. A Tagged player has a high probability of being a long term incliner.

- Multiple Tags
  This guest has more than 2 tags, hover to view them all.

- Needs Host Contact
  No assigned host contact within the past 30 days.

- On Fire
  Guest's current day theo or actual exceeds their last 12 play days average by 30% or more. Must have 12 previous play days.

- Recently Signed Up Guest
  Signed up within the current month.

- Top 100 Player
  Guest's total theo or actual in the past 30 days ranks in the Top 100 of property players.

| Actions | Tags ⓘ | Guest ID | Guest Name | Tier |
|---|---|---|---|---|
| ☑ ⋯ | | 115787 | Sherry Brown | Gold |
| ☑ ⋯ | + | 142153 | Michael Holtzman | Onyx |
| ☑ ⋯ | ⌛ | 254786 | Mark Twomey | Onyx |
| ☑ ⋯ | | 114819 | Mary Shah | Teal |
| ☐ ⋯ | + | 317241 | Ella Williams | Gold |
| ☐ ⋯ | + | 274776 | Lori Merrill | Teal |
| ☐ ⋯ | 👍 | 134638 | Mildred Hudson | Gold |
| ☐ ⋯ | + | 184308 | James Johnson | Teal |
| ☐ ⋯ | 🎁 | 151226 | Doris Henley | Teal |
| ☐ ⋯ | | 240413 | Gary Warr | Teal |
| ☐ ⋯ | 👍 | 122927 | Michael Morales | Teal |

902 →

| Actions | Tags ⓘ | Guest ID | Guest Name | Tier |
|---|---|---|---|---|
| 👆 Unselect All<br>Select All<br>Text 4 Guests<br>Call 4 Guests<br>Email 4 Guests | | 115787 | Sherry Brown | Gold |
| | | 142153 | Michael Holtzman | Onyx |
| | | 254786 | Mark Twomey | Onyx |
| ☑ | | 114819 | Mary Shah | Teal |
| ☐ | + | 317241 | Ella Williams | Gold |
| ☐ | + | 274776 | Lori Merrill | Teal |
| ☐ | 👍 | 134638 | Mildred Hudson | Gold |
| ☐ | + | 184308 | James Johnson | Teal |
| ☐ | 🎁 | 151226 | Doris Henley | Teal |
| ☐ | | 240413 | Gary Warr | Teal |
| ☐ | 👍 | 122927 | Michael Morales | Teal |

Home / GUEST PROFILE — 1202

Brian Mills ⚙
Account: 120349

1210

CONTACT INFORMATION

| | |
|---|---|
| Address | 310 E 11Th St |
| City | South Sioux City |
| State | NE |
| Zip Code | 687762316 |
| Mobile | |
| Home | (213) 536-9863 |
| Email | brooke@optx.com |

GENERAL INFORMATION — 1204

| | |
|---|---|
| Gender | Male |
| Birthday | Dec 16, 1962 |
| Member Since | Aug 02, 2014 |
| Traits | Team Member |
| Host | Lyle Stevens |
| Market | Inner |
| Last Contact | Feb 02, 2021 |
| | Mar 02, 2021 (1 Day) |
| Last Play | Mar 01, 2021 (1 Day) |
| | Feb 26, 2021 (3 Days) |

1220 ABOUT | 1222 OFFERS | 1224 CONTACTS | 1226 TRENDS | 1228 P&L | 1230 SURVEY

Add  Reset

SUMMARY

PLAY DETAIL — 1218

Time frame: [Select time frame]

| Date Range | Play Days | Slot Theo | Slot Actual | Table Theo | Table Actual |
|---|---|---|---|---|---|
| ⊞ L30 Days | 4 | $673 | $668 | $0 | $0 |
| ⊞ L60 Days | 13 | $1,080 | $1,098 | $0 | $0 |

Brian Mills
Account: 120349

CONTACT

Address
City
State
Zip Code
Mobile
Home
Email

MANAGE NOTIFICATIONS

| Notification Type | OPTX |
|---|---|
| Rolling 30 vs. Previous 30 >= 30% Theo Decline | ○ |
| Rolling 90 vs. Previous 90 >= 30% Theo Decline | ○ |
| Rolling 180 vs. Previous 180 >= 30% Theo Decline | ○ |
| Rolling 12 Months vs. Previous 12 Months >= 30% Theo Decline | ○ |
| Rolling 90 vs. Previous 90 >= 30% Visits Decline | ○ |
| Rolling 180 vs. Previous 180 >= 30% Visits Decline | ○ |
| Initial Card-in of the day | ○ |
| On Fire-Current Day Theo Exceeding Last 12 Visits | ○ |
| Hit a taxable jackpot | ○ |

[Save]

PLAY DETAIL
Time frame: [Select]

SUMMARY

| Date Range | Play Days | Slot Theo | Slot Actual | Table Theo | Table Actual |
|---|---|---|---|---|---|
| ⊕ L30 Days | 4 | $673 | $668 | $0 | $0 |
| ⊕ L60 Days | 13 | $1,080 | $1,098 | $0 | $0 |

| PLAY DETAIL | ABOUT | OFFERS | CONTACTS | TRENDS | P&L | SURVEY | NOTES | TRANSACTIONS | | | | | Refresh |
|---|---|---|---|---|---|---|---|---|---|---|---|---|---|
| Time frame: | Select time frame | | Add | Reset | | | | | | | Time frames | Trips | |

SUMMARY

| Date Range | Play Days | Slot Theo | Slot Actual | Table Theo | Table Actual | Total Theo | Total Actual | ADT | ADW | Comps | FSP C |
|---|---|---|---|---|---|---|---|---|---|---|---|
| ⊞ L30 Days | 4 | $673 | $668 | $0 | $0 | $673 | $668 | $168 | $168 | $46 | $31 |
| ⊞ L60 Days | 13 | $1,080 | $1,098 | $0 | $0 | $1,080 | $1,098 | $83 | $83 | $75 | $159 |
| ⊞ L90 Days | 25 | $1,773 | $1,413 | $0 | $0 | $1,773 | $1,413 | $71 | $71 | $162 | $314 |
| ⊞ L180 Days | 57 | $7,028 | $6,892 | $0 | $0 | $7,028 | $6,892 | $123 | $123 | $386 | $2,221 |
| ⊞ Last 12 months | 73 | $14,343 | $8,214 | $0 | $0 | $14,343 | $8,214 | $196 | $196 | $608 | $3,384 |

1502

| PLAY DETAIL | ABOUT | OFFERS | CONTACTS | TRENDS | P&L | SURVEY | NOTES | TRANSACTIONS | | | | | Refresh |
|---|---|---|---|---|---|---|---|---|---|---|---|---|---|
| Trips: | 1 | | Add | Reset | | | | | | | Time frames | Trips | |

SUMMARY

| Date Range | Play Days | Slot Theo | Slot Actual | Table Theo | Table Actual | Total Theo | Total Actual | ADT | ADW | Comps | FSP C |
|---|---|---|---|---|---|---|---|---|---|---|---|
| ⊞ MTD | 2 | $618 | $416 | $0 | $0 | $618 | $416 | $309 | $309 | $0 | $21 |
| ⊞ QTD | 14 | $1,134 | $1,083 | $0 | $0 | $1,134 | $1,083 | $81 | $81 | $102 | $176 |
| ⊞ YTD | 14 | $1,134 | $1,083 | $0 | $0 | $1,134 | $1,083 | $81 | $81 | $102 | $176 |
| ⊞ Feb 26, 2021 - Mar 02, 2021 | 3 | $637 | $475 | $0 | $0 | $637 | $475 | $212 | $212 | $0 | $26 |
| Feb 18, 2021 - Feb 20, 2021 | 0 | $0 | $0 | $0 | $0 | $0 | $0 | $0 | $0 | $0 | $0 |
| Feb 11, 2021 - Feb 14, 2021 | 0 | $0 | $0 | $0 | $0 | $0 | $0 | $0 | $0 | $0 | $0 |

FIG. 15

| PLAY DETAIL | ABOUT | OFFERS | CONTACTS | TRENDS | P&L | SURVEY | NOTES | TRANSACTIONS | | | | | | Refresh |
|---|---|---|---|---|---|---|---|---|---|---|---|---|---|---|
| Trips: 1 | | | Add | Reset | | | | | | | | Time frames | Trips | |

SUMMARY

| Date Range | Play Days | Slot Theo | Slot Actual | Table Theo | Table Actual | Total Theo | Total Actual | ADT | ADW | Comps | FSP C |
|---|---|---|---|---|---|---|---|---|---|---|---|
| – MTD | 2 | $618 | $416 | $0 | $0 | $618 | $416 | $309 | $309 | $0 | $21 |
| – March 2021 | 2 | $618 | $416 | $0 | $0 | $618 | $416 | $309 | $81 | $0 | $21 |
| – Mar 02, 2021 | 1 | $116 | $19 | $0 | $0 | $116 | $19 | $116 | $81 | $0 | $0 |

| Location | Game Theme | Time In | Time Out | Session Duration | Slot Theo | Slot Actual | Table Theo | Table Actual |
|---|---|---|---|---|---|---|---|---|
| 01 C- 90- 4 | FORTUNE RULER DA SHEN DAO | 02:13am ⇨ | 02:18am | 5m 12s | $6 | $20 | | |
| 01 A- 34- 2 | CHILI CHILI FIRE | 02:19am | 02:24am | 4m 54s | $6 | $20 | | |
| 01 D- 137- 1 | BUFFALO GOLD | 02:24am | 02:59am | 34m 59s | $62 | $135 | | |
| 01 A- 2- 4 | BUFFALO GRAND | 03:06am | 03:40am | 33m 38s | $42 | ($157) | | |

| Date Range | Play Days | Slot Theo | Slot Actual | Table Theo | Table Actual | Total Theo | Total Actual | ADT | ADW | Comps | FSP C |
|---|---|---|---|---|---|---|---|---|---|---|---|
| + Mar 01, 2021 | 1 | $501 | $397 | $0 | $0 | $501 | $397 | $501 | $501 | $0 | $21 |
| + QTD | 14 | $1,134 | $1,083 | $0 | $0 | $1,134 | $1,083 | $81 | $81 | $102 | $176 |
| + YTD | 14 | $1,134 | $1,083 | $0 | $0 | $1,134 | $1,083 | $81 | $81 | $102 | $176 |
| + Feb 26, 2021 - Mar 02, 2021 | 3 | $637 | $475 | $0 | $0 | $637 | $475 | $212 | $212 | $0 | $26 |

| TRANSACTIONS | | | | | Refresh |
|---|---|---|---|---|---|
| | | Time frames | Trips | ☆ | |

| Total Theo | Total Actual | ADT | ADW | Con... | Manage Columns<br>Unhide Columns<br>Save View<br>Select View<br>Reset to Default View<br>Manage Views |
|---|---|---|---|---|---|
| $141 | ($48) | $35 | $35 | | |
| $1,351 | $949 | $104 | $104 | | |
| $2,184 | $2,163 | $81 | $81 | $103 | $679 |
| $9,898 | $8,229 | $146 | $146 | $456 | $2,561 |
| $25,458 | $23,476 | $196 | $196 | $736 | $4,068 |

1701

1702

MANAGE COLUMNS

Select Columns to display within the table.

1. Play Days
2. Slot Theo
3. Slot Actual
4. Table Theo
5. Table Actual

[Next] — 1703

1704

MANAGE COLUMNS

Drag and drop the column names to reorganize how your columns will display within the table.

1. Total Theo
2. Table Actual
3. ADT
4. ADW
5. Comps

[Back] [Done] — 1705

| PLAY DETAIL | ABOUT | OFFERS | CONTACTS | TRENDS | P&L | SURVEY | NOTES | TRANSACTIONS | | Refresh |
|---|---|---|---|---|---|---|---|---|---|---|
| OFFERS |||||||||||
| Status | Description | | | Amount | | Offer Start Date | | Offer End Date | | Date Redeemed |
| Expired | DC1120.IXGX.7 | | | $20 | | Nov 23, 2020 | | Nov 26, 2020 | | |
| Redeemed | Prize is Right Kiosk Game | | | $25 | | Nov 22, 2020 | | Nov 22, 2020 | | Nov 23, 2020 |
| Expired | DC1120.IXGX.6 | | | $20 | | Nov 20, 2020 | | Nov 22, 2020 | | |
| Expired | DC1120.IXGX.5 | | | $20 | | Nov 16, 2020 | | Nov 19, 2020 | | |
| Redeemed | $50,000 November to Remember - Tier Multiplier | | | $0 | | Nov 15, 2020 | | Nov 15, 2020 | | Nov 15, 2020 |

FIG. 20

| PLAY DETAIL | ABOUT | OFFERS | CONTACTS | TRENDS | P&L | SURVEY | NOTES | TRANSACTIONS | | | Refresh |
|---|---|---|---|---|---|---|---|---|---|---|---|
| | | | 2106 | 2108 | | CONTACTS | | | | | 🔍 ➕ |
| Verified | Method | Priority | Subject | Type | Contact Date | Logged By | Note | | | | Action |
| 2102 | 2104 | Low | Comp | Text | Jan 26, 2021 | rrupanagudi | Comp offer | | | | ☐ |
| | | Low | General | Text | Jan 26, 2021 | admin-dev | No Note | | | | ☐ |
| | | Low | General | Text | Jan 22, 2021 | admin-dev | No Note | | | | ☐ |
| | | Low | General | Text | Jan 22, 2021 | admin-dev | No Note | | | | ☐ |
| | | Low | General | Text | Jan 21, 2021 | admin-dev | a message with note | | | | ☐ |
| | | Low | General | Text | Jan 21, 2021 | admin-dev | No Note | | | | ☐ |
| | | Low | General | Text | Jan 21, 2021 | admin-dev | No Note | | | | ☐ |
| | | Low | General | Text | Jan 21, 2021 | admin-dev | No Note | | | | ☐ |
| | | Low | General | Text | Jan 21, 2021 | admin-dev | sms from floor view | | | | ☐ |
| | | Low | General | Text | Jan 21, 2021 | admin-dev | No Note | | | | ☐ |

| PLAY DETAIL | ABOUT | OFFERS | CONTACTS | TRENDS | P&L | SURVEY | NOTES | TRANSACTIONS | | Refresh |
|---|---|---|---|---|---|---|---|---|---|---|
| Time frame: Last 12 Months ▾ Run | | | | | | Dates: Mar 01, 2020 - Feb 28, 2021 | | | | 73 Play Days |

| SLOT STATISTICS | |
|---|---|
| Type | Value |
| Days | 73 |
| Coin-in | $106,680 |
| Points Earned | 35,351 |
| Jackpots | $3,821 (2 jackpots) |
| Time Played | 11hr. 48min. 26sec. |

| TABLES STATISTICS | |
|---|---|
| Type | Value |
| Days | 0 |
| Cash Drop | $0 |
| Avg. Bet | 0 |
| Time Played | |

| DAILY AVERAGES | | |
|---|---|---|
| Type | Avg. Daily Theo | Avg. Daily Actual |
| Slot | $196 | $113 |
| Table | $0 | $0 |
| Total | $196 | $113 |

| P&L | | |
|---|---|---|
| Revenue | Theo | Actual |
| ⊞ Slot | $14,343 | $11,598 |
| Table | $0 | $0 |
| Race and Sports | $0 | $0 |
| Online | $0 | $0 |
| Keno | $0 | $0 |
| Bingo | $0 | $0 |
| F&B | $0 | $0 |
| Hotel | $0 | $0 |
| Others | $0 | $0 |
| Total | $14,343 | $11,598 |
| Actual Redeemed Expenses | Theo | Actual |
| ⊞ Free Slot Play | $3,384 | $3,384 |
| Promotions | $0 | $0 |

FIG. 23a (Continued)

| Actual Redeemed Expenses | Theo | Actual |
|---|---|---|
| ⊞ Free Slot Play | $3,384 | $3,384 |
| Promotions | $0 | $0 |
| ⊞ Other Points | $3 | $3 |
| ⊞ F&B Coupons | $5 | $5 |
| Other | $0 | $0 |
| ⊞ Gifts | $340 | $340 |
| Entertainment | $0 | $0 |
| Hotel | $0 | $0 |
| ⊞ Discretionary Comps | $608 | $608 |
| ⊞ Gaming Tax | $4,016 | $3,247 |
| Logged Expenses | $0 | $0 |
| Subtotal | $8,355 | $7,587 |

| | Theo | Actual |
|---|---|---|
| Profit | | |
| Total | $5,988 | $4,011 |
| Margin | 42% | 35% |
| Reinvestment | 58% | 65% |
| Indirect Expenses Awarded | Value | |
| ⊞ Drawing FSP | $560 | |
| Drawing Cash | $0 | |
| Other | $0 | |
| Logged Expenses | $0 | |
| Total Indirect Expenses Awarded | $560 | |

FIG. 23b (Continued)

| PLAY DETAIL | ABOUT | OFFERS | CONTACTS | TRENDS | P&L | SURVEY | NOTES | TRANSACTIONS | | Refresh |
|---|---|---|---|---|---|---|---|---|---|---|

2400

| SURVEY SCORE: 61.54 | | SURVEY SCORE: 65 | | SURVEY SCORE: 82.22 | |
|---|---|---|---|---|---|
| Date Taken: | Jul 21, 2020 | Date Taken: | Apr 10, 2019 | Date Taken: | Oct 05, 2018 |
| Response: | None | Response: | View | Response: | None |
| Full Survey: | 1. Approximate time of visit?<br>3 pm - 7 pm    0<br>2. Bartender Courtesy and Friendliness<br>Good    80<br>3. I feel the property was appropriately prepared for my arrival<br>Somewhat Agree    80<br>4. Efficient and Prompt Service of Slot Attendants    60 | Full Survey: | 1. Efficiency and Prompt Service of Slot Attendants<br>Average    60<br>2. I will return to this casino<br>Good    80<br>3. Approximate time to visit?<br>7 pm - 11 pm    0<br>4. Did you visit the Rock Shop?<br>No    0<br>5. Variety of games    60 | Full Survey: | 1. Courtesy and Friendliness of Slot Attendants<br>Good    80<br>2. Did you stay at the Hard Rock Hotel?<br>No    0<br>3. Efficient and Prompt Service of Slot Attendants<br>Average    60<br>4. Overall positive experience<br>Good    80 |

FIG. 24

| PLAY DETAIL | ABOUT | OFFERS | CONTACTS | TRENDS | P&L | SURVEY | NOTES | TRANSACTIONS | | Refresh |
|---|---|---|---|---|---|---|---|---|---|---|

NOTES

| Priority ⬍ | Source ⬍ | Subject ⬍ | Type ⬍ | Logged On ⬍ | Logged By ⬍ | Note |
|---|---|---|---|---|---|---|
| Low | OASIS | General | Global | Sep 22, 2016 | System User | 20160922 $150 M&A TP |

CREATE NOTE — 2502

* Priority:  Low ──○── Medium ──●── High

* Subject: [General] [Comp]

* Type: [Global] [Management] [Personal]

* Note: [Note    I    ]

0 of 400

[Cancel] [Save]

FIG. 25

PLAY DETAIL   ABOUT   OFFERS   CONTACTS   TRENDS   P&L   SURVEY   NOTES   TRANSACTIONS

Refresh

TRANSACTIONS

| Date | Team Member | Type | Amount | Reason |
|---|---|---|---|---|
| Feb 19, 2021 8:18 AM | oaadmin oaadmin | MULTIPLIER | $3.31 | Tier Point Multiplied |
| Feb 04, 2021 6:33 PM | Lyle Stevens | COMP | $29.00 | food/drink comp |
| Jan 27, 2021 8:07 AM | oaadmin oaadmin | POINT | $3.60 | Mystery Point Multip |
| Jan 16, 2021 5:06 PM | Lyle Stevens | COMP | $28.00 | Food/bev comp |
| Jan 01, 2021 6:35 PM | Lyle Stevens | COMP | $30.00 | food/drink comp |
| Dec 26, 2020 5:10 PM | Lyle Stevens | COMP | $30.00 | food/drink comp |
| Dec 08, 2020 5:33 PM | Lyle Stevens | COMP | $30.00 | 12082017 - Food/drink comp |
| Dec 04, 2020 1:00 AM | System Adjustment | COMP | $-12.96 | 72 Hour Comp Adjustment |
| Oct 30, 2020 7:23 PM | Hannah Swanson | COMP | $40.00 | LY; FB; OP 10302074 |
| Oct 20, 2020 6:29 PM | Lyle Stevens | COMP | $30.00 | 10202011 - Food/bev comp |

LOG A CONTACT ☒

| Priority | Low ─────○───── Medium ─────○───── High |
|---|---|
| Subject: | [General] [Survey] [Comp] |
| Type: | [Text ▾] |
| *Notes: | [                    ] |

0 of 400

[Cancel] [Save]

2702 →

REQUEST CODE ☒

Select a code type for your request

[P code] [A code]

Note to Manager (optional)

[Message here...]

[Cancel] [OK]

FIG. 27

| COMP ASSIST | | | LOG EXPENSE | |
|---|---|---|---|---|
| Brian Mills - 120349 Inner | | View Historical Comps | | View Play Detail |

90 DAY COMP EVALUATION

| | Theo | Actual | Comps Redeemed & Queue ⓘ: | $169.85 |
|---|---|---|---|---|
| Slots | $1,773 | $1,413 | Days played: | 25 |
| Tables | $0 | $0 | ADW: | $71 |
| Total | $1,773 | $1,413 | ADT: | $71 |

COMPS IN THE QUEUE
$7.71

AVAILABLE POINT VALUE
$2

GUIDANCE

$22    | General ▽ |    □ — 2804
Availability    Type       Amount to Issue

[Proceed with Comp]

| COMP ASSIST | LOG EXPENSE | ☒ |

Brian Mills - 120349  
Inner

View Historical Comps    View Play Detail

90 DAY COMP EVALUATION

|  | Theo | Actual |
|---|---|---|
| Slots | $1,773 | $1413 |
| Tables |  |  |
| Total |  |  |

Comps Redeemed & Queue ⓘ:   $169.85  
Days played:   25  
$71  
$71

COMPS IN ... POINT VALUE  
$ ... 2

ⓘ Comp Exception Alert!  
The comp value entered exceeds the recommended guidance. What would you like to do?

[ Edit ] [ Proceed ] — 2604

$22 Availability   | General ▽ |   $ 30  
            Type           Amount to Issue

[ Proceed with Comp ]

Mar 03, 2021 at 11:20 AM

2902

| COMP ASSIST | LOG EXPENSE | ☒ |

Brian Mills - 120349  
Inner

View Historical Comps    View Play Detail

90 DAY COMP EVALUATION

|  | Theo | Actual |
|---|---|---|
| Slots | $1,773 | $1,413 |
| Tables |  |  |
| Total |  |  |

Comps Redeemed & Queue ⓘ:   $169.85  
Days played:   25  
$71  
$71

COMPS I ... POINT VALUE  
$2

Reason:

[ Note content goes here    © ]

0 to 150

[ Cancel ] [ Proceed ]

$22 Availability   | General ▽ |   $ 30  
            Type           Amount to Issue

[ Proceed with Comp ]

COMP ASSIST

Kyla Riley - 182300
Inner

90 DAY COMP EVALUATION

| | Theo | Actual | Comps Redeemed & Queue ⓘ: | $1 |
|---|---|---|---|---|
| Slots | $151 | ($4,347) | Days played: | 1 |
| Tables | $0 | $0 | ADW: | $151 |
| Total | $151 | ($4,347) | ADT: | $151 |

COMPS IN THE QUEUE $1

AVAILABLE POINT VALUE $37

GUIDANCE

| General ∨ | $35 |
|---|---|
| Type | Amount issued |

$0
Availability

Home / Manage / COMP REVIEW

All Comps    Exceptions    Trends

ALL EXCEPTIONS  ˅

| Exception | Status | Comp Date | Guest ID | Name | Issuer | Source Comp Amount |
|---|---|---|---|---|---|---|
| ... | Open | Feb 25, 2021 | 129535 | Fitzsimmons, Paul | Logan Lovsmith | $15 |
| ... | Open | Feb 25, 2021 | 180139 | Rorie, Dorothy | Hannah Swanson | $25 |
| ... | Open | Feb 24, 2021 | 318669 | Stumbaugh, Chris | Logan Lovsmith | $99 |

Home / Manage / COMP REVIEW
All Comps    Exceptions    Trends    ˅

COMP TREND REPORT FOR THE FULL DAYS OF EACH MONTH AS OF FEBRUARY 2021

REVENUE AND ISSUED EXPENSE

|  | Mar | Apr | May | Jun | Jul | Aug | Sep |
|---|---|---|---|---|---|---|---|
| RATED THEO REVENUE | | | | | | | |
| Mar 2020 - Feb 2021 | $1,796,183 | $0 | $0 | $2,983,918 | $5,498,193 | $6,786,959 | $6,418,885 |
| Mar 2019 - Feb 2020 | $3,883,448 | $3,419,379 | $3,443,262 | $3,229,525 | $3,323,773 | $3,396,089 | $3,187,600 |
| Variance | ($2,087,266) | ($3,419,379) | ($3,443,262) | ($245,608) | $2,174,420 | $3,390,870 | $3,231,285 |
| Variance % | (53.8%) | (100%) | (100%) | (7.6%) | 65.4% | 99.9% | 101.4% |
| COMP EXPENSE | | | | | | | |
| Mar 2020 - Feb 2021 | $41,069 | $5,057 | $40 | $28,745 | $44,377 | $53,782 | $70,517 |
| Mar 2019 - Feb 2020 | $85,781 | $64,982 | $70,794 | $70,536 | $71,507 | $71,135 | $74,897 |
| Variance | ($44,713) | ($59,925) | ($70,754) | ($41,791) | ($27,130) | ($17,352) | ($4,380) |
| Variance % | (52.1%) | (92.2%) | (99.9%) | (59.3%) | (37.9%) | (24.4%) | (5.9%) |
| EXCEPTION EXPENSE | | | | | | | |
| Mar 2020 - Feb 2021 | $20 | $0 | $0 | $75 | $15 | $148 | $45 |
| Mar 2019 - Feb 2020 | $23 | $66 | $0 | $70 | $120 | $50 | $5 |
| Variance | ($3) | ($66) | $0 | $5 | ($105) | $98 | $40 |
| Variance % | (13%) | (100%) | 0% | 7.1% | (87.5%) | 196% | 800% |

FIG. 33a

| | ISSUED COMP COUNTS | | | | | | | |
|---|---|---|---|---|---|---|---|---|
| | Mar | Apr | May | Jun | Jul | Aug | Sep |
| COMP COUNT | | | | | | | |
| Mar 2020 - Feb 2021 | 1,178 | 45 | 2 | 689 | 972 | 1,131 | 1,272 |
| Mar 2019 - Feb 2020 | 3,355 | 2,165 | 2,020 | 2,081 | 2,147 | 2,032 | 2,045 |
| Variance | (2,177) | (2,120) | (2,018) | (1,392) | (1,175) | (901) | (773) |
| Variance % | (64.9%) | (97.9%) | (99.9%) | (66.9%) | (54.7%) | (44.3%) | (37.8%) |
| EXCEPTION COUNT | | | | | | | |
| Mar 2020 - Feb 2021 | 1 | 0 | 0 | 3 | 1 | 2 | 2 |
| Mar 2019 - Feb 2020 | 2 | 3 | 0 | 2 | 4 | 3 | 1 |
| Variance | (1) | (3) | 0 | 1 | (3) | (1) | 1 |
| Variance % | (50%) | (100%) | 0% | 50% | (75%) | (33.3%) | 100% |
| EXCEPTION COUNT % | | | | | | | |
| Mar 2020 - Feb 2021 | 0.08% | 0% | 0% | 0.44% | 0.1% | 0.18% | 0.16% |
| Mar 2019 - Feb 2020 | 0.06% | 0.14% | 0% | 0.1% | 0.19% | 0.15% | 0.05% |
| Variance | 0.03% | (0.1%) | 0% | 0.34% | (0.1%) | 0.03% | 0.11% |
| Variance % | 42.4% | (100%) | 0% | 353.1% | (44.8%) | 19.8% | 221.5% |

FIG. 33b

| | Oct | Nov | Dec | Jan | Feb | Total | Average |
|---|---|---|---|---|---|---|---|
| | | | | | | | M |
| | 1,526 | 1,224 | 1,239 | 1,318 | 1,272 | 11,868 | 989 |
| | 1,994 | 2,139 | 1,988 | 1,996 | 1,905 | 25,867 | 2,156 |
| | (468) | (915) | (749) | (678) | (633) | (13,999) | (1,167) |
| | (23.5%) | (42.8%) | (37.7%) | (34%) | (33.2%) | (54.1%) | (54.1%) |
| | | | | | | | |
| | 2 | 2 | 2 | 4 | 6 | 25 | 2 |
| | 3 | 1 | 0 | 1 | 0 | 20 | 2 |
| | (1) | 1 | 2 | 3 | 6 | 5 | 0 |
| | (33.3%) | 100% | 100% | 300% | 100% | 25% | 0% |
| | | | | | | | |
| | 0.13% | 0.16% | 0.16% | 0.3% | 0.47% | 0.21% | 0.2% |
| | 0.15% | 0.05% | 0% | 0.05% | 0% | 0.08% | 0.05% |
| | 0% | 0.12% | 0.16% | 0.25% | 0.47% | 0.13% | 0.16% |
| | (12.9%) | 249.5% | 100% | 505.8% | 100% | 172.4% | 172.4% |

FIG. 33b (Continued)

Home / Manage / CODING MANAGER | | | | | | | Refresh | Search Host to Review |

CODING REQUESTS

| Host | Submitted | Guest ID | Guest Name | Market | Code Type | Game Preference | Status | Date of Revisit |
|---|---|---|---|---|---|---|---|---|
| admin-qa | Dec 30, 2020 | 127046 | Carmen Mendez | Inner | Prospect | Slot | APPROVED | |
| rrupanagudi | Jan 11, 2021 | 129399 | Nathan Sweet | Inner | Active | Slot | APPROVED | |
| rrupanagudi | Jan 11, 2021 | 120785 | Michelle Price | Inner | Active | Slot | DECLINED | Jan 10, 2021 |
| rrupanagudi | Jan 11, 2021 | 120785 | Michelle Price | Inner | Active | Slot | APPROVED | |
| bfiumara | Jan 12, 2021 | 118624 | Robert Stewart | Inner | Prospect | Slot | PENDING | |
| rrupanagudi | Jan 22, 2021 | 232841 | Jonathan Smith | Inner | Prospect | Table | APPROVED | |
| rrupanagudi | Feb 10, 2021 | 120113 | Richard Dexter | Inner | Prospect | Slot | PENDING | |
| rrupanagudi | Feb 10, 2021 | 240568 | Wm Wiley | Inner | Prospect | Slot | PENDING | |
| admin-dev | Feb 10, 2021 | 168633 | John Ayers | Inner | Active | Slot | APPROVED | |
| admin-dev | Feb 11, 2021 | 258408 | Anthony Hanke | Inner | Active | Slot | PENDING | |
| admin-dev | Feb 11, 2021 | 233451 | James Medellin | Inner | Active | Slot | PENDING | |
| admin-dev | Feb 17, 2021 | 121907 | Anthony Winfield | Inner | Active | Slot | PENDING | |
| admin-dev | Mar 02, 2021 | 218029 | Josephine Lockwood | Bz | Prospect | Slot | PENDING | |

Home / Manage / Coding Manager / EVALUATION

GUEST NAME: ROBERT STEWART  GUEST ID: 118624   ☑ Go back

PLAY EVALUATION

| Month | THEORETICAL | | | ACTUAL WIN | | | DAILY | | EXPENSES | | | PROFIT | |
|---|---|---|---|---|---|---|---|---|---|---|---|---|---|
| | Slot | Table | Total | Slot | Table | Total | ADW | ADT | Comps | FSP | Others | Theo Profit | Actual Profit |
| Mar 2021 | $135 | $0 | $135 | $170 | $0 | $170 | $135 | $135 | $0 | $15 | $6 | $92 | $46 |
| Feb 2021 | $841 | $0 | $841 | ($136) | $0 | ($136) | $120 | $120 | $0 | $43 | $180 | $433 | ($199) |
| Jan 2021 | $3,224 | $0 | $3,224 | $1,806 | $0 | $1,806 | $170 | $169 | $0 | $224 | $582 | $2,087 | $334 |
| Dec 2020 | $2,814 | $0 | $2,814 | $905 | $0 | $905 | $128 | $127 | $0 | $231 | $276 | $1,753 | $45 |
| Nov 2020 | $8,249 | $0 | $8,249 | ($3,196) | $0 | ($3,196) | $330 | $329 | $0 | $552 | $197 | $5,584 | ($1,096) |
| Oct 2020 | $4,850 | $0 | $4,850 | ($699) | $0 | ($699) | $255 | $255 | $0 | $860 | $202 | $3,244 | ($203) |
| Sep 2020 | $2,640 | $0 | $2,640 | $3,953 | $0 | $3,953 | $155 | $155 | $0 | $516 | $202 | $1,593 | $944 |
| Aug 2020 | $6,420 | $0 | $6,420 | $9,155 | $0 | $9,155 | $321 | $321 | $0 | $550 | $291 | $4,266 | $2,361 |

CONTACT EVALUATION

| Priority Level | Subject | Date | Type | Team Member | Requesting Host | All Hosts | All Team Members |
|---|---|---|---|---|---|---|---|
| | | | | | Comments | | |
| Low | General | Jan 15, 2021 | Text | admin-dev | No Note | | |
| Low | General | Jan 15, 2021 | Phone | admin-dev | No Note | | |
| Low | General | Jan 11, 2021 | Email | admin-dev | No Note | | |
| Low | General | Jan 11, 2021 | Phone | admin-dev | Testing QA. | | |
| Low | General | Jan 11, 2021 | Text | admin-dev | No Note | | |
| Low | General | Jan 11, 2021 | Text | admin-dev | No Note | | |
| Low | General | Nov 08, 2020 | Email | hswanson | I introduced myself and gave my contact information as well as invited them to the Nov 15th event and gave details about it. | | |
| Low | Comp | Oct 28, 2020 | In Person | Ilovsmith | Stopped to see david. Set him up with CSP bonus based on 90D play | | |
| Low | General | Oct 23, 2020 | Email | Ilovsmith | Educated on my promotion; informed that Hannah will be their new Host starting 10/29. Provided contact information | | |
| Low | General | Sep 30, 2020 | Text | Ilovsmith | Invited to 10/11 VIP Fall Feast. Educated on RSVP details and Legendary Riches info. Accepted; confirmed RSVP time. | | |

| State ⇔ | Market ⇔ | Play Detail | Last Play Date | Last Contact |
|---|---|---|---|---|
| IA | Inner | ☒ | Feb 27, 2021 | Mar 3, 2021 |
| IA | Inner | ☒ | Mar 13, 2020 | Mar 3, 2021 |
| IA | Inner | ☒ | Feb 28, 2021 | Mar 3, 2021 |
| IA | Inner | ☒ | Mar 1, 2021 | Jan 5, 2021 |
| IA | Inner | ☒ | Jan 22, 2021 | Nov 8, 2020 |
| IA | Inner | ☒ | Feb 27, 2021 | Nov 17, 2020 |
| IA | Inner | ☒ | Mar 2, 2021 | Nov 17, 2020 |
| IA | Bz | ☒ | Feb 27, 2021 | Nov 14, 2020 |
| IA | Inner | ☒ | Mar 1, 2021 | Oct 31, 2020 |
| SD | Inner | ☒ | Feb 28, 2021 | Nov 17, 2020 |
| IA | Inner | ☒ | Mar 1, 2021 | Nov 17, 2020 |
| SD | Inner | ☒ | Mar 2, 2021 | Nov 22, 2020 |
| IA | Inner | ☒ | Mar 1, 2021 | Nov 17, 2020 |
| NE | Inner | ☒ | Feb 28, 2021 | Nov 14, 2020 |
| IA | Bz | ☒ | Dec 20, 2020 | Nov 17, 2020 |

FIG. 36 (Continued)

Home / Ops / List Management / PERSONALIZE LIST COLUMNS

PERSONALIZE LIST COLUMNS

Select which columns you would like to view in your list. Drag and drop selected column names to organize the order of your columns.

AVAILABLE COLUMNS

GuestID
Guest First Name
Guest Last Name
Address Line 1
Address Line 2
City
State

↑ ↓

SELECTED COLUMNS

EXCLUDE: Select the types of guests that you would like to exclude from your list.

Banned    Do Not Mail    Bad Address

Do Not Contact

FIG. 38

Home / Ops / List Management / Personalize List Columns / CREATE YOUR AUDIENCE

CREATE YOUR AUDIENCE

View Query Summary

CRITERIA 1

[+] ADD CRITERIA

ADD CRITERIA ITEM [×]

ATTRIBUTES     METRICS

City            Slot Theo Win
State           Slot Actual Win
Zip Code      Slot Session Time, Seconds
Market
Birthday Month
Gender
Current Tier Back     ⟳ Run Counts     Generate List

Home / Ops / TASKS   *PREV 30 DAYS* 14 DISMISSED || *PREV 30 DAYS* 3 COMPLETED || *PREV 30 DAYS* 2 EXPIRED ||*PREV 30 DAYS* 134 MISSED

Open  Closed  Missed   ☐ Low Priority  ☐ Medium Priority  ☐ High Priority

REAL TIME TASKS

| Uncarded<br>Loc: N/A<br>Play Time: | Hot Player Greet Task<br>Info: High worth uncarded Player $1059 in theo | Creator: OPTX | Creator on: Jan 20, 2021 | 🔍 ✕ |
| Paula Foster<br>130010<br>Loc: N/A<br>Play Time: | Contact Missing Task<br>Info: Player contact is missing | Creator: OPTX | Creator on: Feb 02, 2021 | 🔍 ✕ |
| Uncarded<br>Loc: N/A<br>Play Time: | Hot Player Greet Task<br>Info: High worth uncarded Player $544 in theo | Creator: OPTX | Creator on: Feb 03, 2021 | 🔍 ✕ |
| Uncarded<br>Loc: N/A<br>Play Time: | Hot Player Greet Task<br>Info: High worth uncarded Player $659 in theo | Creator: OPTX | Creator on: Feb 04, 2021 | 🔍 ✕ |

| Sort By ⌄ | SCHEDULE TASKS | 8 OF 8 TASKS *OVERDUE* ⌄ |
|---|---|---|
| Michael Taylor<br>120976 | ⊖ Contact Task ▵<br>Info: Missing person: Missing 365 play days for a Theo impact of $1437 | Creator: OPTX    ⊕ ✉ ⌕    ✕<br>Due on: Feb 01, 2021 *29 Days Past Due* |
| James Darden<br>147893 | ⊖ Contact Task<br>Info: Missing person: Missing 364 play days for a Theo impact of $1225 | Creator: OPTX    Follow Up  Log Outcome ✕<br>Follow Up Scheduled for: Feb 17, 2021<br>Due on: Feb 04, 2021 *29 Days Past Due* |
| Venessa Vela<br>123038 | ⊖ Contact Task<br>Info: Missing person: Missing 362 play days for a Theo impact of $1833 | Creator: OPTX    Follow Up  Log Outcome ✕<br>Follow Up Scheduled for: Feb 27, 2021<br>Due on: Feb 05, 2021 *25 Days Past Due* |
| Matthew Hicks<br>123064 | ⊖ Contact Task<br>Info: Missing person: Missing 362 play days for a Theo impact of $1354 | Creator: OPTX    Follow Up  Log Outcome ✕<br>Follow Up Scheduled for: Feb 25, 2021<br>Due on: Feb 02, 2021 *28 Days past Due* |

Lisa Kinser
136859

Contact Task

Info: Missing person: Missing 362 play days for a Theo impact of $4254

Creator: OPTX    Due on: Feb 02, 2021    *28 Days Past Due*

Paula Foster
130010

Offer Task

Info: Missing person: Missing 360 play days for a Theo impact of $1339

Recommendation: Bounce back offer for $41 free slot play valid Feb 17, 2021 9:44 PM Feb 22, 2021 9:44 PM Creator: OPTX    Due on: Feb 05, 2021    *25 Days Past Due*

Annie Broadway
130012

Offer Task

Info: Missing person: Missing 360 play days for a Theo impact of $1299

Recommendation: Bounce back offer for $363 free slot play valid Feb 18, 2021 9:44 PM Feb 23, 2021 9:44 PM Creator: OPTX    Due on: Feb 08, 2021    *22 Days Past Due*

FIG. 42 (Continued)

OPTX

4700

| DETAILS | |
|---|---|
| Manufacturer | Bally |
| Type | Participation |
| Manufactured On | Nov 14, 2019 |
| Installed On | Jan 01, 2020 |
| Days on Floor | 257 |
| Cost of Game | $45,000 |

| KPI'S | |
|---|---|
| Peak Utilization | 45% |
| Avg. Utilization | 45% |
| Bet | $1 |
| Time Played | 5,000 hrs. |
| Bank Index | 1.2 |
| Section Index | (3.4) |
| Floor Index | 1.8 |
| BV Acceptance | 97.2% |
| Jackpot Response | 2:08 |
| Change Light Res. | 1:56 |

| SNAPSHOT | | | |
|---|---|---|---|
| | Theo | Actual | Free Play | Taxes |
| 30 Day | $1000 | $1000 | $1000 | $1000 |
| 60 Day | $1000 | $1000 | $1000 | $1000 |
| 90 Day | $1000 | $1000 | $1000 | $1000 |
| 180 Day | $1000 | $1000 | $1000 | $1000 |
| 365 Day | $1000 | $1000 | $1000 | $1000 |
| Lifetime | $1000 | $1000 | $1000 | $1000 |

Glacier Gold
Area 1: O1E-221-1
Total Units:10

Dashboard | Floor View | Database | PD Portal | Admin | Settings

Watch | Move | Create Task | Action

RECOMMENDATIONS | PLAYERS | ALL UNITS | SECTION | HISTORY

Time frame [ ]  View: [ % Come In ] [ Actual ]  Type: [ ] [ Volume ] [ Frequency ]  Refresh  [ Run ]

FIG. 47

| Date Range | Tags | Guest ID | Guest Name | Host Name | Market | Tier | Coin In |
|---|---|---|---|---|---|---|---|
| 30 Days | | 01234567 | Smith, Jim | Flumara, Brooke | Local | Onyx | $10,000 |
| | | 01234567 | Smith, Jim | Flumara, Brooke | Out of Town | Onyx | $10,000 |
| | | 01234567 | Smith, Jim | Flumara, Brooke | Local | Onyx | $10,000 |
| | | 01234567 | Smith, Jim | Flumara, Brooke | Out of Town | Onyx | $10,000 |
| | | 01234567 | Smith, Jim | Flumara, Brooke | Out of Town | Onyx | $10,000 |
| | | 01234567 | Smith, Jim | Flumara, Brooke | Local | Onyx | $10,000 |
| | | 01234567 | Smith, Jim | Flumara, Brooke | Out of Town | Onyx | $10,000 |
| 90 Days | | 01234567 | Smith, Jim | Flumara, Brooke | Local | Onyx | $10,000 |
| | | 01234567 | Smith, Jim | Flumara, Brooke | Out of Town | Onyx | $10,000 |
| | | 01234567 | Smith, Jim | Flumara, Brooke | Local | Onyx | $10,000 |
| | | 01234567 | Smith, Jim | Flumara, Brooke | Out of Town | Onyx | $10,000 |
| | | 01234567 | Smith, Jim | Flumara, Brooke | Local | Onyx | $10,000 |
| | | 01234567 | Smith, Jim | Flumara, Brooke | Out of Town | Onyx | $10,000 |

FIG. 47 Continued

OPERATIONS PLATFORM FOR MANAGING SERVICES AT A PROPERTY

BACKGROUND

A service business may need to have a comprehensive understanding of its customers and/or its operations in order to be successful. For example, a service business may have unhappy customers and/or lack profitability if it does not have a sufficient understanding of its customers and/or its operations. However, it may be difficult for a service business to gain a sufficient understanding of its customers and/or its operations. This difficulty may be especially prevalent for those service businesses that have a large number of employees, a large number of customers, and/or a large property to oversee. Therefore, improvements in service management techniques are needed.

SUMMARY

Methods and systems are disclosed herein that enable the management of services at a property, such as a casino. A system may comprise at least one database associated with a service business, a plurality of user interface elements, and at least one computing device in communication with the at least one database and the plurality of user interface elements. The at least one computing device may be configured to retrieve, from the at least one database, data associated with each of the plurality of user interface elements associated with content management, task management, property management, action management, player profiling, comp management, player development, asset tagging and flagging, profitability and comparative analysis, to name a few. At a first time, the at least one computing device may receive a first indication to turn on a first subset of the plurality of user interface elements. The at least one computing device may populate each of the first subset of user interface elements with the respective data associated that user interface element. The at least one computing device may be further configured to receive, at a later time, a second indication to turn on at least one additional user interface element of the plurality of user interface elements. Without retrieving additional data from the at least one database, the at least one computing device may populate the at least one additional user interface element with the data associated the at least one additional user interface element.

BRIEF DESCRIPTION OF THE DRAWINGS

The following detailed description is better understood when read in conjunction with the appended drawing figures. For the purposes of illustration, examples are shown in the drawings; however, the subject matter is not limited to specific elements and instrumentalities disclosed. In the drawings:

FIG. 5 is an example user interface illustrating dynamic floor monitoring.

FIG. 8 is an example user interface illustrating dynamic floor monitoring.

FIG. 9 is an example user interface illustrating action management.

FIG. 10 is an example user interface illustrating action management.

FIG. 15 is an example user interface illustrating player profile management.

FIG. 16 is an example user interface illustrating player profile management.

FIG. 17 is an example user interface illustrating player profile management.

FIG. 18 is an example user interface illustrating player profile management.

FIG. 19 is an example user interface illustrating player profile management.

FIG. 20 is an example user interface illustrating player profile management.

FIG. 21 is an example user interface illustrating player profile management.

FIGS. 23a-23b are example user interfaces illustrating player profile management.

FIG. 24 is an example user interface illustrating player profile management.

FIG. 25 is an example user interface illustrating player profile management.

FIG. 26 is an example user interface illustrating player profile management.

FIG. 27 is an example user interface illustrating player profile management.

FIG. 28 is an example user interface illustrating comp management.

FIG. 29 is an example user interface illustrating comp management.

FIG. 31 is an example user interface illustrating comp management.

FIGS. 33a-33b are example user interfaces illustrating comp management.

FIG. 34 is an example user interface illustrating coding management.

FIGS. 35a, 35b and 35c are example user interfaces illustrating coding management.

FIG. 38 is an example user interface illustrating list management.

FIG. 39 is an example user interface illustrating list management.

FIG. 42 is an example user interface illustrating task management.

FIG. 47 is an example user interface illustrating device profile management.

DETAILED DESCRIPTION OF ILLUSTRATIVE EMBODIMENTS

Gaining a comprehensive understanding of its customers and/or its operations may be vital to the success of a service business. By gaining a comprehensive understanding of its customers and/or its operations, a service business may be able to increase profitability, revenue, and/or guest satisfaction. To gain such a comprehensive understanding of its customers and/or its operations, a service business may gather and analyze data. Data analysis may guide the service business's decision-making in a manner that increases profitability, revenue, and/or guest satisfaction.

However, data analysis is not a simple task. This is especially true for those service businesses that have a large number of employees, a large number of customers, and/or a large property to oversee (such as a casino), as these service businesses may be left with an overwhelmingly large quantity of data to analyze and too many different personnel tasked with trying to make use of that data. A service business may not have the capability to analyze large amounts of data itself and may instead need to outsource the work to costly data scientists. Even for those businesses who have the capability to analyze large amounts of data themselves, such work is tedious and inefficient.

Figure 1:
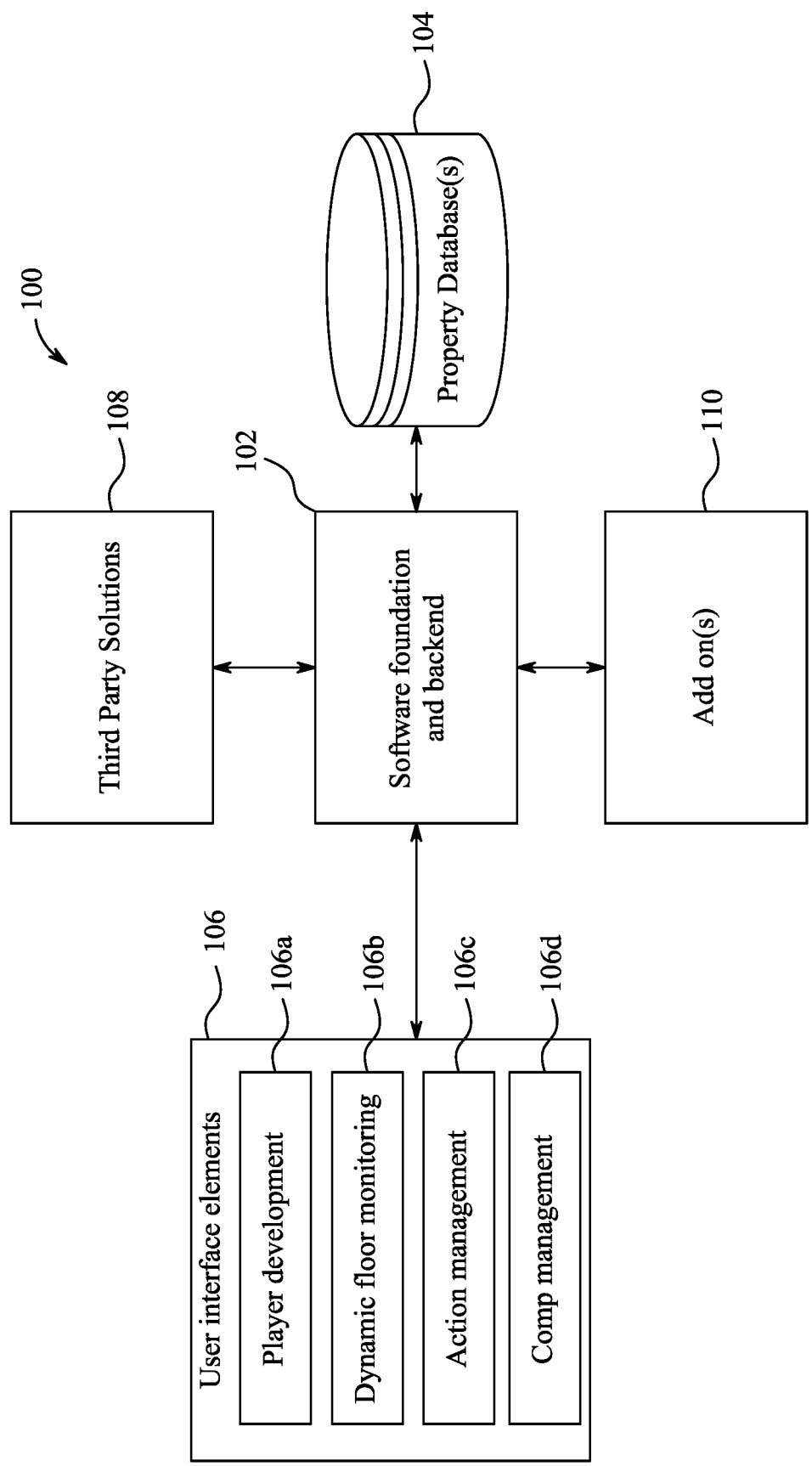
FIG. 1 is a diagram illustrating an example platform for managing services at a property.

Accordingly, a platform that advances the data capabilities of service businesses is desirable. The platform may provide a service business with a better understanding of its customers and/or its operations and may therefore facilitate better management of the service business's property. The platform may include a variety of features, each of which may help increase profitability, revenue, and guest satisfaction for the service business. FIG. 1 illustrates an example platform 100 for advancing the data capabilities of a service business at one or more properties.

A variety of different types of service businesses may benefit from using the platform 100. For example, casino properties, hotel properties, resort properties, time share properties, vacation properties, amusement parks, food and beverage businesses, vineyards, car dealerships, office buildings, universities, and/or any other business that manages assets associated with a business that includes multiple different operational aspects may benefit from using the platform 100. A service business may be associated with a single property or multiple properties. If a service business is associated with more multiple properties, each of these properties may be located in different locations and/or on-line.

The platform 100 may include a software foundation and backend 102, one or more property databases 104, a plurality of user interface (UI) elements 106, one or more third-party solutions 108, and one or more add-ons 110. The platform 100 may be used by a services business at one or more properties to manage services at the business's one or more properties.

The software foundation and backend 102 may be configured to collect and organize data associated with the one or more properties. For example, the software foundation and backend 102 may be configured to collect and organize data stored in one or more property databases, such as the property database(s) 104. The property database(s) 104 may store data associated with any aspect of the service business, including but not limited to customer data, employee data, property data, financial data, or any other data associated with the operations of the service business. If the service business is associated with multiple properties, the software foundation and backend 102 may be configured to collect and organize data stored in one or more property databases at some or all of these multiple properties. In this manner, each property may be viewed and managed on its own, while maintaining the ability to combine each property into a single view and management platform.

In addition to collecting and organizing data from the property database(s), the software foundation and backend 102 may have additional functionality. For example, the software foundation and backend 102 may also analyze the data collected from the property database(s) 104. For example, if the service business is a casino, the software foundation and backend 102 may analyze the data collected from the property database(s) 104 to create criteria that is used to determine a number of things, such as who is recognized as a VIP, when comps (i.e., complimentary benefits of some type, such as drinks, meals, free play, etc.) are to be given and how much, etc. Additionally, or alternatively, the service business may use the software foundation and backend 102 to create its own criteria for a variety of things, such as VIP criteria, comp criteria, etc. The platform 100 may provide the service business with one or more user interfaces (UIs) that present the data associated with the property in an organized, easy-to-understand manner. The platform 100 may present, on the UI, the data that has been collected and organized by the software foundation and backend 102. The platform 100 may provide the service business with a UI that has a variety of different UI elements, such as the UI elements 106. The service business may be able to choose which UI elements 106 are provided to them by the platform 100. For example, the service business may choose only one or two UI elements 106 that are particularly valuable to them at that time, or the service business may choose all of the UI elements 106. The service business may choose the UI elements 106 that are most valuable (e.g. financially valuable) to them at that time. By allowing the service business to choose the UI elements 106 that are most valuable to them at that time, the platform 100 may be desirable to and utilized by a larger number of service business, each of which may have different business needs.

The service business may decide at a later point in time, that additional UI elements 106 are desired, or that current UI elements 106 being utilized are no longer needed. The software foundation and backend 102 may therefore turn UI elements 106 on or off depending on the UI elements 106 selected by the service business. For example, if a service business selects three UI elements 106, the software foundation and backend 102 may turn on these three selected UI elements 106. The remainder of the UI elements 106 may not be turned on (e.g., may be left turned off). To the service business, turned off elements appear not to exist, but all of the software code and collected data necessary to support the functionality of the turned off UI elements 106 is already included with the software application or software as a service made available to the service business and all of the data needed to populate the turned off UI element has already been obtained. In this manner, as further described below, if the service business desires additional services associated with turned off UI elements, those services may immediately be made available without requiring the service provider to visit the service business. In other words, the status of each UI element is remotely actionable (i.e., can be turned or off remotely). In addition, each UI element may be turned on without requiring the service provider to access additional data from the service business. In other words, the data for each UI element is accessed when the service is initiated and maintained throughout the service even if the UI element is not turned on.

If the service business later decides to choose different UI elements 106, the software foundation and backend 102 may adjust which UI elements 106 are turned on or off accordingly. For example, if the service business later decides that they do not need one of the three UI elements 106 that they previously selected, the software foundation and backend 102 may turn off this particular UI element 106. Likewise, if the service business later decides that they want a new UI element 106 in addition to the three UI elements 106 that they previously selected, this new UI element 106 may be turned on by the software foundation and backend 102 without otherwise requiring any changes to the software application or software as a service made available to the service business and the data associated therewith.

As noted above, while the service business may choose which UI elements should be turned on/off at particular times, the service business is not responsible for actually turning on/off the UI elements. Rather, the platform 100 turns the UI elements on/off in response to instructions received from the service business. For example, the service business may, at a first time, specify that two UI elements should be turned on and the remainder of the UI elements should not be turned on. The platform 100, such as via the software foundation and backend 102, may turn on these two UI elements for the service business and may not turn on the remainder of the UI elements. The service business may then, at a later time, specify that one of the two turned-on UI elements should now be turned off and that a new UI element should now be turned on. The platform 100, such as via the software foundation and backend 102, may turn off the one previously turned-on UI element for the service business. The platform 100 may also turn on the new UI element for the service business. The remainder of the UI elements may remain turned-off.

Each of the different UI elements 106 are associated with different aspects of the service business that may need to be monitored and/or managed. The different UI elements 106 include, but are not limited to, player development 106a, dynamic floor monitoring 106b, action management 106c, player profile management, comp management 106d, a content management system (CMS) for ingesting data in disparate formats element, task management, slot management, marketing management, food and beverage management, sports book monitoring, hotel monitoring, on-line monitoring, and/or recommendation engines. Each of these UI elements 106 is discussed in more detail below, with reference to FIGS. 5-43.

As discussed above, the software foundation and backend 102 may be configured to collect and organize data associated with the property. For example, the software foundation and backend 102 may be configured to collect and organize data stored in one or more property databases, such as the property database(s) 104. The property database(s) 104 may store data associated with any aspect of the service business, including but not limited to customer data, employee data, property data, financial data, or any other data associated with the operations of the service business.

In an embodiment, a content management system (CMS) may be configured to ingest data in disparate formats. The data in disparate formats may be, for example, data from disparate management systems and/or data associated with different properties. For example, the management systems may include one or more of food & beverage systems, sportsbooks systems, slot systems, on-line gaming systems, and/or any other systems used to manage services at a property. Exemplary client systems include BRAVO for casino tables, OASIS for slots and player tracking, MICROS for food and beverage, MGT for marketing kiosks, OPERA for hotels, and/or any other systems provided by any other provider at each property.

Figure 2:
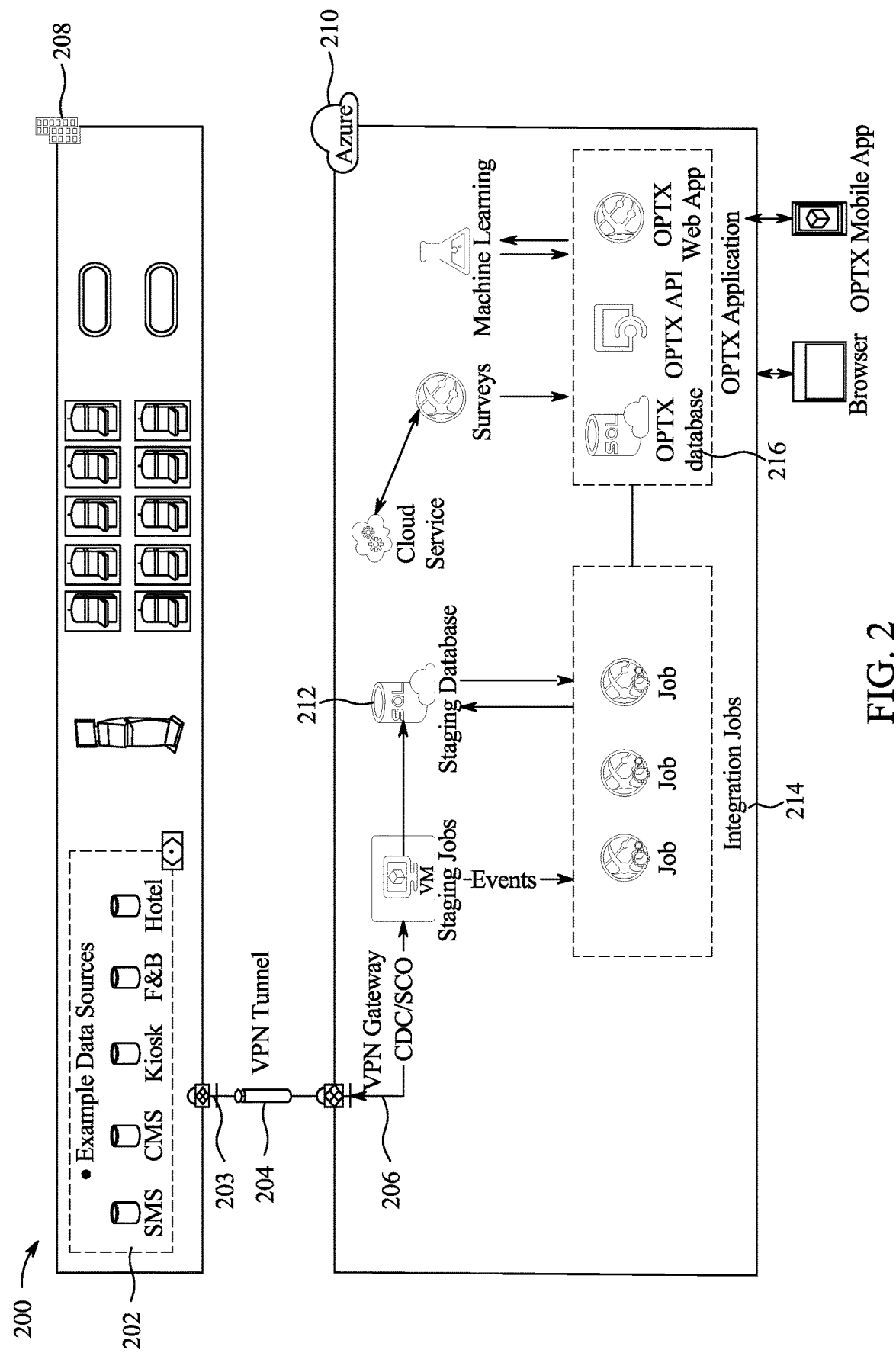
FIG. 2 is a diagram illustrating an example system for ingesting data in disparate formats from a service business.

FIG. 2 illustrates an example system 200 including a CMS for ingesting data in disparate formats from a service business. The data in disparate formats may come from a variety of different systems 202. For example, the systems 202 that generate data may include food & beverage systems, sportsbooks systems, slot systems, on-line gaming systems, hotel systems, casino systems, table systems, cashless systems, central credit systems, and/or any other system used to manage services at a property. The platform 100 may need to connect to all of these systems 202 and gather and store data from all of the systems 202 in a way that provides the platform 100 with the ability to leverage the data to provide insights and action to the user(s) of the platform 100.

However, connecting to all of these systems 202 and gathering data from the systems 202 is challenging. Bringing all of the systems 202 together and connecting them back to an asset is difficult at least in part because all of the data sources may be different in many ways. In an embodiment, the data may be extracted from each of the systems 202, transformed as necessary, and loaded into the platform 100 all in one step. For example, if the data associated with player wagers is desired, a query may be run to get that specific data from a source system 202, and a database associated with the platform 100 may be populated and presented to a user of the platform 100. However, this "one-step" treatment may prevent the platform 100 from being scalable and may lead to various data engineering issues. For example, any time any component or step in this one-step treatment needed to be modified, an entirely new version of the platform 100 may have to be reinstalled at each property that uses the platform 100. Accordingly, it may be desirable to connect disparate systems and gather data from them in different manner.

For example, it may be desirable to stage the disparate data in a staging database 212 separated from the systems 202 by a protective firewall 203. The staging database 212 may also be a replication database that replicates and stores any data received from the systems 202. A replication database may be necessary when the platform 100 is receiving data from a customer in a regulated industry, such as gaming, so that the data in the database may be made available to regulators without requiring it to be separated from other data and to insure all of the data is made available. The staging database 212 may also receive and store input data from the systems 202 so the data is separated from other portions of the platform 100 as well as from data input from other customers. There may also be a protective firewall (not shown, but the same as firewall 203) between the staging database 212 and other portions of platform 100. This separation of data from portions of the platform 100 facilitates the provisioning of custom input solutions to different customers, including outside of the gaming context. The separation and storage may be in physically different databases or in separated storage of a cloud-based service. Additionally, or alternatively, the staging database 212 may function as an enterprise data warehouse (EDW) for customers that desire this feature. The staging database 212 may also facilitate the return of customer data when a relationship with a customer terminates (e.g., the end of a contract), as the staging database 212, or at least its contents, may just be returned to the customer.

The data stored in the staging database 212 may be an exact replica of the source data. To get the data to stage in the staging database 212, various different techniques may be used. For example, a VPN tunnel 204 may be utilized to tunnel to each of the client systems 202. A VPN gateway 206 may be a connection point for the VPN tunnel 204. The VPN gateway 206 may contain the information that a device needs to establish the VPN tunnel 204 between a virtual network, such as Azure virtual network 210, and an on-premises location 208, such as a client property, over the public Internet.

To collect the data from the client systems 202 for storage in the staging database 212, change data capture (CDC) may be utilized. Alternatively, if the staging database 212 is a replication database, CDC may be utilized between the replication database and other portions of the platform 100. CDC is a set of software design patterns used to determine and track data that has changed so that actions can be taken using the changed data. CDC may be used to incrementally extract changed or new records from a client system 202 or replication database so that the whole database does not need to be downloaded for further processing each time. In an embodiment, CDC may read from logs in order to detect changes. While reading from logs may provide more details, it may impact performance as it puts more resource requirements on the client systems 202 and/or may result in the platform 100 receiving more data than the client wants the platform 100 to receive.

In another embodiment, CDC may read from tables in order to detect changes. Reading from tables may be similar to a database lookup and may require very little resources from the client systems 202. Reading from tables may also prevent the platform 100 from receiving more data than the client wants the platform 100 to receive. Each table may be timestamped so that CDC may look at each row in the table, compare it to the prior row in the table, and detect any change to the data. If a change to the data is detected, that change may be pulled into the staging database 212.

One or more databases from which the CDC reads tables may be relational databases that use "rowversion". Rowversion is a data type that exposes automatically generated, unique binary numbers within a database. It may make it possible to version-stamp rows in a table with a unique sequential value that helps to maintain the integrity of the database when different users are updating rows at the same time. A relational database that uses rowversion may enable a different rowversion to be created each time there is a change to data. Accordingly, it may be easier to determine when changes have occurred to the data and what those changes are. If data has been changed multiple times, only the last (most recently created) rowversion may be sent for storage in the staging database 212. If a change to the data is detected, such as by detecting that a new sequence number has been created, that change may be pulled into the staging database 212. Alternatively, data may be pulled into the staging database 212 from intermediary rows if necessary or desired. For example, data may be pulled from intermediary rows into the staging database 212 if more details regarding the data change are desired. Additional details regarding the data change may be desired, for example, if there is a substantial amount of time in between the times when the CDC reads from the tables to detect changes.

Additionally, or alternatively, to collect the data from the client systems 202 for storage in the staging database 212, a slowly changing dimension (SCD) may be utilized. A SCD is a dimension that stores and manages both current and historical data over time in a data warehouse. A SCD allows for the maintenance of data changes in the data warehouse. These data changes may be related to dimensions that gradually change with time, rather than changing on a regular basis. Utilizing a SCD may be a way to apply updates to the staging database 212 so that the original source data is preserved. Some sources may maintain slot machine meters in one table. For example, when you insert a bill the meter gets updated from a previous value to a new value. Some source systems may only maintain the new value. A SCD may be utilized to both capture a previous value and a new value and have a trace of how the values are changing over time. For example, if a guest or player moves and gets a new address, some source systems may not track the previous addresses and when the address was changed. A SCD enables the new address and the previous address to be obtained and to make it clear that the guest as moved. As a result, more insight and useful information may be provided via the platform 100.

Additionally, or alternatively, data may need to be collected from the client systems 202 in real-time. Data may need to be collected from the client systems 202 in real-time if it is the type of data that changes frequently. For example, data associated with slot machine meters may change frequently and may need to be collected in real-time. The rows from real-time checks may go into ASAP tables in the platform 100. For example, if a property has software as a service (SaaS) data captured and stored in a server, this data may be taken directly from the feed of SaaS data and inserted into ASAP tables in the platform 100.

Once data is stored in the staging database 212, it may be integrated into a format that may be utilized by other portions of the platform 100. To integrate the data into this new format, different integration jobs 214 may be written. The integration jobs 214 may transfer data from the staging database 212, convert it into a different format for use within the platform 100, and populate a database associated with the platform 100, such as the database 216. A staging controller may manage jobs and keep metadata regarding which client source systems 202 are being tapped and which tables were checked. For example, the staging controller (such as controller 312 of FIG. 3) may indicate which job(s) are running, whether a job was successful or a failure, how long each job takes to run, etc.

The schema of the database associated with the platform 100, such as the database 216, may stay consistent irrespective of who the client is (e.g., which client is associated with the client source systems 202 and/or what the client source systems 202 are). The schema may remain unchanged for different clients, but each instance of the platform 100's application may be different. One advantage of this design lays in the segregation between the staging database 212 and the integration schema. Each client of the platform 100 will each have its own staging schema, integration schema, and schema of the database associated with the platform 100. The data from various clients does not need to be commingled.

In an embodiment, at least some of the client data (e.g., the data from the client source systems 202) may be input into a data stream. The data stream may combine the client data with data from one or more other sources. The one or more other sources may provide data associated with various different topics, such as traffic, weather, or any other topic. The data stream combining the client data and the data from the one or more other sources may be used in an artificial-intelligence (AI) system to make predictions about why certain things occurred and/or to learn enough to plan for future events that might occur. For example, guest traffic during a certain period of time may be higher or lower than expected for reasons that are not clear based just on data provided from the systems 202, but could become clear when combined with data about the weather, traffic or other news sources. The client source data, such as the data from the client source systems 202, may need to be managed so that it is feed into the data stream in the correct order and can be time matched to the other source data.

Figure 3:
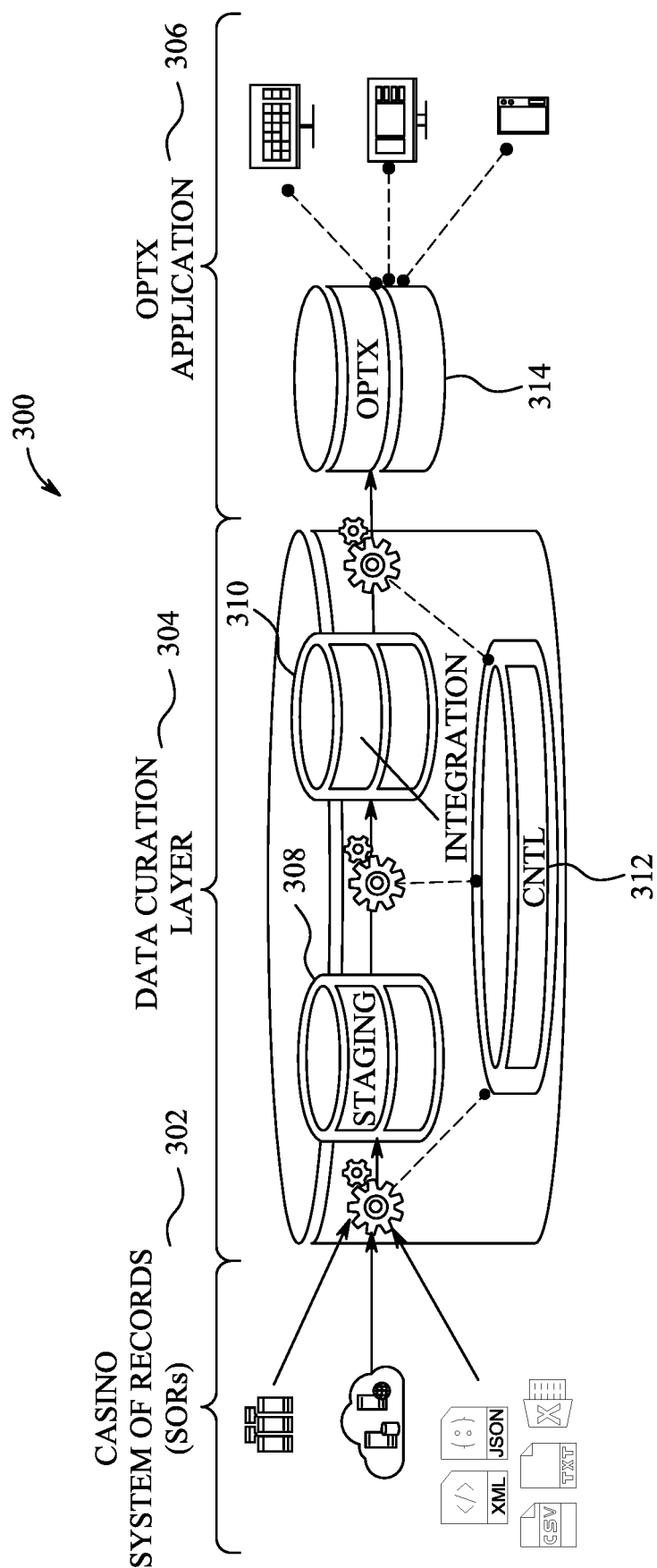
FIG. 3 is a diagram illustrating an example system of a data structure for the system of FIG. 2.

FIG. 3 illustrates an example data structure 300 of a system, such as the system 200, including a CMS for ingesting data in disparate formats. The data structure 300 includes a system of records 302, a data curation layer 304, and an application layer 306. The system of records 302 may include data associated with a client of the platform 100. The data may be in disparate formats. The data may come from a variety of different systems, such as the systems 202 of FIG. 2. For example, the data may come from food & beverage systems, sportsbooks systems, slot systems, on-line gaming systems, hotel systems, casino systems, table systems, cashless systems, central credit systems, security systems, communications systems, verification systems and/or any other system used to manage services at a property. The platform 100 may need to connect to all of these systems and gather and store data from all of the systems in a way that provides the platform 100 with the ability to leverage the data to provide insights and action to the user(s) of the platform 100.

The data curation layer 304 may include a staging database 308, an integration database 310, and/or a control database 312. The staging database 308 may be similar to the staging database 212 discussed above with regard to FIG. 2. For example, the staging database 308 may store a replica of the source data from the system of records 302. To get data to stage in the staging database 308, various different techniques may be used as discussed above.

Once data is stored in the staging database 308, it may be integrated into a format that the application layer 306 understands. To integrate the data into this new format, different integration jobs, such as the integration jobs 214 discussed above with regard to FIG. 2, may be written and stored in the integration database 310. Under control of the controller 312, the integration jobs may transfer data from the staging database 308, convert it into a format that the application layer 306 can understand, and populate a database associated with the application layer 306, such as the database 314. The control database 312 may manage jobs and keep metadata regarding which system of records 302 is being tapped and which tables were checked. For example, the controller 312 may indicate which job(s) are running, whether a job was successful or a failure, how long each job takes to run, etc.

The schema of the database 314 may stay consistent irrespective of who the client is (e.g., which client is associated with the system of records 302 and/or what the client source systems are.) The schema of the database 314 may remain unchanged for different clients, but each instance of the platform 100's application may be different. One advantage of this design lays in the segregation between the staging database 308 and the integration database 310. Each client of the platform 100 will each have its own staging schema, integration schema, and application schema. The data from various clients does not need to be commingled.

Figure 4:
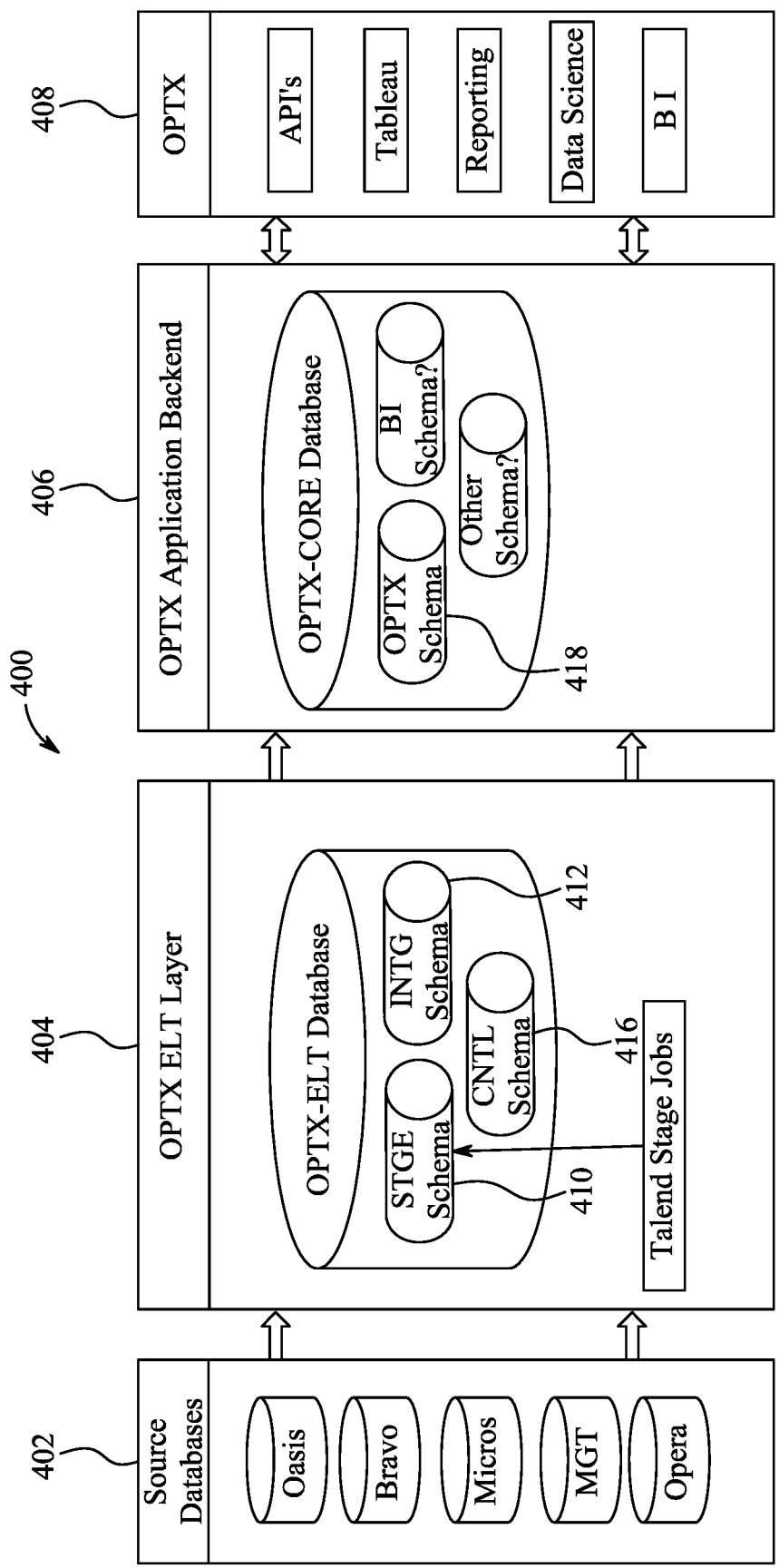
FIG. 4 is a diagram illustrating an example data structure for the system of FIG. 2.

FIG. 4 illustrates another example data structure 400 of a system, such as the system 200, including a CMS for ingesting data in disparate formats. The data structure 400 provides a more detailed look at the data structure 300, such as additional details regarding what is stored in the system of records 302 and/or each of the different databases 308, 310, 312, 314. The data structure 400 includes one or more source databases 402. The source databases 402 may be similar to the data sources 202 discussed above with regard to FIG. 2 and/or the system of records 302 discussed above with regard to FIG. 3. The source databases 402 may include, for example, Oasis for casino tables, Bravo for slots, Micros for food and beverage, MGT for customer relationship management, Opera for hotels, and/or any other CMS provided by any other provider at each property.

The source databases 402 may provide source data to an extraction, loading, and transformation (ELT) layer 404. The ELT layer 404 may include an ELT database. The ELT database may be specific to source systems, so that each customer has a different ELT database. The ELT database may include a staging schema 410, an integration schema 412, and/or a control schema 416. The ELT layer 404 may utilize, for example, TALEND (a trademark of Talend S.A.), a data management platform for staging and integration. Any other suitable platform may be used.

The ELT layer 404 may receive data from the source databases 402 and use it to update the stage schema 410. The stage schema 410 may be used primarily for source system data extraction. The stage schema 410 may store raw data extracted from the source databases 402. The data stored in the stage schema 410 may not yet be transformed. The stage schema 410 may contain, for example, tables only (e.g., no views and/or no external tables). In an embodiment, all of the table columns from the source databases 402 may be brought in. Additional application audit columns may also be stored in the stage schema 410. The stage schema 410 may include CDC and/or SCD functionality. CDC and SCD are both discussed above with respect to FIGS. 2-3.

Integration jobs, such as those discussed above with respect to FIGS. 2-3, may get data from the stage schema 410 and use it to update the integration schema 412. The integration schema 412 may be used primarily for data transformation. The integration schema 412 may store transformed data based in a variety of different groupings. For example, the integration schema 412 may store transformed data based on formula calculations, various groupings, various aggregations, and/or timeframe aggregations. The integration schema 412 may contain source system surrogate keys, natural keys, and/or durable keys. Unlike the stage schema 410, which stores raw data extracts from the source databases 402, the integration schema 412 may contain field names that match with the source databases 402. Only the necessary columns from source databases 402 may be brought into the integration schema 412. The integration schema 412 may contain tables only (e.g., no views and/or no external tables).

The control schema 416 may be used primarily for job executions, such as TALEND job executions. The control schema 416 may manage jobs and keep metadata regarding which source database 402 is being tapped and which tables were checked. For example, the control schema 416 may indicate which job(s) are running, whether a job was successful or a failure, how long each job takes to run, etc. The control schema 416 may include information on source and/or target systems, and/or source and/or target table information. The control schema 416 may be used to track job executions, such as job successes or failures, job duration, pre and/or post record counts, and/or the quantity of records inserted and/or updated. The control schema 416 may include error statistics, such as database connection issues, invalid object names, and/or execution time run issues.

The data structure 400 includes an application backend 406. The application backend may be, for example, the software foundation and backend 102 discussed above with respect to FIG. 1. The application backend 406 may include a core database. The core database may be independent of source systems and the ELT layer 404, so that any source system changes do not have an impact on the objects in the core database. The core database may include an application schema 418. TALEND jobs may get data from the integration schema 412 and use it to populate the application schema 418. Additionally, or alternatively, the application schema 418 may get real-time data from customer databases and store it in ASAP tables of the application schema 418. In addition to the tables created based on the integration schema 412, the application schema 418 may include application objects, such as application generated transaction tables, application generated reference tables, and/or any supporting tables for the application.

The application schema 418 may talk to various application layers. For example, the application layers may include an API call that is coming through, a visualization and analytics tool for business intelligence reporting, other reporting, data science, business intelligence, and/or any other application layer associated with the platform 100. The application schema 418 may not need to refer to the integration schema 412. If there is a need to review the integration schema 412, this may be done (e.g., manually) and those objects may be brought into the application schema 418.

FIGS. 5-8 illustrate example UI elements for dynamic floor monitoring.

Dynamic floor monitoring may allow a service business, such as a casino, to monitor its property, including assets of the service business that are currently on the service business's one or more properties. The assets of a service business may include guests and/or devices (e.g., machines) of the service business. Dynamic floor monitoring may provide a live, real-time feed of the service business's one or more properties. FIG. 5 illustrates an example UI 500 depicting a live, real-time feed of a service business's one or more properties. While the example UI 500 depicts a live, real-time feed of a casino's one or more properties, dynamic floor monitoring may allow any type of service business to monitor its one or more properties and/or the assets on the property in real time. The UI 500 provides an operator, such as a casino operator, with a real-time feed of all identified (in some manner) assets on the property. For example, the UI 500 may provide the operator with a real-time feed of all players, both rated and unrated, that are on the casino floor. In another embodiment, the UI 500 may provide the operator with a real-time feed of all devices on the casino floor.

The UI 500 may provide the operator with the ability to identify assets that are meaningful and require contact and/or action. For example, the UI 500 may provide basic asset information 502, such as the asset IDs, asset names, and tiers within a reward or ranking system, as well as a location on the property 504 that indicates where each asset is playing. The UI 500 also provides other information about the property and the assets located on the property, such as a current day-play and 90 day-play as a comparison 506 for each guest, side-by-side. Action may also be entered directly into the UI 500. For example, an operator may be able to log a contact, issue a comp, request a code, call a guest, text the guest or email the guest, etc. directly from UI 500.

In an embodiment, after viewing the UI 500, the operator may be able to easily identify which guests are particularly valuable, such as those guests that are most likely to increase the service business's revenue and/or profits, and identify where these guests are located on the one or more properties. The operator may choose to interact with these valuable guests, such as by approaching them and offering them a free beverage, engaging them in conversation, inviting them to participate in some other activity then or in the future, etc., thereby improving their guest experience and increasing the likelihood that they will return to the one or more properties at a later date.

Figure 6:
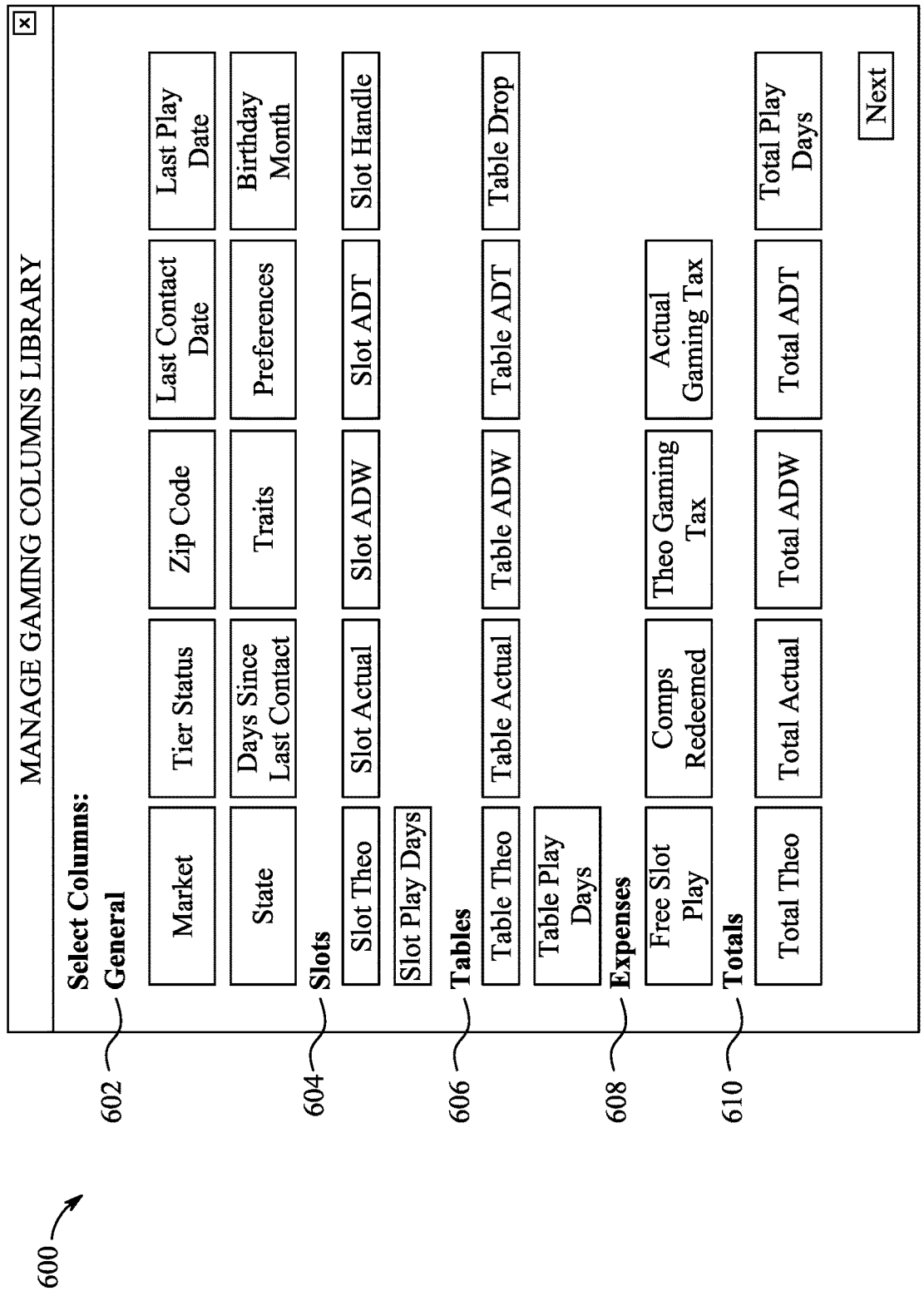
FIG. 6 is an example user interface illustrating dynamic floor monitoring.

The UI 500 is customizable so that the information that is displayed is important to the service business. For example, the operator may be able to choose how they want the UI 500 to look and/or choose which information should be depicted on the UI 500. The operator may be able to customize the UI 500 via a gaming columns library (GCL). To view the GCL, the operator may select a GCL button 508 on the UI 200. FIG. 6 depicts an example GCL 600 that allows the operator to configure the UI 500 in a variety of different ways.

The operator may choose which columns appear on the UI 500 for dynamic floor monitoring via the GCL 600. The operator may select one or more general columns 602, which provide various types of general information about the assets. For example, the general information about the assets on a casino floor may include information about the guests on the casino floor, such as market, state, tier status, days since last contact, zip code, traits, last contact date, preferences, last play date, birthday month, etc. The casino operator may additionally, or alternatively, select one or more slot columns 604, which provide various types of information about the slots on the casino floor, such as slot "theo" (theoretical profit), slot actual, slot average daily worth (ADW), slot average daily theoretical (ADT), slot handle, slot play days, etc.

The casino operator may additionally, or alternatively, select one or more table columns 606, which provide various types of information about the tables on the casino floor, such as table theo, table actual, table ADW, table ADT, table drop, table play dates, etc. The casino operator may additionally, or alternatively, select one or more expenses columns 608, which provide various types of general information about the casino expenses, such as free slot play, comps redeemed, theo gaming tax, actual gaming tax, etc. The casino operator may additionally, or alternatively, select one or more totals columns 610, which provide totals of various types of information about the casino guests, such as total theo, total actual, total ADW, total ADT, total play days, etc.

Figure 7:
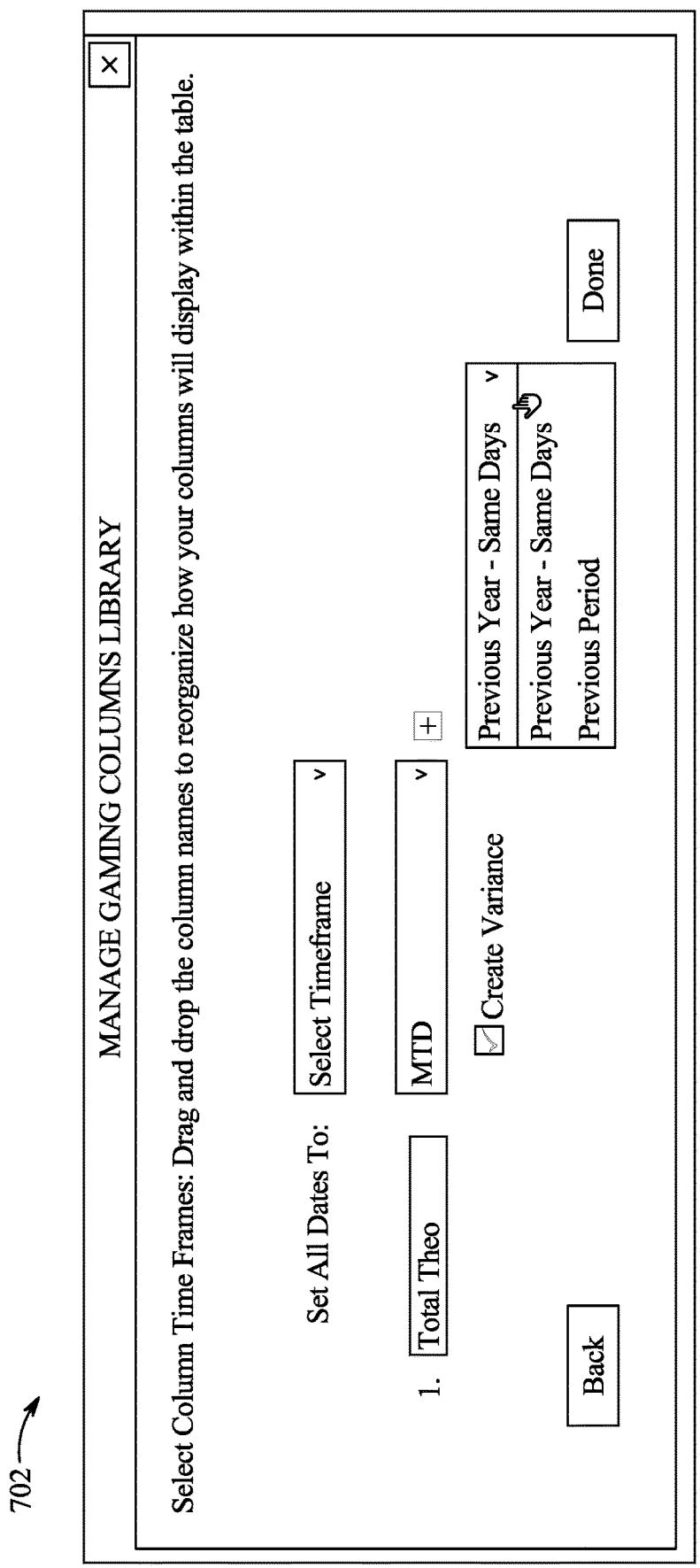
FIG. 7 is an example user interface illustrating dynamic floor monitoring.

In addition to using the GCL 600 to select which columns are displayed on the UI 500, the operator may select any desired time frame, metric, and/or variance for the selected columns. For example, after the operator uses the GCL 600 to select the desired column(s), the operator may then select any desired time frame, metric, and/or create a variance for the selected columns. FIG. 7 depicts example UIs 700-702 that illustrate an operator selecting a time frame, metric, and/or creating a variance for the selected columns. For example, if the column "total theo" was selected, the operator may, via the UI 700, select a time frame for the selected column. The time frame may include year-to-date, life-to-date, month-to-date quarter-to-date, last 7 days, last 30 days, last 60 days, or any other time frame. In addition to selecting a time frame for a selected column, the operator may, via the UI 702, create a variance for the selected time frame. For example, the operator may create a variance "previous year, same days" or "previous period" or any other variance.

The ability to select a time frame, metric, and/or create a variance for selected column(s) may allow the operator to customize the UI 500 for dynamic floor monitoring in a manner that is consistent with the operator's business needs. In an embodiment, the ability to select a time frame, metric, and/or create a variance for selected column(s) may be particularly useful to a casino operator that wants to identify the most valuable player(s) on a casino floor. For example, if a 90-day theo for each player on the floor is displayed on the UI 500, this may not be sufficient for the operator to determine the most valuable player(s) on the casino floor. Instead, the operator may want the UI 500 to display the life-to-date theo of the players on the casino floor, as this metric may be more indicative of players' value to the casino. The operator may easily make this adjustment to the UI 500 using the GCL 600.

In an embodiment, the UI 500 also tracks uncarded players. For example, if a guest loses $2K on a slot, they usually cash out of that machine and get a ticket. The operator may use the UI 500 to monitor for that ticket to show up again elsewhere to start tracking that uncarded player once again.

The UI 500 may include one or more tags 510 associated with each asset. A tag is an icon that provides a short description of what needs to be done with respect to each asset. For example, a tag associated with a guest may indicate valuable information about that particular guest. A tag associated with a device may indicate valuable information about that particular device. By providing tags on the UI 500, actionable and informative data about each asset may be more easily accessed without the operator needing to leave the screen. FIG. 8 illustrates an example list 800 of various tags that may be associated with an asset, such as a guest, and the meaning of those tags. The tags that may be associated with a guest include, but are not limited to, anniversary, birthday, declining player (e.g. declining within a particular time frame), high priority, high worth/low frequency, host code qualified, hot player, including player, multiple tags, needs host contact, on fire, recently signed up guest, and/or top 100 players. If an asset is associated with more than one tag, the tag depicted on UI 500 as being associated with that asset may be a "multiple tags" tag. Upon clicking this "multiple tags" tag, the operator may be able to view all of the tags associated with the asset in one place.

The tags depicted in the list 800 may be used to identify assets that are meaningful and require contact and/or action. For example, if the operator sees that a guest is associated with the "birthday" tag or the "anniversary" tag, the operator may know that it is that guest's birthday and/or anniversary, and may send an employee to provide that guest with a small token of appreciation, such as a free drink. Likewise, the operator may notice that a "high worth/low frequency" tag is associated with a guest on the floor, and the operator may initiate contact with that guest in order to improve their guest experience and ensure that guest's loyalty. If a guest is associated with a "needs host contact" tag, then a host associated with that guest may be assigned a task to greet the guest and make them feel welcome. Other tags other than the ones depicted in the list 800 may be used to provide helpful information about assets on the UI 500. While the tags are illustrated as being depicted on the UI 500 for dynamic floor management, the tags may additionally, or alternatively, be depicted anywhere else assets are listed, such as on asset profiles or in reports. Asset profiles are discussed in more detail below, with respect to FIGS. 12-28.

The operator may be able to sort the assets by tag. In an embodiment, the operator may be able to identify all assets associated with a particular tag and take some action with respect to those assets. For example, the operator may want to identify all "high worth/low frequency" guests on the floor. To do so, the operator may sort the list of guests by tag. All guests associated with the "high worth/low frequency" tag may be grouped together in one place so that the operator can easily identify those guests. The operator may then send an employee to interact with or greet all of these identified guests. As another example, the operator may want to identify all devices that need to be serviced. To do so, the operator may sort the list of devices by tag. All devices associated with a "needs servicing" tag may be grouped together in one place so that the operator can easily identify those devices.

The tags may be determined in a variety of different ways. In an embodiment, the tags may be determined, at least in part, using artificial intelligence (AI) and/or machine learning (ML). For example, while a "needs host contact" tag may be based on the days from when a guest was last contacted by a host, it may alternatively be based on AI or ML based on information learned about a guest over time. It may be determined that after prior host contacts, a guest increased their play or returned more frequently than prior to a host contact, which may cause the system to increase the frequency of host connectivity. If a tag is generated using AI, additional functionality may be built into the tag. For example, an AI-generated tag associated with a guest may indicate that the guest should only be called (e.g., not emailed or texted) and should not be called more often than every three days, as that is what the guest is most responsive to.

Different inferences may be drawn by the AI or ML systems if a guest seems bothered by the host contact and plays less or returns less frequently, such that that system does not trigger a "needs host contact" tag for the guest regardless of how much time goes by. In another embodiment, the tags may be determined, at least in part, using protocols, such as days, thresholds and other ways of measuring data. In yet another embodiment, the tags may be determined, at least in part, using the information contained in asset profiles. Asset profiles are discussed in more detail below, with respect to FIGS. 12-28. The tags may be determined using any combination of AI/ML, protocols, or profile information.

Figure 10:
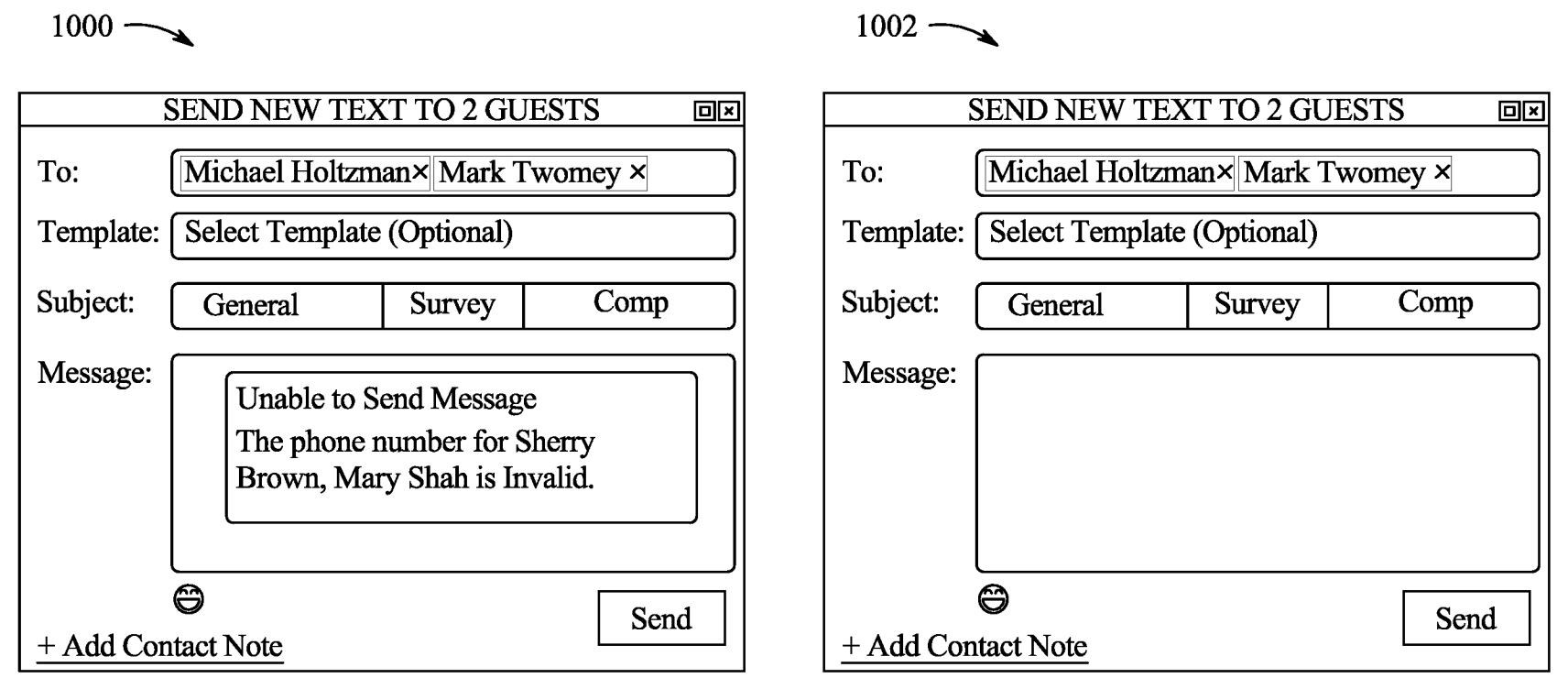
Figure 11:
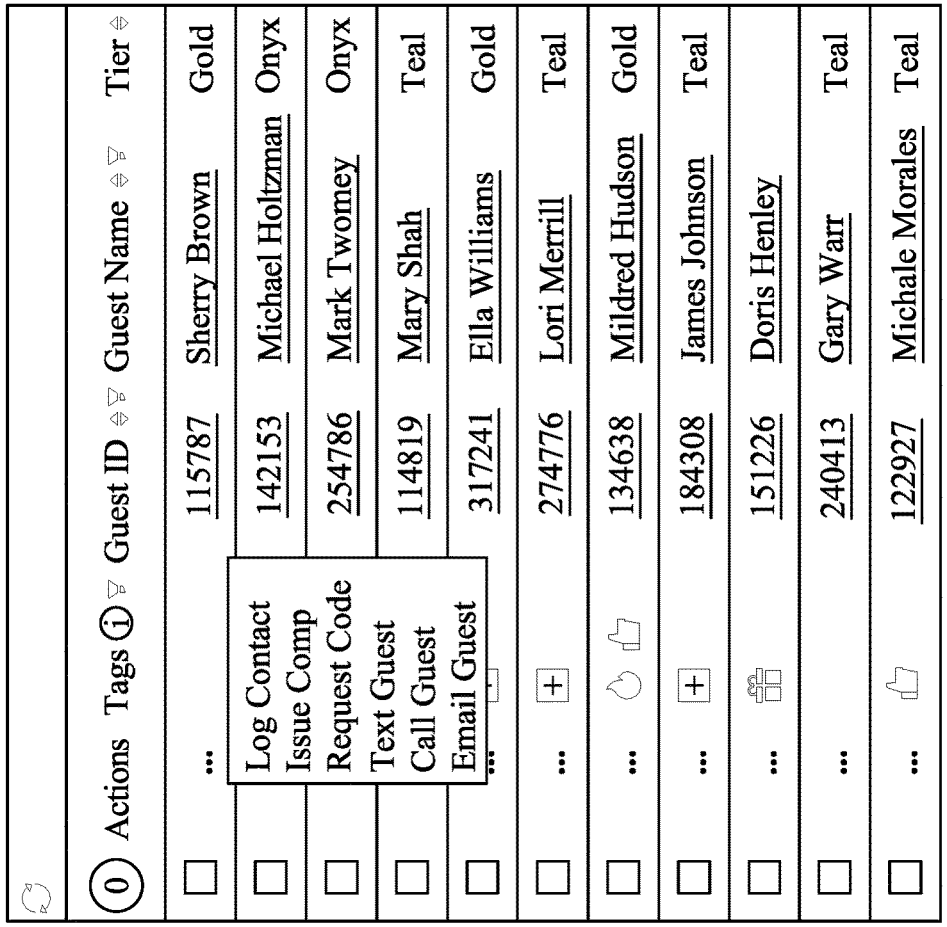
FIG. 11 is an example user interface illustrating action management.

FIGS. 9-11 illustrate example UI elements for action management. Action management may allow a service business, such as a casino, to perform one or more actions for assets. Action management may allow an operator to select one or more assets and perform some action with relation to those selected assets. For example, an operator may select one or more guests illustrated on the UI 500 and perform some action with relation to those selected guests, such as inviting them to participate in current or future event. FIG. 9 illustrates an example UI 900 depicting a selection of a group of guests. A particular guest may be selected by checking the box next to that guest's name. While UI 900 depicts a selection of a group of guests, the operator may also choose to select a single guest for action management. In another embodiment, the operator may choose to select one or more devices for action management. The operator may choose the selected assets based on any desired metric. In an embodiment, the operator chooses the selected assets based, at least in part, on the displayed tags. For example, the operator may choose all guests associated with the tag "high worth/low frequency."

Once asset(s) are selected, the operator may take some action with respect to the selected asset(s). The example UI 902 depicts actions that may be taken with respect to selected guest(s). The actions include, but are not limited to, text, email, or phone call. The contact status of the selected guest(s) may be dynamically updated when contact is completed. As also depicted in the example UI 902, the operator may be able to select and/or deselect all guests in a given list without checking the box next to each individual guest's name. If selected, the text action sends a text message to the selected guests. If selected, the email action sends an email to the selected guests. If selected, the phone call action prompts a telephone call to the selected guests. In an embodiment, one or more guests may not want to be contacted. For example, one or more guests may be labeled as "do not contact" and/or one or more guests may not have provided an email address and/or telephone number. If a guest that does not want to be contacted is selected, and an action that includes contacting that guest is selected, the operator may be alerted that the guest does not wish to be contacted.

FIG. 10 illustrates an example UI 1000 depicting an alert sent to the operator. The alert relays to the operator that one or more selected guests are not contactable. For example, the alert may relay to the operator that one or more selected guests are associated with invalid phone numbers and can therefore not be contacted. These uncontactable guests may be removed from the recipient field of the action. For example, these uncontactable guests may be removed from the recipient field of the text message, email, or phone call. The example UI 1002 depicts a text being sent to two guests, after two uncontactable guests have been removed from the text recipient field. The operator may then send a text message to these two remaining guests. Allowing the operator to send a group contact, such as a group text message, via a template facilitates efficient contact with the property's guests. Instead of spending large periods of time individually contacting players, a large number of guests may be contacted simultaneously in a matter of minutes. In an embodiment, property-owned phone numbers may be issued to host mobile devices for enabling the maintenance of contacts with guests when hosts leave.

Other actions not depicted in example UI 902 may additionally, or alternatively, be taken with respect to selected asset(s). FIG. 11 illustrates an example UI 1100 depicting additional, or alternative, actions that may be taken with respect to selected guests. For example, actions may include "log a contact," "issue a comp," and/or "request a code." If selected, the "log a contact" action may prompt the operator to log a contact associated with that guest. For example, a contact may include a contact that has been initiated with that guest, such as an employee approaching that guest, a message being sent to that guest, etc. The service business may want to log contacts with guests in order to gain a better understanding of their guests, as well as to improve the guests' experiences. The logged contacts with a guest may also be used to assign a host to that guest. The host assigned to the guest may be responsible for interacting with and building a relationship with the guest. The host assigned to the guest may be, for example, the employee that has logged the most contacts with the guest. If selected, the "issue a comp" action is selected, a comp may be issued to the selected guests. It may be determined that a guest should have a host but does not have a host. This determination may be made by protocol and/or artificial intelligence (AI). If it is determined that a guest should have a host but does not, a code may be requested from a manager. The manager may request the code by selecting the "request a code" action.

In an embodiment, "missing" guests may be determined, and actions for the operator to complete re the missing guests may be determined. A missing guest may be one that has not been to the property within a certain time frame, such as a month, two months, a year, etc., and/or a guest that has not played at the casino within a certain time frame. A service business may want to identify its missing guests so that they can incentivize and/or encourage them to return to the property and/or play at the casino. Once missing guests have been identified, actions for the operator to complete with regards to these missing guests may include, for example, modifying data in their profiles (e.g. adding comp to their profiles to incentivize them to return), contacting the missing player, and/or any other action that may incentivize and/or encourage the missing guests to return to the property and/or play at the casino.

In an embodiment, artificial intelligence (AI) may be used, at least in part, to determine whether an action should be taken with respect to an asset and/or to make recommendations about actions that should be taken with respect to an asset. For example, AI may be used to determine that a guest usually accelerates play after being contacted. If a guest usually accelerates play after being contacted, the operator and/or a host may want to initiate contact with that guest, such as via text, email, or phone call. A host may additionally, or alternatively, initiate in-person contact with that guest by locating the guest via the UI 500. A recommendation to contact this guest may be sent to the operator and/or the host. Conversely, AI may be used to determine that a guest usually does not accelerate play after being contacted. If a guest does not usually accelerate play after being contacted, contact with the guest may not be prioritized as it is unlikely to have any positive impact on that guest.

FIGS. 12-27 illustrate example UI elements for asset profile management. A profile associated with each asset of the service business may be maintained. The profile associated with a guest may include information about that guest, such as basic contact information and/or information related to that guest's visits to the property of the service business. The profile associated with a guest may include manually entered information, and/or information derived from any other source, including but not limited to play, social media feeds, third-party providers (e.g., bankruptcy and credit line), etc. The profile associated with a device may include information about that device, such as basic device information, KPI's associated with the device, and business activity associated with the device.

Figure 12:
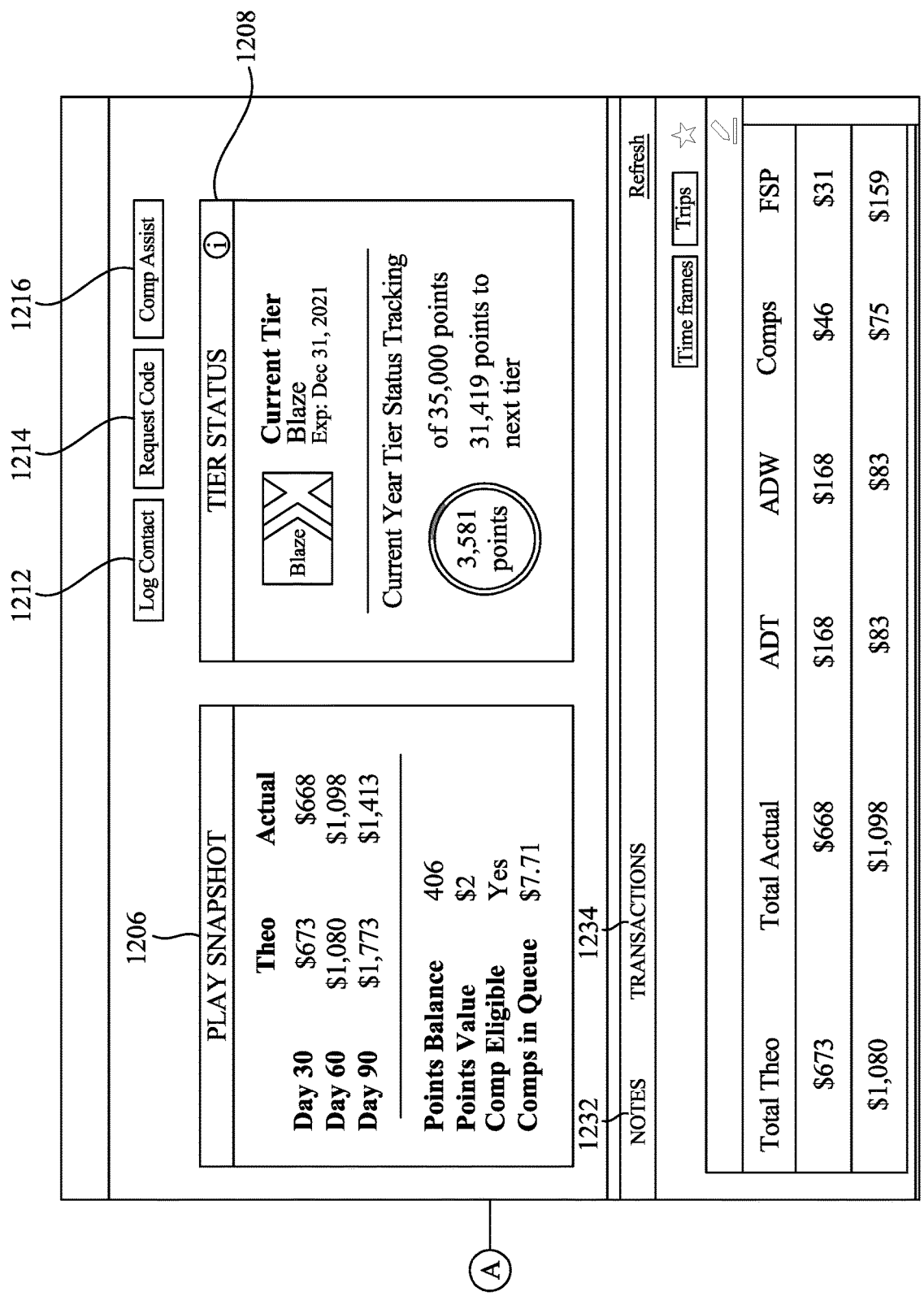
FIG. 12 is an example user interface illustrating player profile management.

The asset profiles may be surfaced on a UI, such as the example UI 1200 depicted in FIG. 12. The UI 1200 illustrates a profile for a guest. The profile may indicate a guest name 1202, general information 1204, a play snapshot 1206, and a tier status 1208. The guest name 1202 is the name of the guest. The general information 1204 indicates basic information about the guest, such as gender, birthday, membership start date, traits, host, market, last contact, and/or last play. Any other basic information that would be helpful to the service business may be included in general information 1204. The play snapshot 1206 indicates a play history of the guest, including a side-by-side comparison of actual vs. theo for various time frames (e.g., last 30 days, last 60 days, and/or last 90-days). Other information related to the play history of the guest may be included in the play snapshot 1206, such as a points balance, a points value, whether the guest is comp eligible, and/or comps in queue for that guest. The tier status 1208 may indicate a tier status of the guest, such as whether the guest is "Onyx" or "Blaze" tier (or any other tier) as well as how close that guest is to reaching the next tier.

Figure 13:
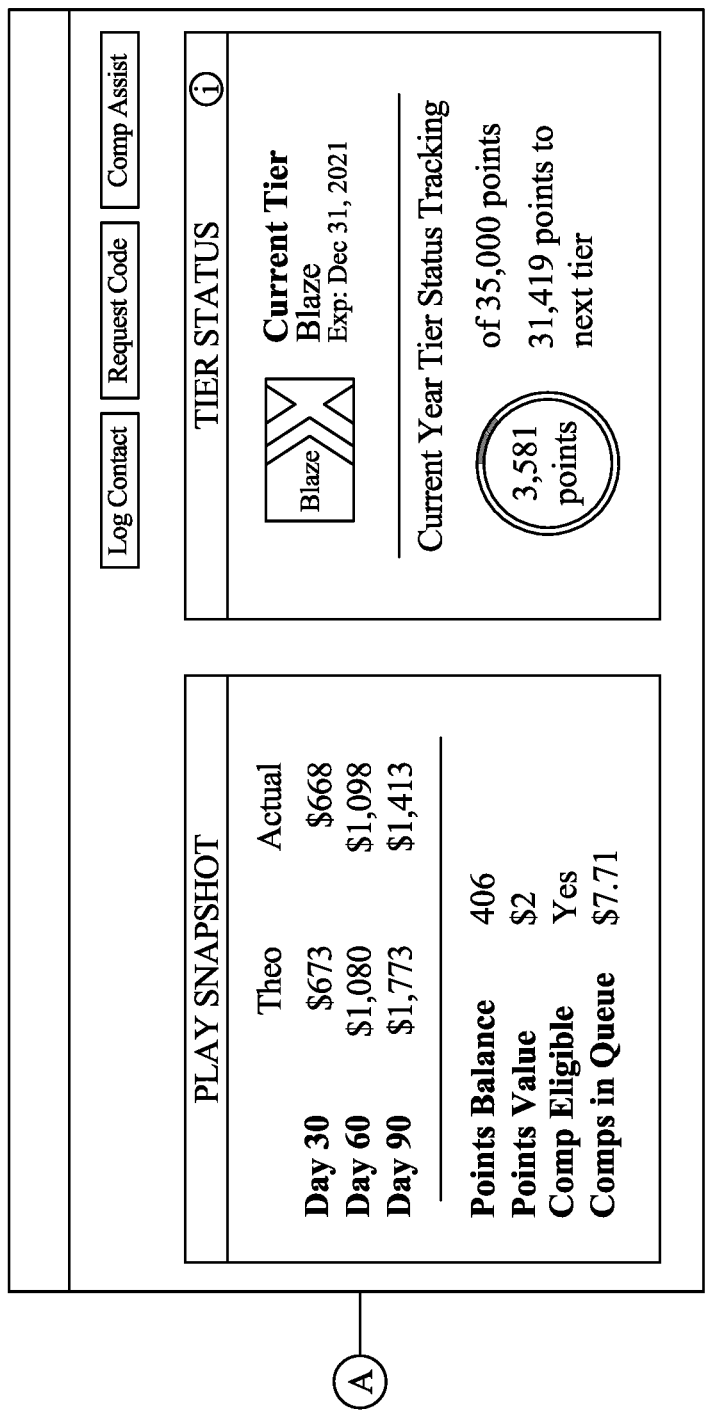
FIG. 13 is an example user interface illustrating player profile management.

A guest profile may include a photo of that guest. The example UI 1300 depicted in FIG. 13 illustrates a photo being uploaded for a guest profile. Including a photo of the guest on the profile may facilitate easier contact with that guest, as hosts are familiar with the guest's appearance and may be confident that they are approaching the correct guest on the floor. The photo may be uploaded manually, or the photo may be automatically populated, such as via internet and/or social media sources (e.g. Facebook, LinkedIn, etc.). The photo of a guest may additionally, or alternatively, appear in a search bar when that guest's name or ID number is entered.

Figure 14:
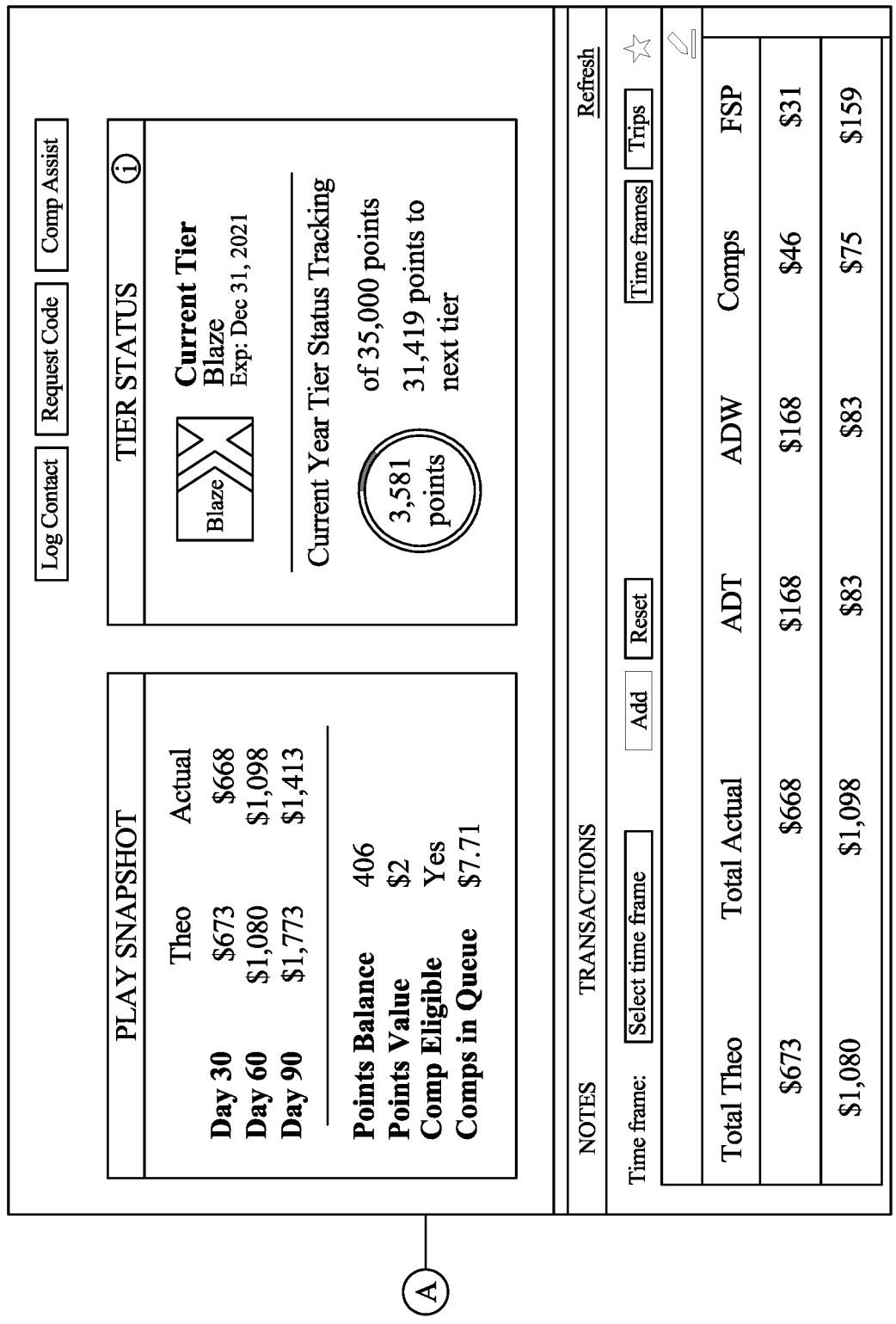
FIG. 14 is an example user interface illustrating player profile management.

Notifications may be set up for an individual guest via that guest's profile. Additionally, or alternatively, a business rule may be used to set up notifications for all users and/or all guests. The notifications may be set up for an individual user (e.g. an individual manager, host, or general manager) so that these individuals are able to best monitor their guests. In an embodiment, notifications may be set up for groups of guests. The example UI 1400 depicted in FIG. 14 illustrates various notifications that may be set up for a guest via the guest profile. For example, notifications may be turned on for a guest if the guest has a theo decline over a certain time frame (e.g. last 30-days, last 90-days, last 180 days, and/or last year). Notifications may be turned on for a guest if the guest has a decline in visits to the property over a certain time frame (e.g. last 90 or 180 days). Notifications may be turned on for a guest for the guest's initial card-in of the day, when the guest's current day theo exceeds the last 12 visits, and/or when the guest hits a taxable jackpot. Notifications other than those shown in FIG. 14 may additionally or alternatively be turned on/off for an individual guest and/or an individual user.

If the operator views a guest profile, the operator may be able to select actions that should be taken with respect to that guest directly from the profile. For example, if the operator views the guest profile as depicted in FIG. 12, the operator may be able to select one or more of the buttons 1212-1216 in order to take one or more actions with respect to the guest. Actions that should be taken with respect to the guest may be determined by AI. AI may be used to analyze aspects of the guest profile, and to determine whether an action and/or which actions should be taken with respect to the guest. For example, it may be determined that a guest is visiting from out of town based on the guest's social media feed, and a suggested action with respect to that guest may be to send a bottle of champagne to their hotel room to connect with them.

If the operator selects the button 1212, the operator may be able to log a contact with respect to the guest. FIG. 27 illustrates an example UI 2700 depicting a contact being logged with respect to a guest. As discussed above, a contact may include a contact that has been initiated with that guest, such as an employee approaching that guest, a message being sent to that guest, etc. The service business may want to log contacts with guests in order to gain a better understanding of their guests, as well as to improve guest experience. The logged contacts with a guest may also be used to assign a host to that guest. The host assigned to the guest may be responsible for interacting with and building a relationship with the guest. The host assigned to the guest may be, for example, the employee that has logged the most contacts with the guest. When logging a contact with respect to a guest, a priority may be assigned to the contact (e.g. low, medium, or high priority). The type of contact may be logged, such as whether the contact was a text, phone call, email, or in-person contact. A subject may be assigned to the contact, such as whether the contact was a general contact, a survey, or a comp. Surveys are discussed in more detail below, with regard to FIG. 24.

It may be determined that a guest should have a host but does not have a host. This determination may be made by protocol and/or artificial intelligence (AI). If it is determined that a guest should have a host but does not, a code may be requested from the operator. The operator may request the code by selecting the "request a code" button 1214. If the operator selects the button 1214, the operator may be able to view a code request dashboard with respect to that guest. The code request dashboard is discussed in more detail below, with regard to FIGS. 34-35. The operator may view information associated with comps for the guest by selecting the "comp assist" button 1216. If the operator selects the button 1216, the operator may be able to view a comp assist dashboard for the guest. The comp assist dashboard is discussed in more detail below, with regard to FIGS. 28-33.

The profile may include a play detail dashboard 1218 that includes information about the guest's casino play. The play detail dashboard 1218 provides play detail information about the guest's casino play in different views, such as time frames and/or trips. FIG. 15 illustrates an example UI 1500 depicting play detail for a guest in the time frames view. The time frames view indicates the guest's play within particular time frames, such as the last 30-days, the last 60-days, the last 90-days, the last 180-days, and/or the last year. If a particular time frame is selected, additional play detail about that time frame may be presented on the UI 1500. For example, FIG. 16 illustrates an example UI 1600 depicting additional play detail for a guest in the time frames view, after a time frame has already been selected. For example, the UI 1600 shows the month-to-date time frame has been selected, and the date Mar. 2, 2021 has been selected. Additional play details regarding the guest's play behavior on Mar. 2, 2021 is provided, such as where, when, and what the guest played on that date, as well as the slot theo vs. actual and table theo vs. actual for that date. If the operator selected any other time frame, such as QTD or YTD, more granular details about the guest's play behavior during this time may appear on UI 1600.

FIG. 15 also illustrates an example UI 1502 depicting play detail in the trips view. The trips view indicates the guest's play during particular trips to the property. The trips view may be particularly meaningful for properties that are not local, where guests only visit once or twice a year. The trips view may provide more meaningful information to the operator in order to evaluate these players. The play detail dashboard 1218 gives operators the ability to seamlessly navigate between play details associated with trips and play details associated with time frames without having to leave the screen and/or without having to manually define trip logic. All of the important metrics regarding a guest's play detail are provided in one place.

The play detail may be useful for many different purposes. For example, a guest may claim that they did not receive their points for the day. The operator may look at the guest's play details to see how much the guest played and how many points the guest earned on each of these games. Play detail may be used to determine guests that frequently play together, and these guests may be invited to the same events. Likewise, play detail may be used to determine guests that live at same address but do not frequently play together. These guests may not be invited to the same events. Play detail may also be used to create groups of players that have similar playing patterns, similar preferences, and/or the same host. These guests may be invited to events together, such as dinners, to allow them to socialize and/or network.

The play detail dashboard 1218 for a guest may be customizable by a user (e.g., manager, GM, and/or host). For example, the user may hide columns that are not meaningful and/or relevant. Additionally, or alternatively, the user may reorganize columns. Once the user has selected and/or hidden columns and/or reorganized them in a desirable manner, that view may be saved so that the user can access it at a later time, such as each time the user views that guest profile. FIG. 17 illustrates an example UI 1700 depicting different customization options for the play detail dashboard. To customize the play detail dashboard 1218, the user may select the edit button 1701. Selecting the edit button 1701 may prompt a display of a dropdown menu with different customization options for the play detail dashboard 1218. For example, selecting the edit button 1701 may prompt the display of a list of customization options for the play detail dashboard 1218. The list may include options including, but not limited to, manage columns, unhide columns, save view, select view, reset to default view, and/or manage views.

By selecting manage columns from the list, the user may be able to select which columns to display in the play detail dashboard 1218 and/or to reorganize the order of the columns displayed on the play detail dashboard 1218. An example UI 1702 depicts various column options for display on the play detail dashboard 1218. The UI 1702 depicts the columns play days, slot theo, slot actual, table theo, and table actual. The user may be able to select which of these columns they want to be displayed on the play detail dashboard 1218. Columns other than those depicted by UI 1702 may additionally, or alternatively, be selected by the user to be displayed on the play detail dashboard 1218. By selecting unhide columns from the list, the user may be able to unhide columns that were previously hidden from view. For example, the user may be able to unhide columns that the user now considers to be meaningful and/or relevant on the play detail dashboard 1218.

Once the user has selected the desired columns, the user may select the button 1703 to customize the order in which the selected columns are organized on the play detail dashboard 1218. An example UI 1702 depicts a column reorganization for the play detail dashboard 1218. The user may be able to drag and drop the selected columns to indicate the order in which the columns should be displayed on the play detail dashboard 1218. For example, if the user drags and drops the total theo column in the first position, the total theo column may be displayed first on the play detail dashboard. Once the user has selected the organization of the desired columns, the user may select the button 1705 to view the customized play detail dashboard 1218.

The user may want to save this customized play detail dashboard 1218. To do so, the user may select save view from the dropdown depicted in the UI 1700. The user may be able to save more than one different view, and each time the user returns to this player profile, the user may select a desired view from all of the different saved views. The user may be able to set a particular view as the default view, so that anytime the user returns to the player profile, the play detail dashboard 1218 will default to the desired, default view.

Figure 18:
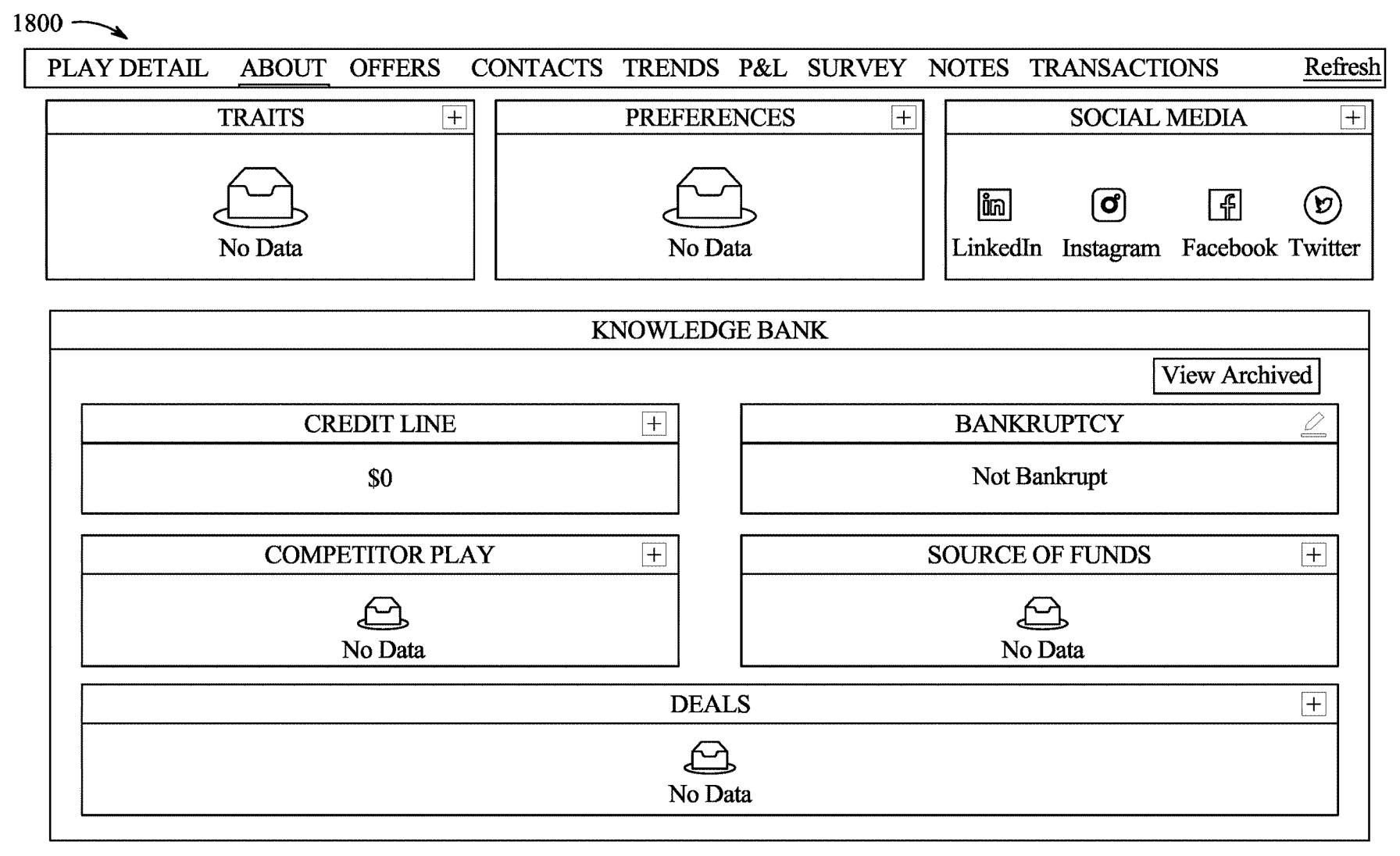

The profile may include an about dashboard 1220 that includes information about the guest's casino play. The about dashboard 1220 provides additional detail about the guest that may be useful to the service business. FIG. 18 illustrates an example UI 1800 depicting an about dashboard 1220 for a profile. The about dashboard 1220 may include details about a guest that may otherwise live in a spreadsheet, in paper notes, and/or stored on a phone of a user (e.g., manager, GM, and/or host). By including the guest detail on the about dashboard 1220, the user may not need to leave the system in order to see this information.

The detail in the about dashboard 1220 may be manually logged by a user. For example, as the user gathers detail about a guest, such as through personal interactions with the guest, the user may navigate to the about dashboard 1220 of that guest's profile and enter in the guest's information. Additionally, or alternatively, the about dashboard 1220 may be connected to third party data sources (e.g., court records, social media information, financial information) and/or internal data sources that are configured to auto-populate the details in the about dashboard 1220.

The guest detail included in the about dashboard 1220 may include guest traits. Guest traits may indicate various traits about the guest, such as whether a type of music that the guest is interested in (e.g., classic rock, rap, jazz, etc.), a job and/or profession of the guest (e.g., first responder, military, etc.), or hobbies of the guest (e.g., snowboarding, skiing, tennis, etc.). The guest detail included in the about dashboard 1220 may additionally, or alternatively, include preferences of the guest, such as drink, food, hobby, hotel, sports team, and/or game preferences of the guest. The guest detail included in the about dashboard 1220 may additionally, or alternatively, include social media information about the guest (e.g., LinkedIn, Instagram, Facebook, Twitter, etc.). The user may be able to mine the guest's social media information to better understand the guest, such as if they are living abroad. The guest detail included in the about dashboard 1220 may additionally, or alternatively, include other information, such as competitor play, source of funds, deals, and/or guest feedback.

Figure 19:
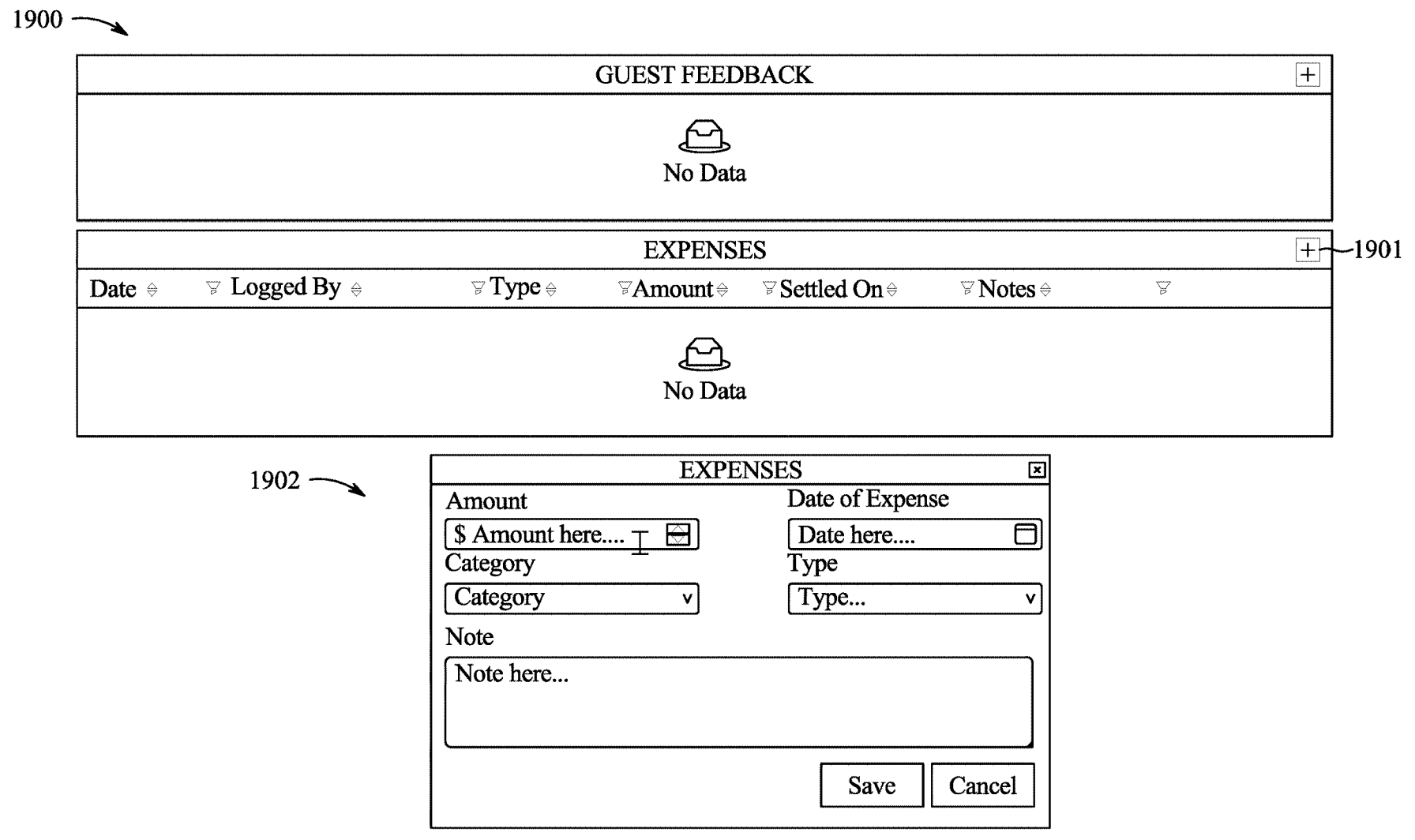

The guest detail included in the about dashboard 1220 may additionally, or alternatively, include expenses associated with the guest. FIG. 19 illustrates example UIs 1900-1902 depicting expenses associated with a guest's about dashboard 1220. Operators may incur expenses on guests. For example, operators may incur expenses on guests through gift-giving. These expenses may be logged in a central location for easy tracking. By logging the expenses associated with a guest in a central location, the operator is able to have a more accurate view of a profit or loss associated with the guest. Expenses may be manually logged. To add an expense to the about dashboard 1220, the operator may select the button 1901. The operator may then be prompted to enter an amount associated with the expense, a date of the expense, category associated with the expense (e.g., airfare, commission, discount, etc.), a type of expense (e.g., direct or indirect), and/or miscellaneous notes about an expense. Receipts may be added (e.g., uploaded) to the expense portion of the about dashboard 1220. The receipts may be used to verify the expenses. In an embodiment, the receipt may be used to auto-populate the various fields depicted in UI 1902 so that they do not need to be filled out manually.

A type of expense may indicate an impact that the expense has on the guest, such as whether the expense directly impacts that guest's reinvestment into the service business, or if the expense should be logged and kept track of, but is not likely to impact reinvestment. For example, tracking indirect expenses may enable a more granular determination of profits and losses of a guest. By tracking indirect expenses, it may be easier to determine which guests have made the property little to no money and which guests have made the property a substantial sum of money. Those guests that have made the property a substantial sum of money may be guests that should be provided with comps.

The "THEO" or theoretical loss of a player (i.e., the amount a player is expected to lose) is commonly used to determine the profitability of a player, but it only represents revenue being generated by the player and fails to take into consideration a variety of costs associated with that player that are relevant to that player's profitability to the service business. Even when some direct costs are deducted from THEO, the result may still not be a clear representation of the profitability associated with the player. Additional direct expenses, such as those entered in the dashboard 1220, may be collected by the platform 100 in order to improve the measure of profitability, such as comps, free slot play, promotions, coupons, gaming taxes paid on the losses of the player, food and beverages provided to the player on the floor (as opposed to comps). The profitability of the guest, however, may exclude indirect expenses that are not directly related to the gaming of the player. For example, if the player won a raffle for a car displayed in the casino, the value of the car would have nothing to do with the players gaming because any player could have theoretically wone the raffle. Events may also be included in direct cost, so that if there was a big party that a player attended, the cost of that event could be divided by the number of players that attend and equally applied to each one.

The profile may include an offers dashboard 1222 that includes information about offers from other systems. The offers dashboard 1222 provides all of the offers information to the operator in one central location and prevents the operator from having to leave the player profile to access the table stakes information via a different system. FIG. 20 illustrates an example UI 2000 depicting an offers dashboard 1222 for a profile. The offers dashboard 1222 includes offers. The offers dashboard 1222 depicts a compilation of offers from all of the systems that are logging offers, such as free slot play, entry into a drawing or tournament, etc. In an embodiment, the offers dashboard 1222 may depict a compilation of offers from just one system that is logging offers. In another embodiment, the offers dashboard 1222 may depict a compilation of offers from more than one system that is logging offers. The offers dashboard 1222 may include information about the status of offers, a description of offers, an amount, an offer start date and/or end date, a redemption date, and/or any other information about tables stakes that may be useful to the service business.

The profile may include a contacts dashboard 1224 that includes information about various interactions with a guest. FIG. 21 illustrates an example UI 2100 depicting a contacts dashboard 1224 for a profile. For example, the contacts dashboard 1224 may include information about various communications, such as texts, phone calls, emails, and in-person interactions with a guest. The contacts dashboard 1224 may include a verified column 2102. The verified column 2102 may indicate whether the communication in a particular row was sent via the platform 100 or not. For example, a check mark may be provided next to the contact if that contact was sent via the platform 100. The contacts dashboard 1224 may include a method column 2104. The method column 2104 may indicate whether a communication in a particular row was incoming or outgoing, part of a thread (e.g., a plurality of incoming or outgoing contacts in a single day), and/or status information. The contacts dashboard 1224 may additionally, or alternatively, include other information including, but not limited to, the subject or nature of a contact, 2106, a type of contact 2108 (e.g., text, email, phone call, etc.), a contact date, who the contact was logged by, and/or miscellaneous notes associated with a contact, such as whether a comp was offered to the guest during the contact.

The contacts dashboard 1224 may be useful for a variety of reasons. For example, an operator may want to see when a guest was last contacted for participation in a tournament. To do so, the operator may be able to pull up the contacts dashboard 1224 and find the desired information quickly. The contacts may be manually entered. Additionally, or alternatively, the contacts may be automatically added to the contacts dashboard 1224 when the contacts are made. For example, if a phone call or a text to a guest is initiated, such as through the action management capabilities of the platform 100, that phone call may automatically be added to the contacts dashboard 1224 associated with that guest's profile.

Figure 22:
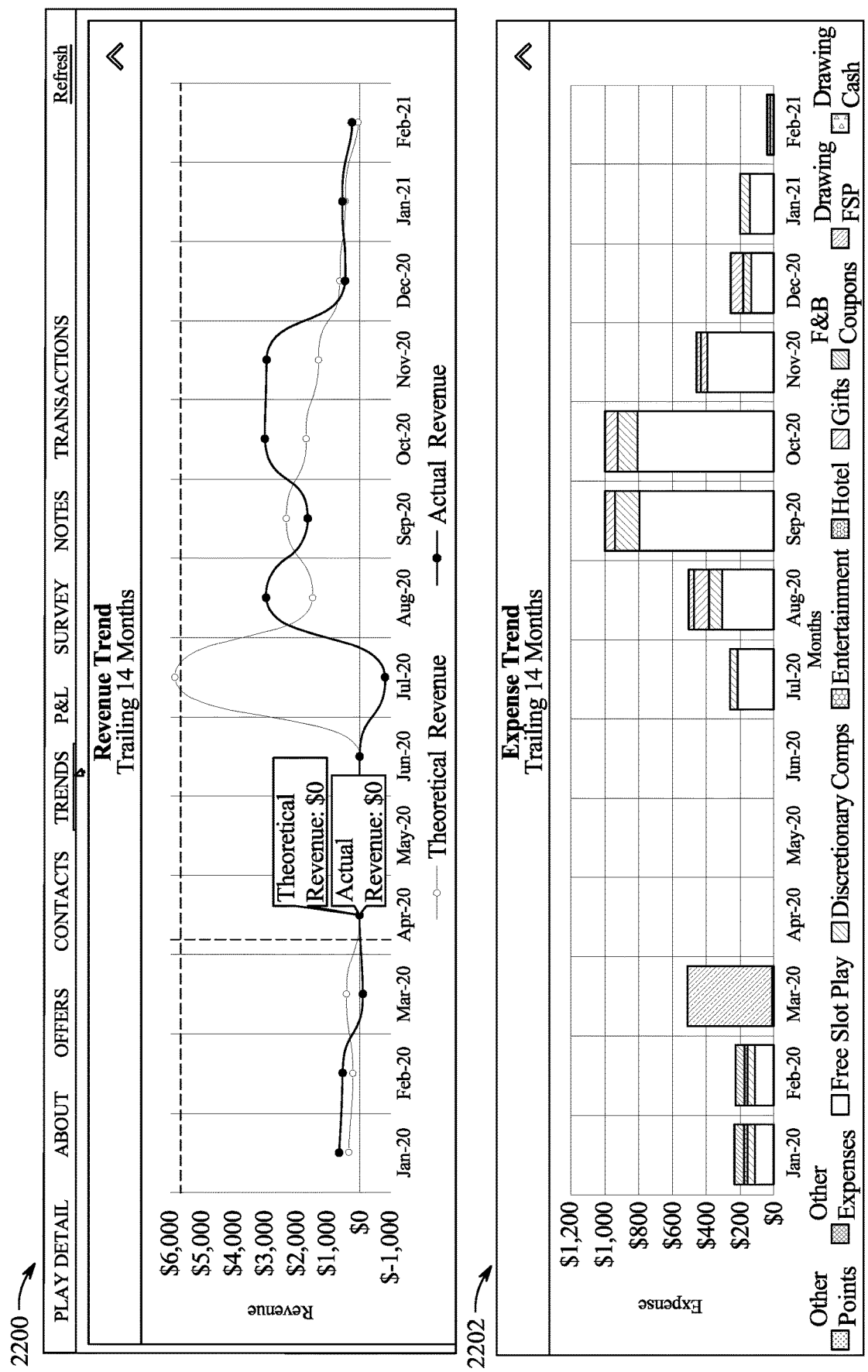
FIG. 22 is an example user interface illustrating player profile management.
Figure 22:
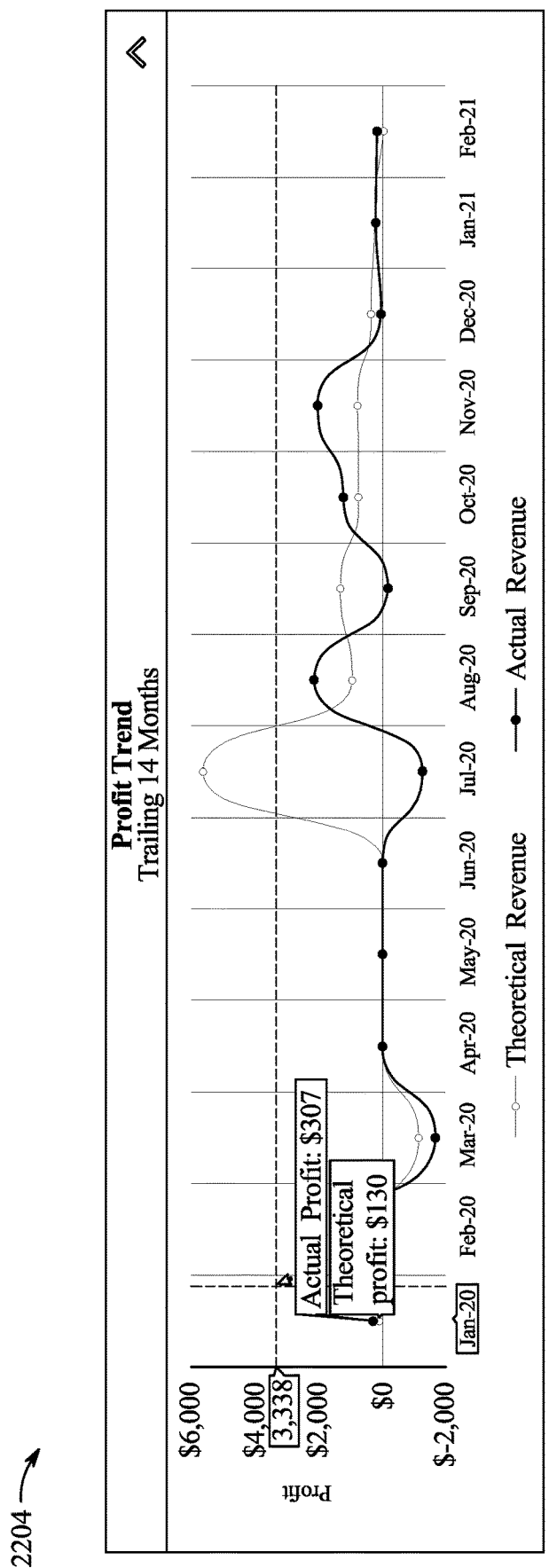

The profile may include a trends dashboard 1226 that includes information about the performance (i.e., from the service business' perspective) of a guest over time. FIG. 22 illustrates example UIs 2200, 2202, 2204 depicting a trends dashboard 1226 for a profile. Trends may be a visual version of profit and loss (P&L) information associated with a guest, such as the P&L information included in the P&L dashboard 1228 (discussed in more detail below). The trends dashboard 1226 may illustrate the performance of a guest over a particular time frame, such as the last 14 months, in a visual way (e.g., via charts and graphs.) The trends dashboard 1226 provides a user with an overview of the expenses and/or profitability associated with a player over time.

The UI 2200 depicts a revenue trend with respect to a guest over a 14-month time period. The revenue may be depicted in the form of a graph plotted on an x-y axis. The graph may depict theoretical revenue with respect to the guest and/or actual revenue with respect to the guest. If the graph depicts both theoretical and actual revenue with respect to a guest, it may be easy to visualize the difference between theoretical and actual revenue.

The UI 2202 depicts an expense trend with respect to a guest over a 14-month time period. The expenses may be broken down into various categories, including (but not limited to) free slot play, discretionary comps, entertainment, hotel, gifts, food or beverage coupons, drawing FSP, drawing cash, and/or other points and/or expenses. The expense trend may be provided in the form of a bar graph and/or any other type of visual that illustrates the expense trend with respect to a guest over time. The UI 2204 depicts a profit trend with respect to a guest over a 14-month time period. The profit trend may be depicted in the form of a graph plotted on an x-y axis. The graph may depict theoretical profit with respect to the guest and/or actual profit with respect to the guest. If the graph depicts both theoretical and actual profit with respect to a guest, it may be easy to visualize the difference between theoretical and actual profit.

Figure 23B:
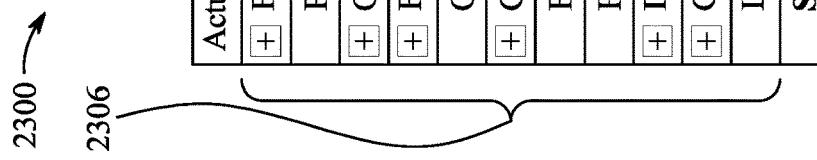
Figure 30:
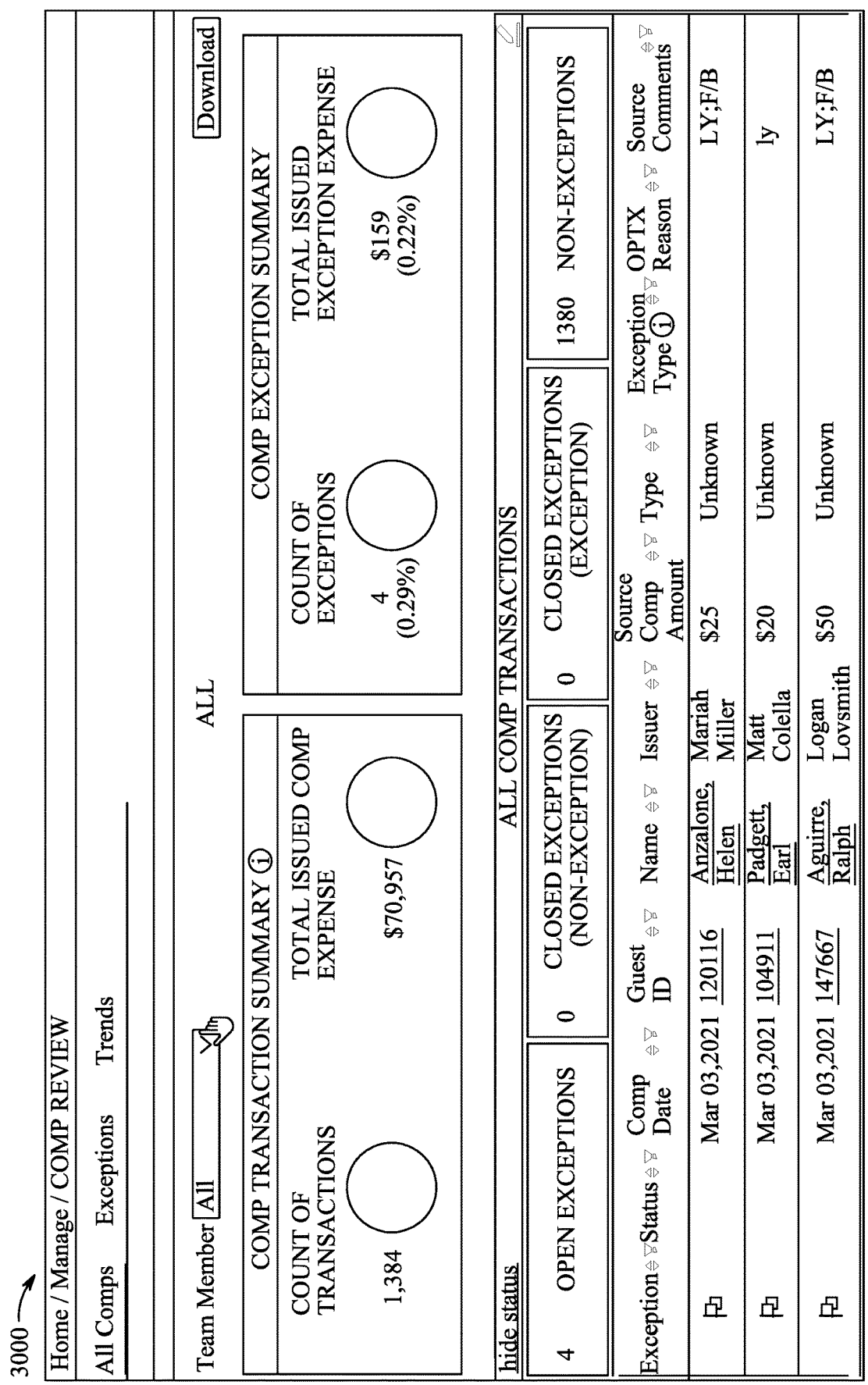
FIG. 30 is an example user interface illustrating comp management.

The profile may include a profit and loss (P&L) dashboard 1228 that includes information about the P&L data associated with the guest. FIGS. 23*a-b* illustrate an example UI 2300 depicting a P&L dashboard 1228 for a profile. The P&L dashboard 1228 provides more detail about the profits and loss of the guest than the trends dashboard 1226. The P&L dashboard 1228 may be run for any time frame. By selecting the drop-down menu 2302, the user may select a time frame, such as last 12-months, for which to run the P&L dashboard 1228. The P&L dashboard 1228 may include statistics about the performance of a guest over time, such as high-level attributes during the time frame that the user chose. For example, the P&L dashboard 1228 may include slot and/or tables statistics. The P&L dashboard 1228 may include daily averages for the guest, such as average daily theo and/or average daily actual.

The P&L dashboard 1228 may include various line items for revenue 2304 The line items 2304 may include slots and/or tables are most used. However, revenue from sources other than slots and/or tables may be included in the line items 2304. For example, race and sports may be included as a line item if such data is made available by the property. As another example, online gaming may be included as a line item as online gaming becomes more prevalent. Any revenue source for a player from incremental sources of data may be pulled together and displayed in the P&L dashboard 1228. For example, incremental sources of data may include data from any online gaming and race and sports that the property is running. By gathering all of this information into a single view, the P&L dashboard 1228 may provide a particularly useful view of the guest and the guest's performance over time.

The P&L dashboard 1228 may include various line items for expenses 2306 as shown in FIG. 23*b*. The line items 2306 for expenses may include, for example, redeemed expenses for free slot play, promotions, food and beverage coupons, gifts, entertainment, hotel, discretionary comps, gaming tax, logged expenses, other points, and/or any other type of expense. The expenses included in the line items 2306 may be generated on the property of the service business and/or those expenses generated and/or logged through the platform 100. The line items may include any expense that a guest generates. For example, event costs may be logged as a line item 2306. When creating an event or campaign, it will be easy to determine what the event cost was, and this event cost may be sent directly to the guest.

The P&L dashboard 1228 may include profit information associated with the guest. The profit information may include a total theo and a total actual profit associated with the guest. The profit information may indicate margin and/or reinvestment. The P&L dashboard 1228 may include information about indirect expenses awarded to a guest. For example, the indirect expenses awarded to a guest may include drawing free slot play (FSP), drawing cash, logged expenses, or other. The indirect expenses section of the P&L dashboard 1228 may indicate a total indirect expense awarded to the guest. The indirect expenses may or may not have been redeemed during the time frame.

In an embodiment, the P&L dashboard 1228 may be configurable to provide a P&L view for batch of guests. This may be useful, for example, to a host that wants to see his or her top players (e.g., top 10 players, top 100 players, etc.) These top players may be grouped together, and the P&L information for this group of guests may be provided in a single P&L dashboard 1228. The host may be able to generate action with respect to the group P&L, such as by sending a text, email, or phone call to all guests in the group.

The profile may include a survey dashboard 1230 that includes information about surveys that the guest has taken, such as the guest's responses to surveys. FIG. 24 illustrates an example UI 2400 depicting a survey dashboard 1230 for a profile. By logging all of this survey information with the guest's profile, the user does not have to utilize a different application in order to view survey information. As discussed above, when a contact with a guest is logged, that contact may be assigned a "survey" subject. The user logging the survey may leave comments directed to that survey. Management may be able to see what surveys have been responded to and which still need to be responded to. The survey dashboard 1230 may be integrated with an existing survey tool used by the service business. Alternatively, the platform 100 may provide a survey tool for those service businesses that do not already have a survey tool. The survey tool provided by the platform 100 may be a third-party survey tool that is integrate with the platform 100 or it may be a survey tool created especially for use with the platform 100.

The profile may include a notes dashboard 1232 that includes notes that a user has made about the guest. FIG. 25 illustrates an example UI 2500 depicting a notes dashboard 1232 for a profile and UI 2502 depicts a create note entry. The notes dashboard 1232 may mimic the functionality that exists in existing source systems, but by providing the notes along with the other guest information, the user of the system may not need to leave the system to access the notes. The notes dashboard 1232 may include notes that are intended to be internal (e.g., do not contact the guest). Notes may be global notes, personal notes, and/or notes for management. Notes may be assigned a priority (e.g., low, medium, or high priority). Notes may be assigned a subject, such as general or comp. For example, if a note is assigned the subject "comp," this may indicate that the note contains information regarding comps that have been provided to the player. The notes dashboard 1232 may be helpful for a variety of reasons. For example, a note on a guest's profile may indicate that the guest has asked for comps too many times and that comps should no longer be provided to the guest. As another example, a note on a guest's profile may indicate that the guest has requested lost and found and/or found a belonging in the lost and found.

The profile may include a transactions dashboard 1234 that includes an audit of the player account. FIG. 26 illustrates an example UI 2600 depicting a transactions dashboard 1234 for a profile. The transactions dashboard 1234 may indicate points that have been issued to a guest, comps that have been issued to a guest, name changes, address, changes, and/or any other activity or changes associated with a guest profile. The transactions dashboard 1234 may indicate dates associated with the line item transactions, team members associated with the line item transactions, a type of transaction, an amount of the transaction, and/or a reason for the transaction (e.g., food/drink comp, 72 hour comp adjustment, etc.)

The profile may include one or more flags. Flags are different than tags, such as the tags 516. Flags provide information and/or warnings about a particular player and/or a machine (both of which can be thought of as assets of the service business). Player flags may indicate, for example, that the player is on the floor and/or their location on the floor, is self-excluding, and/or does not wish to be contacted. Machine flags may include recent activity on the machine, such as a recent jackpot pay out. Conversely, tags are not warnings—rather tags provide information about player attributes.

The asset profiles may be surfaced on a UI, such as the example UI 4700 depicted in FIG. 47. The UI 4700 illustrates a profile for a device. The profile for a device may indicate details about the device, such as a manufacturer of the device, a type of device, a manufacture date, an installation date, a duration that the device has been at the property, and/or a cost associated with the device. The profile for a device may also indicate KPI's associated with the device and/or a snapshot providing an overview of the device's profitability. The profile for a device may also indicate high-volume players associated with that device. High-volume players associated with a device may include those players that frequently use that device. The profile for the device may indicate a host assigned to the high-volume players, a market associated with the high-volume players, a tier associated with the high-volume players, and/or how much money the high-volume players spent while using the device.

As discussed above, the operator may view information associated with comps for a guest by selecting the "comp assist" button 1216 on the guest profile. If the operator selects the button 1216, the operator may be able to view a comp assist dashboard for the guest. FIGS. 28-33 illustrate example UIs depicting a comp assist dashboard for a guest. FIG. 28 illustrates an example UI 2800 depicting a comp assist dashboard 2802 for a guest. The comp assist dashboard 2800 may include a variety of different comp information associated with the guest, such as a 90-day comp evaluation for the guest, comps in the queue, available point value, and/or guidance.

The guidance may indicate available comps for that guest. For example, the guidance on the comp assist dashboard 2802 indicates that the guest has $22 in available comps (e.g., $22 in the comp bucket). Some service businesses, such as casinos, may have a standard formula for the amount of comp available in the comp bucket for a guest. For example, the amount available in the comp bucket for a guest may be equal to 3% of that guest's theo. Many service businesses, such as casinos, additionally have the ability to issue discretionary comps to guests that may exceed the value of available comps in the comp bucket. However, each of the methods by which discretionary comps are issued are flawed. For example, one method involves a team member just guessing the appropriate amount for a discretionary comp. Another method involves a simple formula (e.g., 5% of last 90-day theo) that is easy for a team member to calculate. These methods lack flexibility and do not account for variables such as recency or frequency—rather they just treat all guests in the same manner.

The comp assist dashboard 2802 improves the discretionary comping process. Discretionary comping should not be one-size fits all. To treat all guests the same does a disservice to both the guests and the service business. The comp assist dashboard 2802 allows an operator to create dynamic business rules around comping, and the team member issuing the comp does not have to do any math. The business rules may be built into the back end 102 of the system 100. A service business may select from these business rules, and the back end 102 may determine the best available offer comp amount for a guest based on the business rules that the property has set up.

In an embodiment, the best available offer comp amount for a guest (e.g., $22 in FIG. 25) may be hidden so that a team member cannot see what a guest is qualified to receive. If the team member could see the best available comp amount for a guest, the team member may be incentivized to give the guest too much comp even if the guest just asks for a small amount. By hiding the amount, it may help ensure that the guest is given what they are asking for and not more—even if the guest is technically qualified for more.

A team member may utilize the comp assist dashboard 2802 to issue a comp to a guest. To issue a comp to a guest, the team member may enter a desired amount of comp into the "amount to issue" box 2804. The desired amount of comp may be any amount that the team member deems to be appropriate. If the best available comp amount is hidden, then the team member may enter a desired amount of comp into the box 2804 without regard to the best available comp amount. If a team member issues a comp that is larger than what is available, the team member may be alerted. FIG. 29 illustrates an example alert 2900 that may appear if the team member issues a comp that is larger than what is available. The alert may notify the team member that the entered amount exceeds policy. The team member may see this alert and decide that the comp amount entered into the box 2804 is too large. This may incentivize the team member to adjust the amount accordingly.

However, it is sometimes desirable for a comp to exceed the amount of best available comp. In these instances, it may be undesirable for the comp assist dashboard 2802 to prevent a team member from making a good business decision. Instead, the comp assist dashboard 2802 may be useful in that it creates accountability around these decisions. For example, if the amount entered into the box 2804 exceeds what the property has defined as acceptable, then the team member just has to justify this decision. Upon viewing the alert 2900, the team member may, instead of changing the comp amount, select the button 2904. By selecting the button 2904, the team member may be able to justify his or her decision to exceed the amount of best available comp. The team member may enter his or her reason in the notes box 2902. There may be many good reasons as to why exceeding the policy is and should be okay. For example, a guest may have been out sick for the last 90 days and be a high value guest (e.g., worth 150 k YTD). By allowing the comp to exceed the amount of best available comp, the comp assist dashboard 2802 allows the human element to play a role in the comping process.

When a comp is activated, an operator may go into the system and issue the comp. For example, a prompt may be generated to enter the comp within a fixed amount of time. The system may link the activation comp decision with the actual comp that was issued within the source. It may be desirable to have an overview of all of the different comp-related transactions happening within the property. In an embodiment, such an overview is provided by a comp review dashboard 3000, depicted in FIG. 30. The comp review dashboard 3000 provides an overview of not only comp exceptions, but all comp transactions. The comp review dashboard 3000 provides a total issuance amount and a total exception expense amount. The operator may be able to change time frames/dates and/or filters for different departments. This ability to customize allows the operator to get a very granular view of a time period of interest. For example, this report may be run every day for the previous day and sent to a GM if the GM wants to understand what happened during the previous day.

While the comp review dashboard 3000 provides an overview of all comp-related transactions happening within the property, it also provides a more detailed look at exceptions. Specifically, in an embodiment, the comp review dashboard 3000 provides a view of comp assist (e.g., time and date snapshot) of what a team member saw when they made that comping decision. FIG. 31 illustrates an example time and date snapshot 3100 of what a team member saw when issued a comp that exceeded policy. For example, the snapshot 3100 shows that the team member saw that the property had an actual loss of $4,347 on this guest when the comp was issued. The snapshot 3100 also shows that the team member saw that the guest only had $151 in theo when the comp was issued. The snapshot 3100 also shows that the team member saw the guest had $37 in points available. However, the team member still decided to issue a $35 comp to the guest.

The operator viewing this snapshot 3100 may decide that this guest did not qualify for the $35 comp and may close this comp as a true exception. The operator may then be able to take action with respect to the team member that issued the comp. For example, the team member that issued the comp may be called in for a discussion in order to help him or her make better comping decisions going forward. In an embodiment, the comp review dashboard 3000 may be used to group comp-related information by team member or department to better identify issues that need to be addressed. For example, the comp review dashboard 3000 may be used to determine which team member and/or department typically generates exceptions. This team member and/or department may need more training. Without access to the kind of data provided by the comp review dashboard 3000, the service business may just decide to cut its comp policy in half, to reduce the amount of comps that may be given out, or to turn off comps all together. However, these behaviors will impact all guests negatively, including the valuable guests. The comp review dashboard 3000 gives operators the tools they need to make necessary changes at a more personalized, individual scale as opposed to changes that impact the overall business.

Figure 32:
FIG. 32 is an example user interface illustrating comp management.

The comp review dashboard 3000 may include an exceptions tab that allows an operator to view all open exceptions that need to be reviewed. FIG. 32 illustrates an example exceptions tab 3200 that lists open exceptions that need to be reviewed. The exceptions tab 3200 may provide one or more of a status of the exception (e.g., open), the date of the comp, the guest ID and/or name, the team member that issued the comp, the amount of the comp, a type of the comp, why the comp is an exception (e.g., exceeds policy), a reason for the exception, and/or notes about the comp. An operator may be able to review the list of open exceptions.

Figure 33A:

The comp review dashboard 3000 may include a trends tab that provides an overview of revenue and expenses relative to comp for a guest. FIGS. 33*a-b* illustrate an example trends tab 3300 for a guest. The trends tab 3300 allows an operator to get a good feel for comp reinvestment. For example, the trends tab 3300 may be utilized to determine comp reinvestment year over year or month over month. The operator may drill down to a partial month or a full month. In an embodiment, the data provided in the comp review dashboard 3000 may be graphed. The graphs may provide the operator with a visual overview of revenue and expenses relative to comp for a guest.

As also discussed above, it may be determined that a guest that does not have a host should have a host. This determination may be made by protocol and/or artificial intelligence (AI). If it is determined that a guest should have a host but does not, a code may be requested by the operator. The operator may request the code by selecting the "request a code" button 1214 on the guest's profile. If the operator selects the button 1214, the operator may be able to view code request dashboard with respect to that guest.

An exemplary code request dashboard 2702 is illustrated in FIG. 27. The exemplary code request dashboard 2702 provides the requesting party with the ability to request different types of codes. For example, the requesting party may request either a "p-code" (e.g., prospect code) or an "a-code" (e.g., active code). Before a team member may be coded to a guest, the team member may need to establish a relationship with the guest. While the team member is establishing a relationship with a guest, the team member may request a p-code, or prospect, for the guest.

When requesting a p-code, the team member may leave notes for his or her manager. These notes may provide evidence of the team member's interactions with the guest, so that the manager may evaluate whether that team member is actually beginning to establish a meaningful relationship with the guest. For example, a note from a team member may indicate that the team member made his or her first introduction to the guest, gave the guest his first comp, found out the guest's preferences and logged them, etc. The manager may be able to review the notes associated with the team member that is requesting the p-code and accept/deny the p-code request(s) via the coding manager dashboard, discussed below in more detail. If a team member is given a p-code for a guest, no other team member may be able to be coded to that guest.

When the team member has already prospected a guest, the team member may want to request that the p-code be converted into an active code, or a-code, for the guest. The team member may want to request that the p-code be converted into an a-code when the team member feels that he or she is truly driving incremental value and loyalty to the service business's property because of his or her relationship with this particular guest. For example, the team member may want to request that the p-code be converted into an a-code when he or she feels that the relationship with the guest is past the introductory stage and has now become a more meaningful, long-lasting relationship.

When requesting an a-code, the team member may leave notes for his or her manager. These notes may provide evidence of the team member's interactions with the guest, so that the manager may evaluate whether that team member has actually established a meaningful relationship with the guest. For example, a note from a team member may indicate that the team member has had five visits with a guest, invited him and his family in for dinner, etc. The manager may be able to review the notes associated with the team member that is requesting the a-code and accept/deny the a-code request(s) via the coding manager dashboard, discussed below in more detail. If a team member is given an a-code for a guest, no other team member may be able to be coded to that guest.

The code request dashboard 2702 modernizes the coding request process. Traditionally, coding request may have been done by email or via paper form. Both of these techniques for coding requests are time consuming and inefficient. By integrating the code request dashboard 2702 directly into the platform 100, the coding request process is easier, and more efficient. A team member may request a code for a guest by simply visiting the guest's profile and selecting the button 1214.

While team members may be able to request p-codes and/or a-codes for various guests that visit the property, managers may be able to review and/or accept/deny these requests from the team members. To do so, a manager may visit the coding manager dashboard. An exemplary coding manager dashboard 3400 is illustrated in FIG. 34. The coding manager dashboard 3400 queues up all of the requests (p-code requests and/or a-code requests) that a team member or host has made, into a single view. Additionally, or alternatively, the coding manager dashboard 3400 may queue up all of the requests (p-code requests and/or a-code requests) that his or her entire host team has made, into a single view.

The manager may review the queue of requests and may approve or deny each of the pending requests. Once approved or denied, the request may be removed (manually and/or automatically) so that it is no longer shown in the queue. To determine whether a pending request of a team member/host should be approved or denied, the manager may click on that pending (e.g., not yet reviewed) request. Upon clicking on the pending request, the manager may be presented with a play evaluation for the guest associated with the pending request. FIG. 35*a* shows an exemplary play evaluation dashboard 3500 for a guest. The play evaluation dashboard 3500 provides a manager with a good sense of what this particular guest is worth to the service business's property. For example, the play evaluation dashboard 3500 includes the daily ADW and ADT for the guest, all theo and actual profits for the guest for slots and/or tables during different time periods, all expenses associated with the guest during different times periods, and total theo and actual profit associated with the guest.

Upon clicking on a pending request, the manager may additionally, or alternatively, be presented with a contact evaluation for the guest. FIG. 35*b* shows an exemplary contact evaluation dashboard 3502 for a guest. The contact evaluation dashboard 3502 provides the manager with an overview of all contact that has been had with this particular guest. The manager may use the contact evaluation dashboard to determine whether a request should be approved or denied. The manager may be able to see all contacts that a requesting host has had with a guest in a single view. Additionally, or alternatively, the manager may be able to see all contacts that all hosts or team members have had with this guest. If a requesting team member has logged two contacts with this guest, but the manager sees, via the contact evaluation dashboard 3502, that amongst all hosts or team members there have been fifty contacts logged with respect to this guest, the manager may be able to determine that all hosts are talking to this guest, and that the requesting team member's request may be denied. Conversely, if the requesting team member is the only team member/host that has been contacting a particular guest, the requesting team member's request may be approved.

The contacts shown in the contact evaluation dashboard 3502 may indicate hotel reservations that have been made for the guest. For example, the contacts shown in the contact evaluation dashboard 3502 may indicate hotel reservations that have been booked for the guest by the requesting host, all hosts, or in general by all team members. This may allow the manager to see what type of activity the requesting host is doing with respect to the guest. The contacts shown in the contact evaluation dashboard may include other types of contact or activity that team members have with respect to a guest, including but not limited to, event RSVPS, event confirmations, restaurant reservations booked, and gifts awarded. Any activity or contact that may be used to see if a host is truly building a relationship with a guest may be logged in the contact evaluation dashboard 3502.

Figure 35C:

Upon reviewing the play dashboard 3500 and/or the contact evaluation dashboard 3502, the manager may make a decision with regard to the request (p-code or a-code request). FIG. 35*c* illustrates an exemplary response dashboard 3504. The manager may use the response dashboard 3504 to log a response to a request. The response may indicate that the request is approved or denied. The response may alternatively indicate that the manager needs to revisit the request. The manager may leave comments regarding his or her chosen response. For example, the manager may leave comments regarding why a request was denied, approved, and/or requires a revisit. When the manager fills out the response dashboard 3504, the requesting host may be notified of the manager's decision and/or the corresponding note(s).

Figure 36:
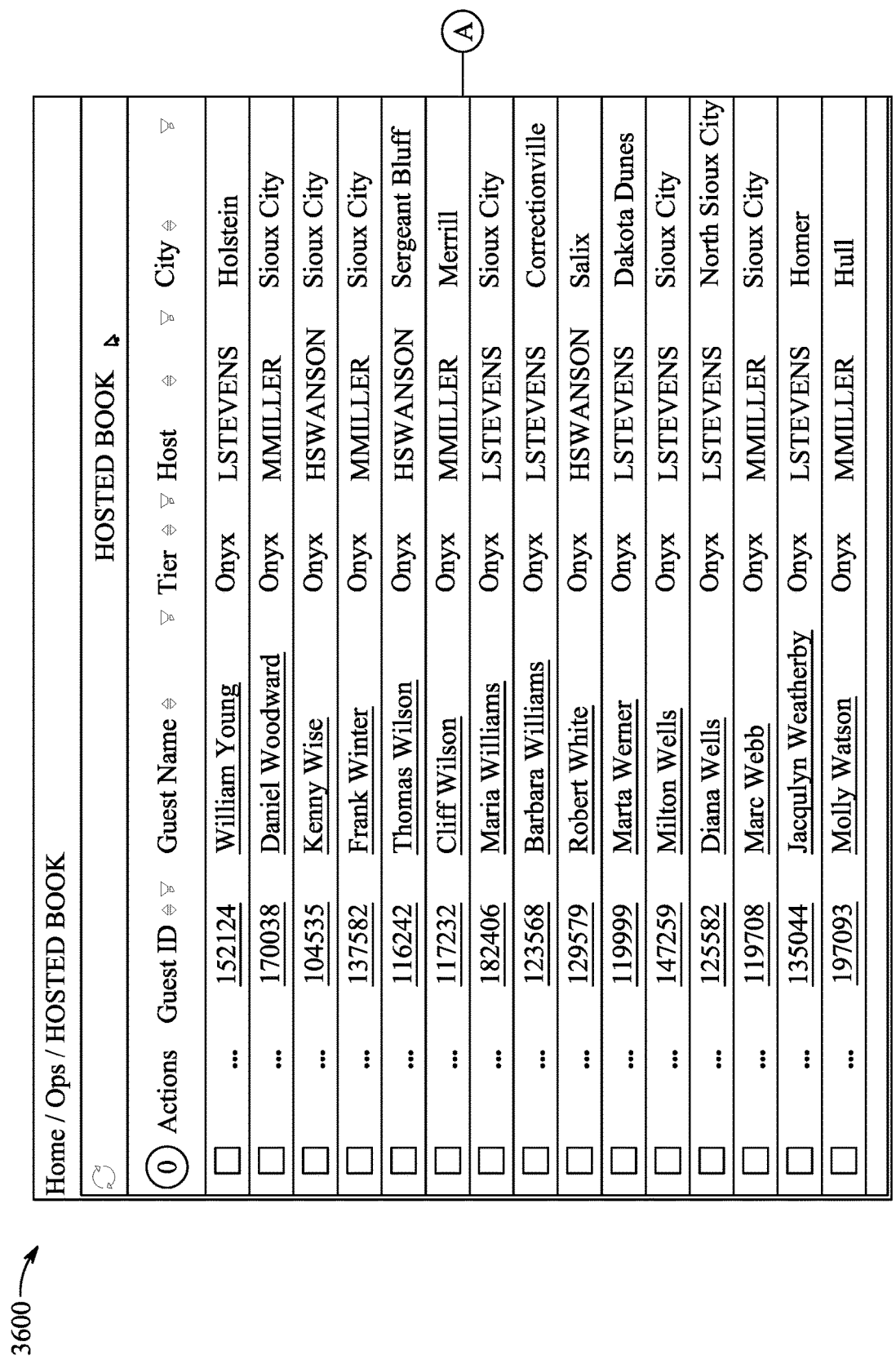
FIG. 36 is an example user interface illustrating player development.

A host may be able to view all guests that are coded to him via a hosted book dashboard. FIG. 36 illustrates an exemplary hosted book dashboard 3600. The hosted book dashboard 3600 displays all guests that are coded to a host. The host may use the hosted book dashboard 3600 to take actions with respect to the guests in the list. For example, the host may be able to select one or more guest names and initiate a call, e-mail, or text message to these selected guest(s). As another example, the host may be able to use the gaming column library (GCL), discussed above, to add attributes and/or variances to the list of guests or defined groups of guests. As yet another example, the host may be able to create a group P&L (as discussed above) with respect to a group of guests that are hosted to him.

Figure 37:
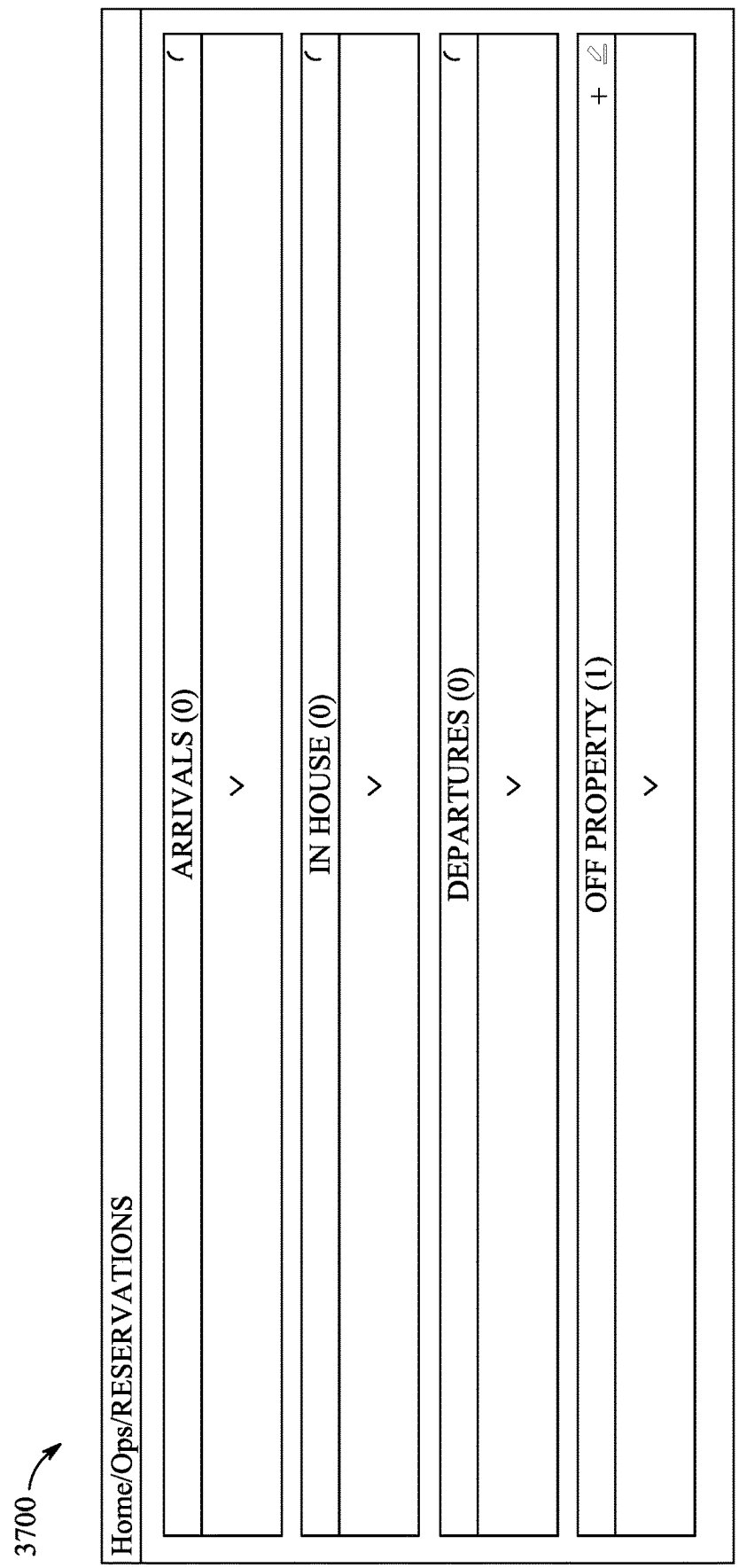
FIG. 37 is an example user interface illustrating player development.

A host may be able to view which guests that are coded to him/her are on the property and/or arriving and/or departing from the property via a reservation dashboard. FIG. 37 illustrates an exemplary reservations dashboard 3700. The reservations dashboard 3700 allows a user to view who is in house, arriving, and departing, without ever having to the leave the system. The reservations dashboard 3700 may be coupled to a hotel management system to see which guests are arriving soon, which guests are on the property, and which guests are going to be departing. Alternatively, or additionally, AI may be used to make predictions about which guests are arriving, on property, or departing using data about the guest(s). The reservations dashboard 3700 may include off-property guests that are staying at hotels located off of the property as not all casinos have an on-property hotel or the on property hotel may be fully booked so overflow guests are accommodated elsewhere.

The reservations dashboard 3700 may have similar functionality to the dynamic floor monitoring UI 500, discussed above. For example, the reservations dashboard 3700 may include a GCL feature on each of these cards (e.g., arrivals, in house, and/or departures) so that a user may add play information, attribute information, and/or variance information on any of these lists of guests. Actions may also be taken with respect to guests in any of these lists. Actions may include, for example, initiating a call, text, and/or email to the guests in any of these lists.

An operator may be able to manage lists of guests. The operator may be able to specify which guests should be included in the list(s). FIG. 38 illustrates an exemplary list management dashboard 3800 for managing lists of guests. Once generated, the list(s) of guests may be used for marketing, creating events and/or campaigns, and/or to manage tasks with respect to the guests in the list. The operator may be able to create a list of guests or group of guests that meet certain criteria.

As shown in the list management dashboard 3800, the operator may be able to select which columns should be viewable in the list. The columns may include, for example, guest ID, guest first name, guest last name, address, city, state, zip code, etc. These selected columns will appear in the actual list of guests that will be generated from criteria. The operator may also be able to select suppressions (e.g., guests that should be excluded from the list). Examples of guests that should be excluded from the list include banned guests, guests that have asked not to be contacted, guests that have asked not to be mailed, and/or guests that do not have a valid address associated with them.

In addition to, or as an alternative to, selecting the columns and/or the suppressions, the operator may be able to build an audience that meets certain criteria. FIG. 39 illustrates an example audience creation dashboard 3900. The operator may add one or more criteria items. The criteria items may include one or more attributes or metrics. Exemplary attributes that may be added include city, state, zip code, market, birthday month, gender, and/or current tier. For example, if the "city" attribute is added, the operator may be able to specify a particular city, such as Las Vegas, that the guests in the list should have an address in. Exemplary metrics that may be added include slot theo win, slot actual win, and/or slot session time. For example, if the "slot theo win" metric is selected, the operator may be able to specify that guests in the list should have a slot theo win that is worth $1 k or more YTD (or any other amount).

More than one attribute and/or metric may be added to the criteria. For example, both an attribute and a metric may be added if an operator wants the list to include guests that both live in Las Vegas and have a slot theo win that is worth $1 k or more YTD. Additionally, or alternatively, more than one metric may be added to the criteria. For example, more than one metric may be added if the operator wants the list to include guests that have a slot theo win that is worth $1 k or more YTD and have an average ADT of at least $250 YTD. The operator may also specify that the list should include guests that have a slot theo win that is worth $1 k or more YTD or have an average ADT of at least $250 YTD. One or more attributes may be added to the criteria in addition to the one or more criteria. The audience creation dashboard 3900 is user-friendly as it allows an untrained person (e.g., not a data scientist) to quickly generate a list of guests that fit certain criteria.

When the criteria have been specified, but before the list of guests is generated, the operator may be able to view how many guests would be added to the list once generated (based on the selected criteria). The operator may be able to select the "run counts" button on the audience creation dashboard 3900 to see how many guests fit the selected criteria. For example, the operator may see that six-hundred guests fit the selected criteria. If the operator wants a smaller or larger list of guests, then the operator may adjust the criteria accordingly. For example, if the operator wants a smaller list of guests, the operator may add one or more additional metrics and/or attributes. Conversely, if the operator wants a larger list of guests, the operator may remove one or more previously selected metrics and/or attributes.

Once generated, the list may be saved and/or exported. The list may eventually be used to create a campaign, an event, and/or to start assigning your hosts. Actions may be taken with respect to an entire list of guests and/or a portion of guests in the list. For example, all guests in the list may be called, texted, or emailed. A manager may be able to create a task with respect to the list. For example, a manager may create a task for his or her team members to complete with respect to the guests on the list (e.g., initiate contact with these guests, issue them a comp, invite them to an event, etc.)

Figure 40:
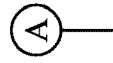
FIG. 40 is an example user interface illustrating task management.
Figure 41:
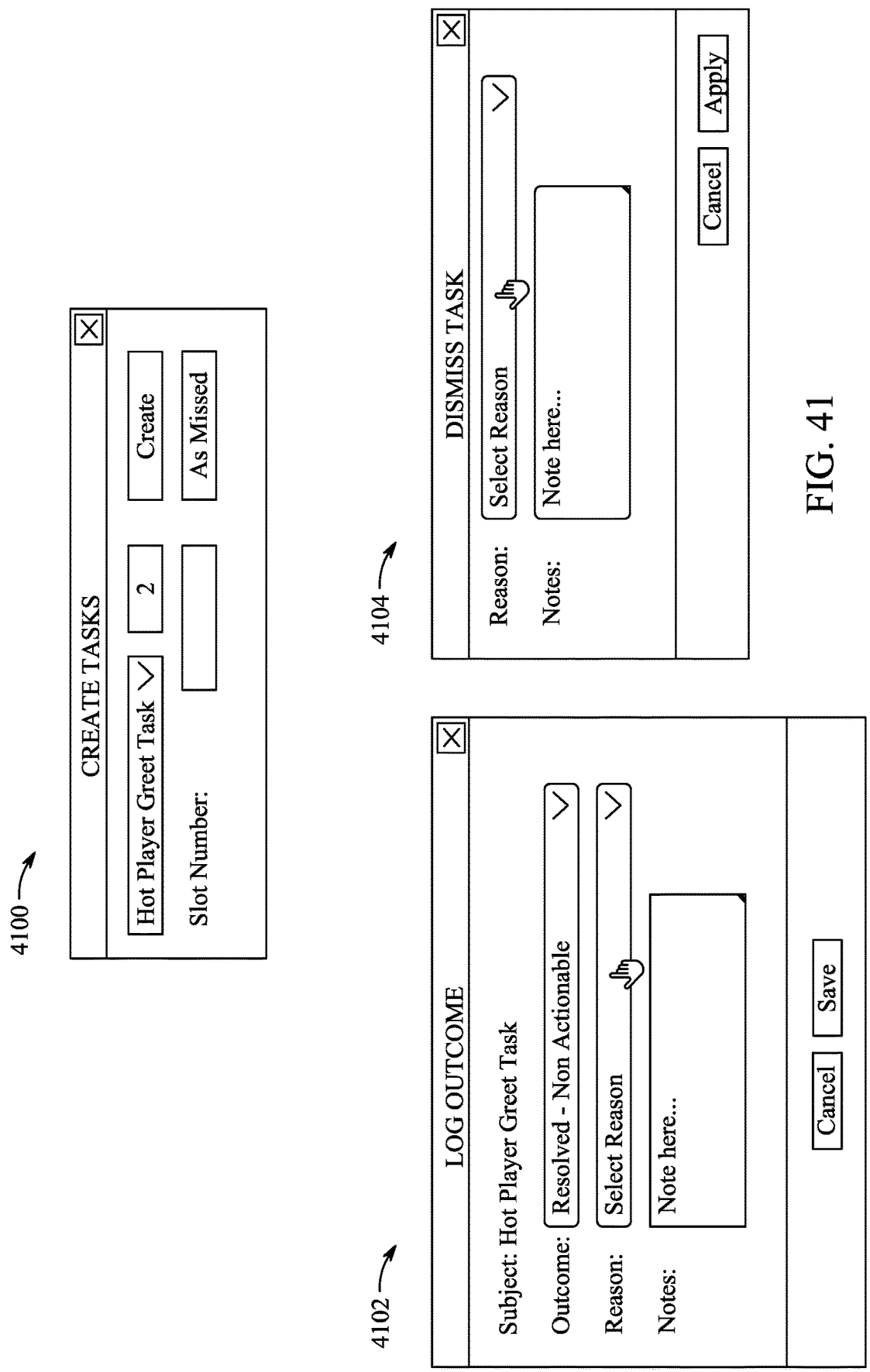
FIG. 41 is an example user interface illustrating task management.

FIGS. 40-42 illustrate example UI elements for task management. Task management may allow an operator to manage tasks that need to be completed. For example, the tasks may include tasks that a host and/or a team member needs to complete. FIG. 40 illustrates an example task management dashboard 4000. The task management dashboard 4000 may be used by an operator to manage one or more different types of tasks, such as real-time tasks and/or scheduled tasks. The task management dashboard 4000 is helpful because it clearly lays out the actions that need to be taken so that the property does not have to manage the tasks on its own. The task management dashboard 4000 also provides a feedback loop to the platform 100 that allows the service business to measure its performance.

The tasks may be autogenerated using a protocol and/or AI or machine learning. If the tasks are autogenerated, they may be automatically sorted into a bucket based on type of task (e.g., real-time or scheduled). The service business may be able to define, at least in part, the rules of the business logic used to determine the tasks. Additionally, or alternatively, the tasks may be manually generated, such as by the operator.

Tasks may be associated with assets. Tasks associated with a device may include servicing the device, taking the device off line, moving the device, changing the appearance of the device (such as updating the art work, name, the game it plays, or some other aspect), paying out a jackpot from the device, changing the paper of the device, emptying the note stacker of the device, or any other action that needs to be taken with respect to a device. Tasks associated with a guest may include greeting the guest, calling the guest, texting the guest, emailing the guest, issue a comp to the guest, requesting a code for the guest, or any other action that needs to be taken with respect to a guest. A task associated with a guest may be generated based on occupancy information associated with a device. For example, occupancy information associated with a guest's most-played device may indicate that the device is not occupied. A task may then be generated to invite the guest to play at that device.

Real time tasks are those tasks that require immediate action. For example, a real time task may be greeting an important guest on the property, such as a hot player on the casino floor. As another example, a real time task may be servicing a machine or equipment that is malfunctioning, such as a bill validator that is having an error. Conversely, scheduled tasks are those tasks that do not necessarily require immediate action. Rather, a scheduled task may be completed at a later time or within a set time period, and its completion is not as urgent as the completion of a real time task. For example, a scheduled task may include tasks such as identifying actionable players or machines that require attention.

As discussed above, a task may be manually created. FIG. 41 illustrates an exemplary task creation dashboard 4100. The task creation dashboard 4100 may prompt the user that is creating the task to add a title for the task, such as "greet a hot player." The task creation dashboard 4100 may additionally prompt the user that is creating the task to add a location associated with the task. For example, if the task is to greet a hot player on the casino floor, the user creating the task may add the machine that the hot player is at. As another example, if the task is to service a device, the user creating the task may add the location of the device that needs to be serviced. Once a task is created, anyone that has the right permissions for that type of task (or has permission for tasks in general) will get a notification of the task.

The first person to accept the task may be the person that the task gets assigned to. Other individuals that have received the notification of the task may no longer be able to accept the task after the first person accepts the task. Once the individual has accepted the task, he or she may go and complete the task. For example, if the task was to greet a hot player on the casino floor, the individual that accepted the task may go greet the hot player on the casino floor. To identify individuals to send task notifications to, users that are on network may be identified, users that are on network with a MAC address may be identified, users that are off network with a MAC address may be identified, and/geofencing with mobile devices may be utilized.

The individual may complete the task and log the outcome of the task. FIG. 41 also illustrates an exemplary outcome log 4102 for task management. The individual may use the outcome log 4102 to log the outcome as either actionable or non-actionable. For, example, an outcome of the task to greet a hot player may be logged as nonactionable if that hot player was a known player that is not interested in playing with a card (so a player's card was not issued to), if the hot player was no longer at the identified location, or any other reason that action did not need to be taken with respect to the task. An outcome of the task may be logged as actionable if the individual took some action with respect to that task. For example, the outcome of the task to greet a hot player may be logged as actionable of the individual signed the hot player up for a player's card. The individual that is completing the outcome log 4102 may leave notes associated with the outcome of the task.

If an individual accepts a task but then is no longer able to complete the task, the individual may be able to dismiss the task. To dismiss a task, the individual may be able to use the task dismissal dashboard 4104. The individual may explain why he or she needs to dismiss the task and may leave any additional notes that the individual finds to be necessary or helpful. For example, if an individual accepts a task and then gets pulled into a meeting and can no longer complete the task, the individual can use the task dismissal dashboard 4104 to dismiss the task. When the individual dismisses the task, the task may become reopened for someone else to accept. For example, another notification may be sent to those eligible to accept the task, and a new individual may accept the task.

If a task is to contact a player, the individual that has accepted the task may be able to respond to that task and complete it. FIG. 42 illustrates an exemplary task creation dashboard 4200. The individual that has accepted the task may be able to take action (e.g., complete the task) directly within the UI. For example, the individual may call, text, email, issue a comp, request a code, etc. directly within the UI 4200 via the buttons 4202. The task creation dashboard 4200 may also display follow-up and log outcome options. The individual that accepted the task may be able to click the "log outcome" button next to a task to log the outcome of that particular task. The outcome of the task may be logged as actionable or unactionable. For example, an individual that accepted a task to contact a guest may have completed the task by emailing the guest. The guest may email back saying he moved out of the country. The outcome of the task may be logged as resolved and nonactionable. By logging the outcome as unactionable, it may be memorialized that this guest is nonactionable and should not keep being shown as a missing player.

The history of each task, either real time or scheduled, may be viewable. For example, the date when a task was created may be viewable. The due date for each task may additionally, or alternatively, be viewable. The due date for a task may be changed if the task no longer needs to be completed by the original due date. Additionally, tasks may be dismissed if they should not be completed or no longer need to be completed. For example, an operator may dismiss tasks that he or she does not agree with.

While flags and tags have been discussed above in relation to a few of the UI slices, flags and/or tags may appear on any interface (i.e., UI slice) and may be interactively generated within the system. As discussed above, flags are associated with assets, such as guests and machines and provide information about the asset. The flag may just be informative, or the flag may lead to a task being generated. Flags provide real time information regarding what is going on at the property at that moment, such as a guest has arrived and has carded in somewhere, or that a guest that is self-excluding has shown up and needs to be asked to leave, or that a guest does not want to be contacted so no tasks should be generated related to the guest, or a jackpot has been paid out.

Tags are not a static metric for an asset. Rather a tag is calculated and analyzed on a short interval basis and provided in a tag form so that an operator is able find that guest or machine. For example, the operator may be able to use tags to identify a declining player. Typically, a property may have to look at a report that is 90 days old. However, the tags utilized in the platform 100 pull this information off of the report and put it as an attribute on that asset. As a result, any time the operator is looking at a UI slice, such as at an asset profile or floor monitor, and sees a tag, the operator can go take some action with respect to that tag immediately. The operator does not need to wait for a report that reveals a guest's variance of play over a period of time. As another example, a tag could drive a host code change.

Figure 43:
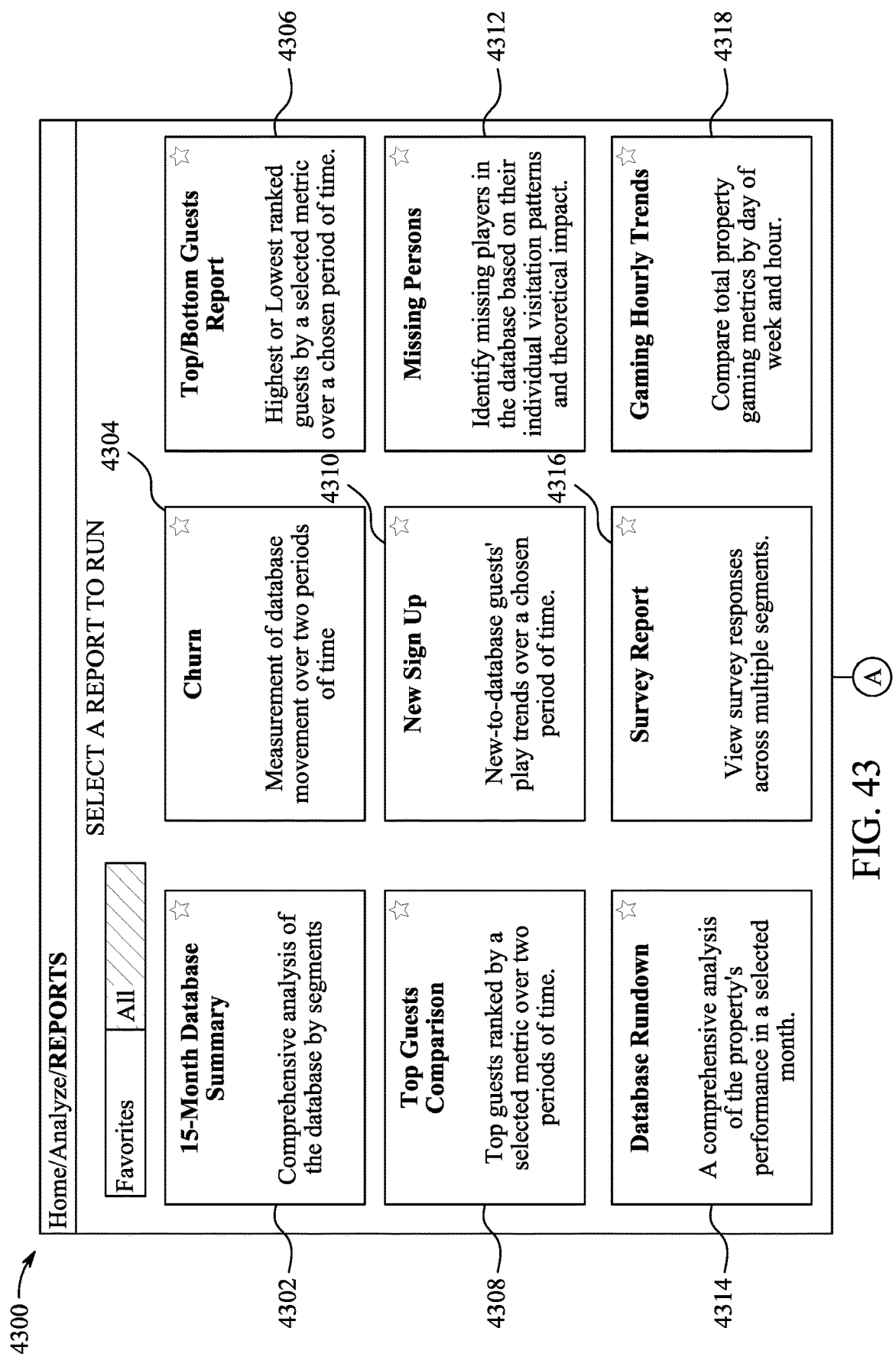
FIG. 43 is an example user interface illustrating report management.
Figure 43:
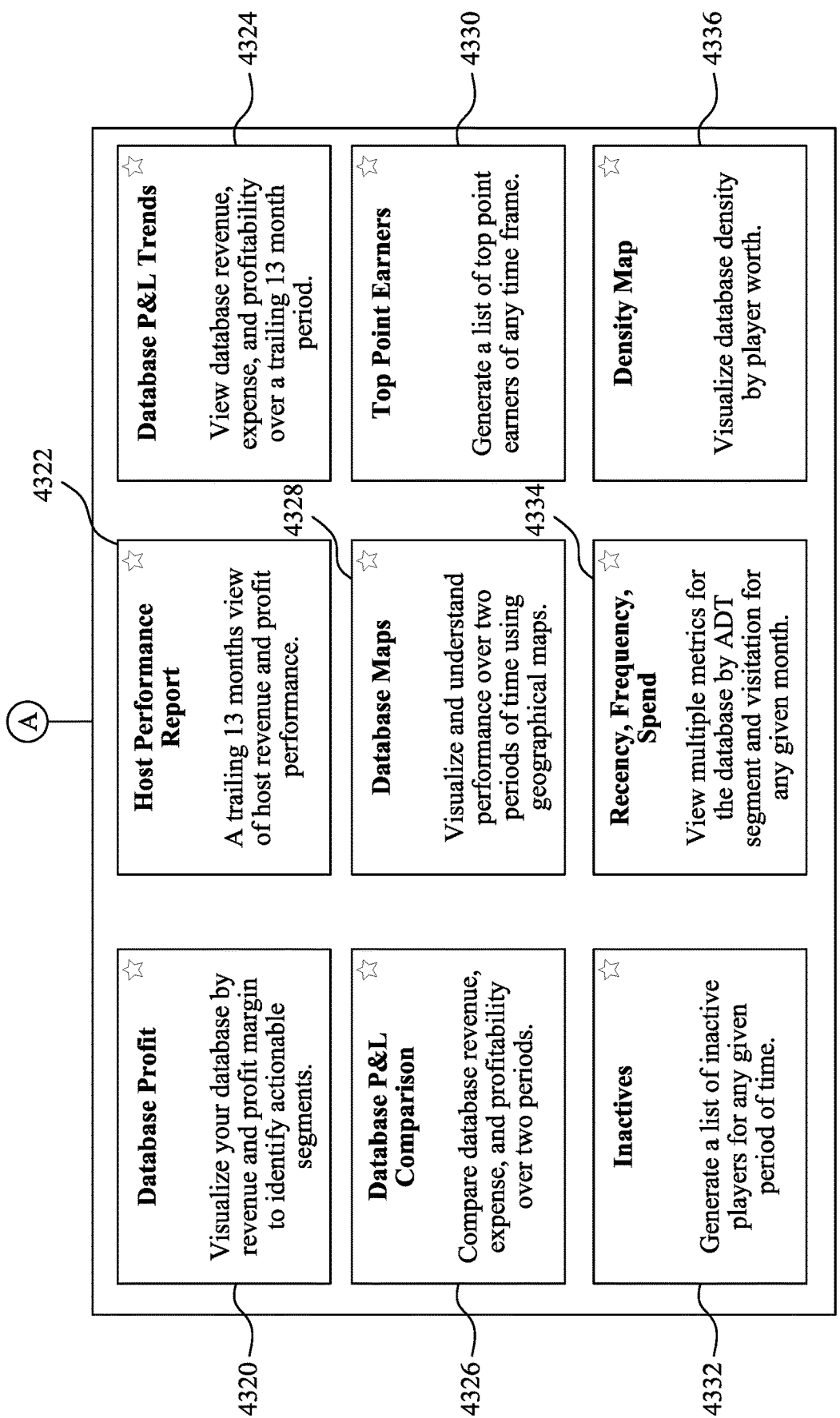

As discussed above with respect to FIG. 1, the software foundation and backend 102 may be configured to collect and organize data associated with the property. For example, the software foundation and backend 102 may be configured to collect and organize data stored in one or more property databases, such as the property database(s) 104. The property database(s) 104 may store data associated with any aspect of the service business, including but not limited to customer data, employee data, property data, financial data, or any other data associated with the operations of the service business. In an embodiment, the data collected by the software foundation and backend 102 may be used to generate a plurality of different reports. FIG. 43 illustrates an exemplary reporting dashboard 4300 that includes various different reports 4302-4336. Each of the plurality of reports may provide a user of the platform 100 with information about the service business, such as information about the property, its guests, its finances, etc. Each of the plurality of reports may be available to all users of the platform 100.

The 15-month database report 4302 provides a comprehensive analysis of the database by segments. The report 4302 provides a view of the service business by segmentation and by different metrics across the previous 15 months, along with various functional filters. The report 4302 provides a user with a visualization of the data and allows the user to dive deeper and see details about individual guests. The report 4302 may be run for full months in the previous 15 months, or partial months. For example, a user may run the report 4302 for the first three days of each month. The user may want to do this if it is March 3, and the user wants an apples-to-apples comparison of the March performance to other months' performances.

The 15-month database report 4302 may be a comparative analysis tool that allows data associated with a player to be compared to the most relevant prior data. For a property that has local players that return over and over, a daily year to year comparative analysis might be appropriate (i.e., Sunday of x/x/2020 compared to y/y/2021). If the property is also a tourist destination, then the players might return at irregular trips, in which case it may be more appropriate to compare prior trips of the same type or purpose to the present trip, such as a golf tournament players attended in prior years to a present golf tournament. Special events might also form the basis for comparison. For example, if a resort has a special event each year that players attend, but the dates of that event change from year to year, then the comparison may change accordingly.

The report 4302 provides the user with a better understanding of where their business stands by segment, and not just by total. Accordingly, the user may be proactive about changing the direction of a poorly performing month. The report 4302 is flexible. The user may be able to view all of the key metrics and segment in a variety of different ways. The segmentations may include, for example, slot ADW, table ADW, total ADW, slot ADT, table ADT, frequency, market, age, gender, card status, cumulative total theo, cumulative actual win, actual profit, theo profit, guest preferences, and/or guest traits. You can view new-sign ups only to understand the impact of a marketing campaign. For example, viewing the profit associated with only new guests provides a user with an understanding of the impact of marketing campaigns that may have generated the new guests.

The churn report 4304 provides a measurement of database movement over two periods of time. The churn report 4304 is a visualization of data over a longer period of time. The churn report 4304 may be viewed for a 3, 6, 9, or 12-month chunk. The churn report 4304 reveals how the service business is doing overall. For example, the churn report 4304 may indicate whether people are signing up and/or reactivating at a faster rate than they are declining and/or going inactive. The user may select a time frame for the report, the month that the time frame should begin, and how the data should be segmented. The segmentations may include, for example, slot ADW, table ADW, total ADW, slot ADT, table ADT, frequency, market, age, gender, card status, cumulative total theo, cumulative actual win, actual profit, theo profit, guest preferences, and/or guest traits. For example, a user may select the time frame to be 12 months and may select a actual profit segmentation to see how actual profit has changed over past 12 months, and which guests that profit change may be attributed to. Upon identifying these guests, the user may then drill into the profile(s) associated with those guest(s) and/or take an action (e.g. text, call, email) with respect to those guest(s).

The top/bottom guest report 4306 provides an overview of who the best or most profitable guests are by a selected metric over a chosen period of time. Report 4306 also provides an overview of the lowest ranking and/or least profitable guests are by a selected metric over a chosen period of time. For example, when running the top/bottom guest report 4306, the operator may decide how many guests should be analyzed and may select a time frame. For example, the operator may select the time frame as yesterday if the operator wants to see yesterday's guests that impacted the service business. The top/bottom guest report 4306 provides a last contact date for each guest in the last. If the operator sees that a top ranked (e.g. highly profitable) guest has never been contacted and/or hosted, the operator may remedy this issue. The top/bottom guest report 4306 is multi-ranking, in that the operator may rank guests on up to four metrics in one report. For example, the operator may rank guests on all of theo profit, total theo, actual profit, and total actual in a single report. This may be useful to see, because a guest may be the property's best theo player but not the best actual player. Some properties may care more about actual, while other properties may care more about theo.

The top guests comparison report 4308 provides a list of the top guests ranked by a selected metric over two periods of time. The top guests report 4308 provides an overview of the best players (e.g., the most profitable players) in a selected time period, such as a current time period, a previous time period, etc. The top guests comparison report 4308 provides the operator with insight into which guests the property be spending most of their time on. The operator may rank on evaluation, comparison, or both. If the operator ranks on both, this ranking may allow the operator to understand how the top 100 players has changed over time. For example, the operator may be able to see the top 100 players in last 30 days and the top 100 players for the same days in the prior year. The operator may be able to determine how different guest's rankings have changed. For example, the operator may be able to see that a top player this year had no play in the previous year. As another example, the operator may be able to see that a highly ranked player in the previous year is ranked much lower this year. For those players that used to be ranked high, but now are ranked low, the operator may be able to see the last time these players were contacted and/or if these players are hosted and may contact these players again. The operator may also ensure that the new top players are being treated well. The operator may navigate through various metrics and/or filter for specific markets and/or specific hosts.

The new sign up report 4310 provides a new-to-database guests' play and trends over a chosen period of time. The new sign up report 4310 allows an operator to understand the new sign-ups in total in the current 12-month period compared to the previous 12-month period. The new sign up report 4310 allows an operator to see new sign ups with play, new sign ups with email, and/or new sign ups with phone. The new sign up report 4310 provides insight into how effective the team has been over time at capturing new sign ups in general, how many new signs up are actually playing, and/or how successful the team is at getting phone numbers and email addresses for new sign ups. This information may be an indicator of how successful the property's acquisition campaigns are. The operator may filter for month and/or year and may look at new sign ups by month and/or day. The new sign up report 4310 allows the operator to hold team members accountable to getting important sign up information. For example, the new sign up report 4310 allows the operator to easily determine how many sign ups happened today, which team member is responsible for those sign ups, and whether that team member got an email address and/or phone number.

The missing persons report 4312 identifies missing players in the database based on their individual visitation patterns and theoretical impact. The missing persons report 4312 allows the operator to understand, based on the guests' own visitation patterns and frequency, which guests have gone missing, how many days they are overdue, and/or the estimated revenue impact on the property of those missed visits. While traditional approaches to identify missing persons treat all guests the same, the missing persons report 4312 looks individually at each guest in the database and flags them as missing so that the hosts can ensure that they are paying attention to good (e.g. profitable) players that have gone missing.

The database rundown report 4314 is a comprehensive analysis of the property's performance in a selected month. The database rundown report 4314 is a one stop shop for all of the key performance indicators (KPIs) in the service business from a marketing perspective. The database rundown report 4314 may be the first report an operator runs to see how the property performed last month compared to last year or month over month. The database rundown report 4314 provides a breakdown of how the property performed by tier and/or by market. The operator may look at cumulative trends and/or daily averages, and may look at graphs and/or charts that provide a visualization of the long term trends for various metrics, such as slot coin-in, table drop, slot theo or actual, table theo or actual, rated theo profit, and/or actual theo profit. The database rundown report 4314 is a robust report that takes the best of all of the other reports and puts it in a single page.

The survey report 4316 allows an operator to view survey responses across multiple segments. Traditionally, surveys and/or data related to surveys are located in another system, and the operations system has to log into this other system in order to see the surveys being taken. In other words, survey data is traditionally completely disconnected from data associated with the value of a guest or a player. The survey report 4316 connects survey information with the actual guests or players so that the operator can see determine the best players with the lowest survey scores. From there, the operator may focus his or her time and attention on the most meaningful players with low survey scores. The survey report 4316 is a prioritization tool and efficiency tool for the team.

The gaming hourly trends report 4318 compares total property gaming metrics by day of week and/or hour. The gaming hourly trends report 4318 allows the operator to select an evaluation metric (such as slot coin, slot theo, slot win, table drop, table theo, table win, jackpots, and/or free slot play), pick a time frame for the evaluation, and compare that time frame to a prior year (same days of last year) or a prior period. The operator may choose how he or she wants the metric to be compared. For example, the operator may want the selected metric to be compared to the same metric for a different time frame, or a different metric entirely. For example, slot coin could be compared to slot win.

The database profit report 4320 provides a visualization of the database by revenue and profit margin to identify actionable segments. The database profit report 4320 creates dynamic segmentation based on the percentile of worth of the guest to the property and based on profit margin. The operator may use the database profit report 4320 to quickly identify the best players (e.g., those players that have zero reinvestment and/or cost the property no money except for gaming tax). The operator may use the database profit report 4320 to view high-worth highly profitable players, low-worth highly profitable players, and/or low profitable players (e.g., players that the property is losing money on). The property may be losing the most money on high-value low profit players because they generate a lot of theo, but not much actual profit. The operator may use the database profit report 4320 to view the revenue and/or expense that each guest or player has generated. The operator may use the database profit report 4320 to find guest or players that are getting more free play than they are spending.

The host performance report 4322 provides a trailing 13 months view of host revenue and profit performance. The host performance report 4322 allows the operator to look at a host team as a whole, or to look at individual hosts. The host performance report 4322 trends out the host team and/or individual host's performance over a 13-month period. The host performance report 4322 gives the operator a month over month, year over year, view of the host team and/or individual host's performance. The operator may compare hosted players to unhosted players to identify whether hosted business is outperforming or underperforming relative to the natural trend of the database. The operator may view historical host performance in additional to or as an alternative to current host performance.

The database P&L trends report 4324 provides an overview of database revenue, expense, and/or profitability over a trailing 13-month period. The database P&L trends report 4324 may look a lot like the host performance report 4322. The database P&L trends report 4324 provides a full view of all of the rated revenue and expense that comes through a property, trended over time. The operator may use the database P&L trends report 4324 to get a good view of the property's overall profitability performance from a database perspective. The operator may use the database P&L trends report 4324 to identify the best and/or worst performing months. For example, this database P&L trends report 4324 may be used for budgeting purposes, marketing planning, and/or to identify weak points in the previous year in order to improve the current year. The database P&L comparison report 4326 is another view of the database P&L trends report 4324 that allows the operator to compare database revenue, expense, and/or profitability over two different periods of time.

The database maps report 4328 allows an operator to visualize and understand the performance over two periods of time using a geographical map. The database maps report 4328 allows the operator to visualize different metrics across, for example, the United States. The operator may look at a state level, a specific county level, and/or at postal codes. The operator may pick a particular radius (such as in miles). For example, the operator may want to look at how many players or guests were located within a 30-mile radius within the last 90 days at the zip code level. The operator may be able to switch to variance and/or variance percentage to see which geographic areas are experiencing a growth or decline in guests or players. By doing so, areas where the property is losing business may be required more attention. For example, campaigns may be targeted to these areas.

The top point earners report 4330 may generate a list of top point earners for any time frame. An operator may run the top earner report 4330 and specify which days the report should include. When running the top point earners report 4330, the operator may select base points and/or total points and may select which tiers to include in the report. The report will generate a list of players that are top point earners. The list may be helpful for properties that are running points challenges and/or properties that need to post point earnings. Traditionally, this type of list may only be generated manually via a time and/or labor-intensive process. Instead of relying on a data analyst to generate this list, the operator may easily generate it themselves.

The inactives report 4332 may generate a list of inactive players for any given period of time. The inactives report 4332 is a query that allows an operator to pull out inactive players or guests. The operator may select an "active" period (a period during which a guest had play), an "inactive" period (a period during which a guest did not have play), and a metric. The metric may include, for example, slot theo, total theo, total actual win, theo profit, actual profit, coin in, slot theo, slot actual, free slot play, table drop, table theo, and/or table win. The operator may select if it the report is cumulative or average. The inactives report 4332 may generate a list of people that went inactive during the specified inactive period but had play during the specified active period. The inactives report 4332 allows the operator to identify these guests and execute a campaign with respect to them. For example, these guests may be invited back, given hotel rooms, given a comp, etc.

The recency, frequency, and spend (RFS) report 4334 provides a view of multiple metrics for the database by ADT segment and visitation for any given month. The RFS report 4334 provides a view of the database based on visitation and ADT and may allow an operator to see how many visits guests or players have and what each guest or player's daily contribution to the property is. The density map report 4336 provides a visualization of database density by player worth. The operator may pick any time frame or metric. The operator may set minimums to exclude sections of the database that are not meaningful. For example, the operator may set a minimum player ADT and may be able to see, on a map, where these guests or players live, right down to the zip code.

Figure 44:
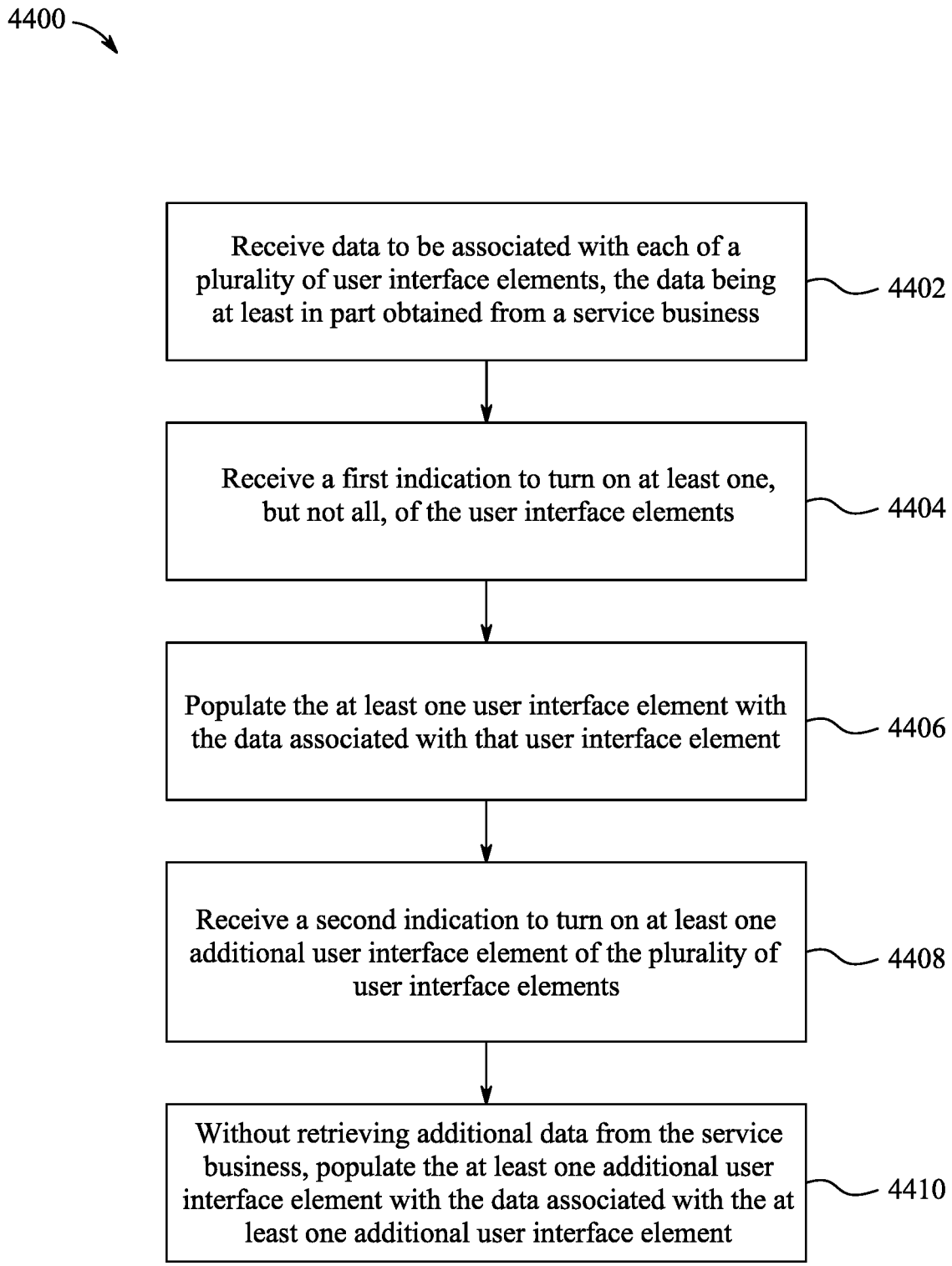
FIG. 44 is an example flow chart of a method for managing services at a property.

FIG. 44 depicts an exemplary method 4400 for managing services at one or more properties. The method 4400 may be performed by a party other than the service business. For example, the method 4400 may be performed by the software foundation and backend 102 of the platform 100 described above with respect to FIG. 1. The method 4400 may be performed in order to advance the data capabilities of a service business and/or to provide a service business with a better understanding of its customers and/or its operations. Accordingly, the performance of method 4400 improves upon the operation of the service business's one or more properties.

As described above, the software foundation and backend 102 may be configured to collect and organize data associated with the one or more properties. At 4400, data associated with each of a plurality of user interface elements may be retrieved. The data may be retrieved, for example, from at least one database. For example, the software foundation and backend 102 may be configured to collect and organize data stored in one or more property databases, such as the property database(s) 104. The property database(s) 104 may store data associated with any aspect of the service business, including but not limited to customer data, employee data, property data, financial data, or any other data associated with the operations of the service business.

The plurality of user interface elements may include those user interface elements described above with respect to FIGS. 5-42. For example, the plurality of user interface elements may include a dynamic floor monitoring element, such as that described above with respect to FIGS. 5-8, configured to provide an overview of assets that are located on a property associated with the service business. The plurality of user interface elements may include an action management element, such as that described above with respect to FIGS. 9-11, that enables one or more actions to be taken with respect to one or more assets of the service business. The plurality of user interface elements may include an asset profile management element, such as that described above with respect to FIGS. 12-27, that enables profiles associated with guests or devices of the service business to be managed. The plurality of user interface elements may include a comp management element, such as that described above with respect to FIGS. 28-33, that indicates available comps for guests of the service business and that enables discretionary comping. The plurality of user interface elements may include a coding management element, such as that described above with respect to FIGS. 34-35.

The plurality of user interface elements may include a player development element, such as that described above with respect to FIGS. 36-37. The plurality of user interface elements may include a list management element, such as that described above with respect to FIGS. 38-39. The plurality of user interface elements may include a task management element, such as that described above with respect to FIGS. 40-42. The plurality of user interface elements may include a report management element, such as that described above with respect to FIG. 43.

The plurality of user interface elements may include any other user interface elements that may provide a service business with a better understanding of its assets and/or its operations. For example, if the service business is a casino, the plurality of user interface elements may include a slot element, a marketing element, a reports element, or a food and beverage element. As another example, the plurality of user interface elements may include a sports book element, a hotel reservations element, an on-line element, or an AI-based recommendation engine associated with at least one of player development, slots, and/or marketing.

A user, such as a user of the platform 100, may want to utilize only a portion of the available UI elements of the plurality of UI elements. For example, the user may only find a portion of the available UI elements to be helpful or relevant to the user's particular service business and/or the user may only want to pay for those UI elements that are most helpful or relevant. Alternatively, the user may to utilize all of the available UI elements in the plurality of UI elements. The UI elements of the plurality of available UI elements that the user wants to utilize may be "turned on." Those UI elements that the user chooses not to utilize may not be turned on (e.g. they may remain "turned off").

At 4404, a first indication to turn on a first subset of the plurality of user interface elements may be received. The first subset of the plurality of user interface elements may include those UI elements that the user chooses to utilize. In an embodiment, certain UI elements of the plurality will always be turned on. These UI elements that are always turned on may include those UI elements that are necessary for the platform 100 to facilitate basic service management at a property. For example, if the property is a casino, the certain UI elements that are always turned on may include a player development element, a slot element, a marketing element, and/or a food and beverage element. These UI elements are those that casinos typically utilize in order to manage services at their properties. The first subset of the plurality of user interface elements may include these basic UI elements that are always turned on. Alternatively, or additionally, the first subset of the plurality of user interface elements may include UI elements of the plurality of UI elements that the user selected.

The software foundation and backend 102 may organize the collected data associated with each of the UI elements and use it to populate those UI elements that have been turned on. At 4406, each of the first subset of user interface elements may be populated with the respective data associated with that user interface element. For example, if the player development UI element is part of the first subset of user interface elements, then the player development UI may be populated with any collected customer data, employee data, property data, financial data, or any other data associated with the operations of the service business that is associated with player development. As another example, if the comp management element is part of the first subset of user interface elements, then the comp management UI may be populated with any collected customer data, employee data, property data, financial data, or any other data associated with the operations of the service business that is associated with comp management.

In other words, as previously discussed, when platform 100 is first implemented at a service business, some, but not all of the user interface elements may be turned on. However, the data necessary to turn on and populate each of the remaining user interface elements that were not turned on has already been retrieved from the service business being supported, such that the new user interface elements may be immediately made available to the service business for use, and without having to obtain new data from the service business, simply by selecting a different UI element within the software foundation and backend 102 that turns on (or off) the user interface element.

Additional user interface elements may thus be turned on, such as at a later time. For example, a user may later decide that a particular additional user interface element would be helpful or relevant to the user's service business. Alternatively, or additionally, some of the user interface elements turned on (such as those in the first subset), may be later turned off. For example, a user may want to turn off a user interface element that was previously turned on but turned out to not be helpful or relevant to the user's service business. These additional user interface elements may quickly and/or easily be turned on because the software foundation and backend 102 has already collected all of the necessary data from the service business in order to be able to turn on any of the plurality of user interface elements. Accordingly, when an additional user interface element is turned on (such as in response to a user request to turn on an additional user interface element), the software foundation and backend 102 already has the necessary data on hand to populate this additional user interface element—no additional data may need to be collected from the service business, at least in order to make the additional user interface element functional.

At 4408, a second indication to turn on at least one additional user interface element of the plurality of user interface elements may be received. The at least one additional user interface element may be one that was not included in the first subset. For example, the at least one additional user interface element may be one that is not always turned (e.g. the at least one additional user interface element may be an optional user interface element). The at least one additional user interface element may additionally, or alternatively, be a user interface element that the user did not initially want or need but has later decided to turn on.

As the data associated with each of a plurality of user interface elements has already been retrieved, the data associated with the at least one additional user interface element has already been retrieved, for example, from at least one database, such as the property database(s) 104. The software foundation and backend 102 may organize the collected data associated with the at least one additional UI element and use it to populate the at least one additional UI elements. At 4410, the at least one additional user interface elements may be populated with the respective data associated with the at least one additional user interface element. For example, if the at least one additional user interface element includes the action management element, then the action management element may be populated with any collected customer data, employee data, property data, financial data, or any other data associated with the operations of the service business that is associated with action management element. The at least one additional user interface element may be populated when the indication to turn on the at least one additional user interface element is received, without any additional data being retrieved by the software foundation and backend 102. In this way, user interface element may easily be turned on or off according to the user's preferences.

In addition to collecting and organizing the data associated with the property, such as for population of the user interface elements, the software foundation and backend 102 may have structure supporting additional functionality. For example, the software foundation and backend 102 may also include code sufficient to analyze the data collected from the property database(s) 104. For example, if the service business is a casino, the software foundation and backend 102 may analyze the data collected from the property database(s) 104 to create criteria that is used to determine a number of things, such as who is recognized as a VIP, when comps are to be given and how much, etc.

Figure 45:
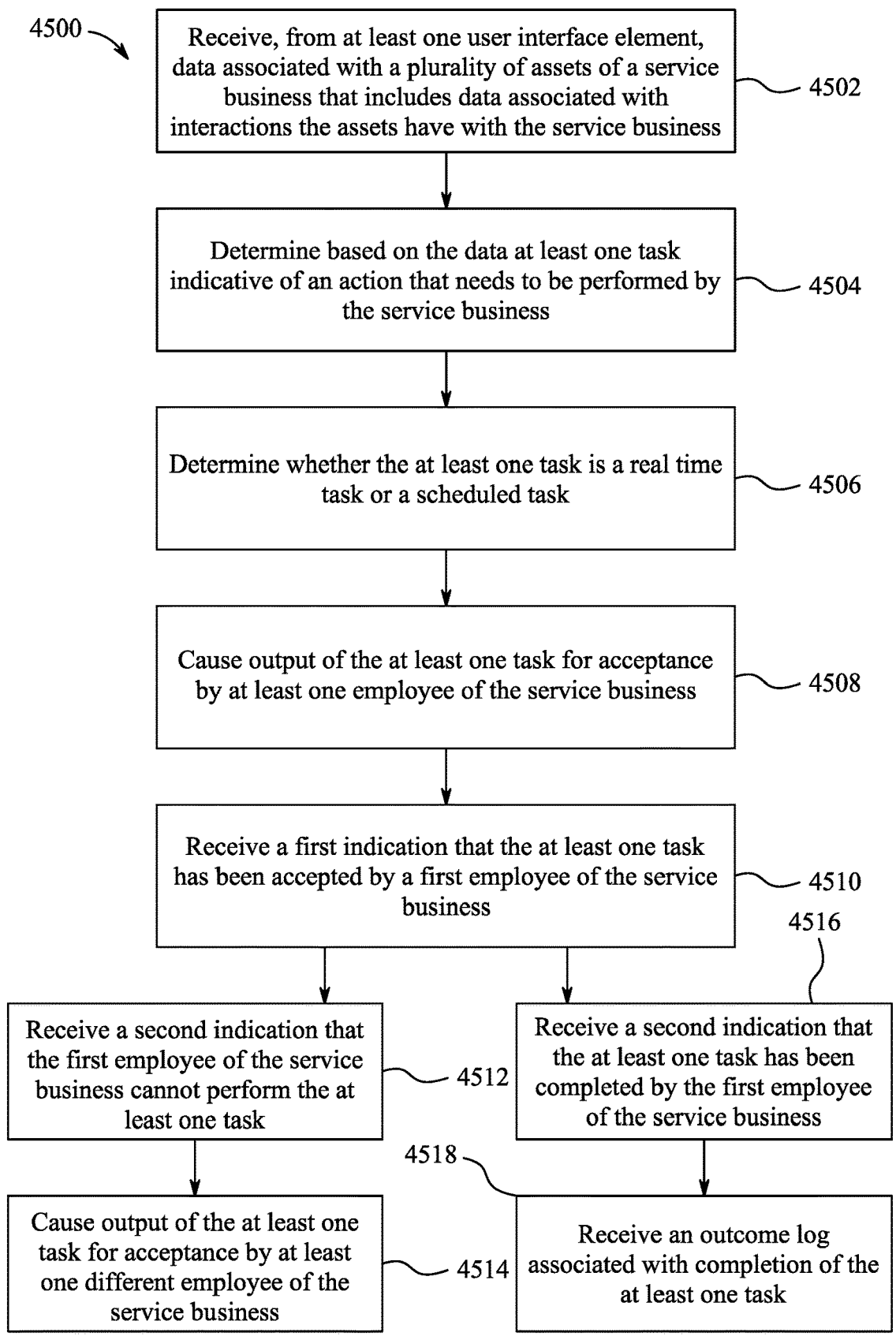
FIG. 45 is an example flow chart of a method for managing services at a property.

FIG. 45 depicts an exemplary method 4500 for task management at one or more properties associated with a service business. The method 4500 may be performed, for example, by the software foundation and backend 102 of the platform 100 described above with respect to FIG. 1. The method 4500 may be performed in order to enable an operator to manage tasks that need to be completed by the service business. The tasks may indicate actions that need to be taken with respect to an asset of the service business. For example, the tasks may include tasks that a host and/or a team member needs to complete. Accordingly, the performance of method 4500 may facilitate better management of the service business's property.

At 4502, data associated with a service business may be received. For example, the data associated with the service business may be received from at least one user interface element. The at least one user interface element may, for example, be populated with the data associated with the service business. In an embodiment, the at least one user interface element may be populated with the data associated with a plurality of guests of the service business that includes data associated with the interactions of the guests with the service business according to the method 4400 described above with regard to FIG. 44.

The at least one user interface element may include any of the user interface elements described above with respect to FIGS. 5-42. For example, the plurality of user interface elements may include a dynamic floor monitoring element, such as that described above with respect to FIGS. 5-8, an action management element, such as that described above with respect to FIGS. 9-11, an asset profile management element, such as that described above with respect to FIGS. 12-27, a comp management element, such as that described above with respect to FIGS. 28-33, a coding management element, such as that described above with respect to FIGS. 34-35, a player development element, such as that described above with respect to FIGS. 36-37, a list management element, such as that described above with respect to FIGS. 38-39, and/or any other user interface element that may provide a service business with a better understanding of its customers and/or its operations. For example, if the service business is a casino, the plurality of user interface elements may include a slot element, a marketing element, a reports element, or a food and beverage element. As another example, the plurality of user interface elements may include a sports book element, a hotel reservations element, an on-line element, or an AI-based recommendation engine associated with at least one of player development, slots, and/or marketing.

The data associated with the service business may be used to determine at least one task that needs to be completed by the service business. At 4504, at least one task indicative of an action that needs to be performed may be determined. For example, the at least one task may be determined and/or generated manually (e.g., by an operator, manager, and/or team member), based on parameters, and/or by an artificial intelligence (AI) based recommendation engine.

If the at least one task is generated manually, such as by an operator, the at least one task may be generated at least in part using the exemplary task creation dashboard 4100 described above with respect to FIG. 41. The task creation dashboard 4100 may prompt the user that is creating the task to add a title for the task, such as "greet a hot player." The task creation dashboard 4100 may additionally prompt the user that is creating the task to add a location associated with the task. For example, if the task is to greet a hot player on the casino floor, the user creating the task may add the machine that the hot player is at. If the at least one task is determined based on defined parameters, the service business may help to define these parameters. If the at least one task is determined by an AI-based recommendation engine, the AI-based recommendation engine may determine, using the data associated with the service business, at least one task that needs to be performed.

At 4506, it may be determined whether the at least one task is a real-time task or a scheduled task. If the tasks are autogenerated (such as based on parameters or by an AI-based recommendation engine), they may be automatically sorted into a bucket based on type of task (e.g., real-time or scheduled). If the tasks are manually generated, they may be manually sorted into a bucket based on type of task (e.g., real-time or scheduled). Real time tasks are those tasks that require immediate action. For example, a real time task may be greeting an important guest on the property, such as a hot player on the casino floor. As another example, a real time task may be servicing a device that is malfunctioning, such as a bill validator that is having an error. Conversely, scheduled tasks are those tasks that do not necessarily require immediate action. Rather, a scheduled task may be completed at a later time, and its completion is not as urgent as the completion of a real time task. For example, a scheduled task may include tasks such as identifying actionable players or devices that require attention.

Once a task is created, anyone that has the right permissions for that type of task (or has permission for tasks in general) will get a notification of the task. At 4508, output of the at least one task may be caused. To identify individuals to send task notifications to, users that are on network may be identified, users that are on network with a MAC address may be identified, users that are off network with a MAC address may be identified, and/geo-fencing with mobile devices may be utilized. Causing outputting of the at least one task may enable at least one employee of the service business to accept the task. For example, causing outputting of the at least one task may enable at least one individual that has been sent a notification of the task to accept the task.

Output of the at least one task may be caused, for example, by outputting the at least one task via a user interface element (e.g., any of the user interface elements from which data associated with the service business may be received). If output of the at least one task is caused by outputting the at least one task via a user interface element, the at least one task may be output via the user interface element along with a tag that identifies the task. The tag may be an interactive tag that enables an employee to perform the action associated with the task directly from the at least one user interface element. For example, the tag may be similar to one or more of the tags 510 described above with respect to FIG. 5.

A tag associated with a comp, for example, may cause a comp screen to be generated where information about the player, such as the amount of points they have, whether any comps are in the queue and what those comps are, and/or what comps are available. The host may enter a comp amount and the system may generate a prompt to enter the comp in a CMS within a fixed time period. If the comp exceeds criteria, an exception prompt may be generated so the reasoning behind it may be provided. As another example, a tag associated with a host contacting a player, such as a player that has been absent or that no one has contacted during a period, may provide the host with the ability to call, text or email the player directly from within the system. If the contact is generic (i.e., not specific to a player), the host can select multiple players at the same time and be prompted with a screen that enables the same message to be sent to each selected player.

The first person to accept the task may be the person that the task gets assigned to. At 4510, a first indication that the at least one task has been accepted by a first employee of the service business may be received. The at least one task may be assigned to the first employee of the service business. Other individuals that have received the notification of the task, such as other employees of the service business, may no longer be able to accept the task after the first employee accepts the task. Once the first employee has accepted the task, he or she may go complete the task. For example, if the task was to greet a hot player on the casino floor, the individual that accepted the task may go greet the hot player on the casino floor.

If an individual accepts a task but then is no longer able to complete the task, the individual may be able to dismiss the task. At 4512, a second indication that the first employee of the service business cannot perform the at least one task may be received. To dismiss the at least one task, the first employee may be able to use, for example, the task dismissal dashboard 4104 discussed above with respect to FIG. 41. The first employee may explain why he or she needs to dismiss the at least one task and may leave any additional notes that the first employee finds to be necessary or helpful. For example, if the first employee accepted the at least one task and then gets pulled into a meeting and can no longer complete the task, the first employee can use the task dismissal dashboard 4104 to dismiss the at least one task. When the first employee dismisses the at least one task, the at least one task may become reopened for someone else to accept. At 4514, output of the at least one task may be caused again. Causing outputting of the at least one task again may enable at least one different employee of the service business to accept the task. For example, another notification may be sent to those eligible to accept the at least one task, and a new individual, such as a different employee may accept the at least one task.

Alternatively, the first employee may complete the task instead of dismissing it. At 4516, a second indication that the at least one task has been completed by the first employee of the service business may be received. The individual may complete the task and log the outcome of the task. At 4518, an outcome log associated with completion of the at least one task may be received. The outcome log may be received, for example, from the first employee that completed the task. FIG. 41, discussed above, illustrates an exemplary outcome log 4102 for task management.

The first employee may use the outcome log to log the outcome of the task as either actionable or non-actionable. For, example, an outcome of the task to greet a hot player may be logged as nonactionable if that hot player was a known player that is not interested in playing with a card (so a player's card was not issued), if the hot player was no longer at the identified location, or any other reason that action did not need to be taken with respect to the task. An outcome of the task may be logged as actionable if the first employee took some action with respect to that task. For example, the outcome of the task to greet a hot player may be logged as actionable of the first employee signed the hot player up for a player's card. The first employee that is completing the outcome log may leave notes associated with the outcome of the task.

Figure 46:
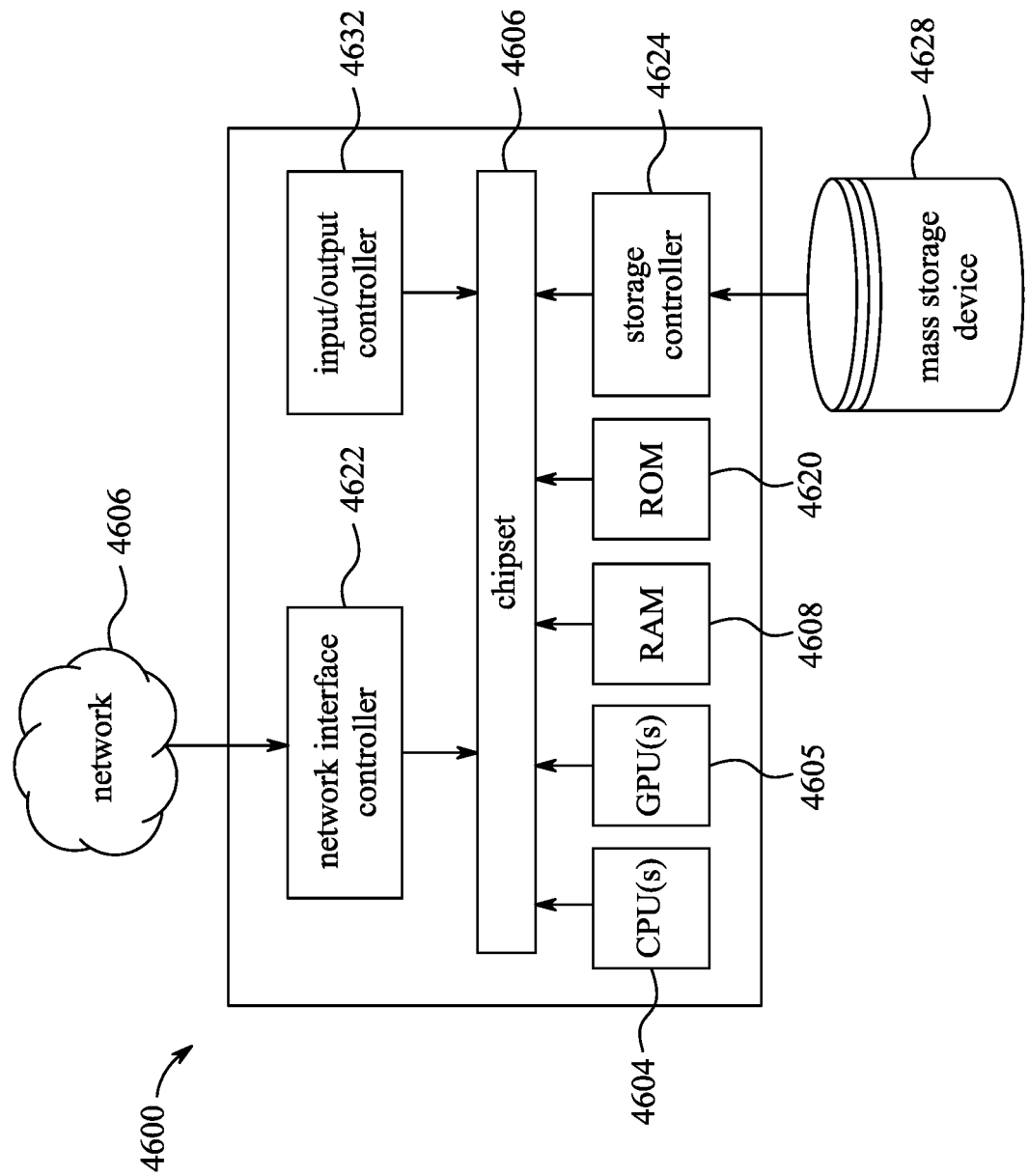
FIG. 46 is a block diagram of an example device.

FIG. 46 depicts an example computing device 4600 that may represent any of the various devices or entities illustrated in FIG. 1-4, including, for example, the devices 102a, 102b, the gateway 104, the hub 108, the server/router 110, and the edge router 112. That is, the computing device 4600 shown in FIG. 46 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the methods described above with respect to FIGS. 44-45 and/or the systems of FIGS. 1-4.

The computing device 4600 may include a baseboard, or "motherboard," which is a printed circuit board to which a multitude of components or devices may be connected by way of a system bus or other electrical communication paths. One or more central processing units (CPUs or "processors") 4604 may operate in conjunction with a chipset 4606. The CPU(s) 4604 may be standard programmable processors that perform arithmetic and logical operations necessary for the operation of the computing device 4600.

The CPU(s) 4604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 4604 may be augmented with or replaced by other processing units, such as GPU(s) 4605. The GPU(s) 4605 may comprise processing units specialized for but not necessarily limited to highly parallel computations, such as graphics and other visualization-related processing.

A chipset 4606 may provide an interface between the CPU(s) 4604 and the remainder of the components and devices on the baseboard. The chipset 4606 may provide an interface to a random access memory (RAM) 4608 used as the main memory in the computing device 4600. The chipset 4606 may provide an interface to a computer-readable storage medium, such as a read-only memory (ROM) 4620 or non-volatile RAM (NVRAM) (not shown), for storing basic routines that may help to start up the computing device 4600 and to transfer information between the various components and devices. ROM 4620 or NVRAM may also store other software components necessary for the operation of the computing device 4600 in accordance with the aspects described herein.

The computing device 4600 may operate in a networked environment using logical connections to remote computing nodes and computer systems of the platform 100. The chipset 4606 may include functionality for providing network connectivity through a network interface controller (NIC) 1122. A NIC 4622 may be capable of connecting the computing device 4600 to other computing nodes over the platform 100. It should be appreciated that multiple NICs 4622 may be present in the computing device 4600, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the platform 100. For example, the NIC 4622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 4600 may be connected to a mass storage device 4628 that provides non-volatile storage (i.e., memory) for the computer. The mass storage device 4628 may store system programs, application programs, other program modules, and data, which have been described in greater detail herein. The mass storage device 4628 may be connected to the computing device 4600 through a storage controller 4624 connected to the chipset 4606. The mass storage device 4628 may consist of one or more physical storage units. A storage controller 4624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 4600 may store data on a mass storage device 4628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 4628 is characterized as primary or secondary storage and the like.

For example, the computing device 4600 may store information to the mass storage device 4628 by issuing instructions through a storage controller 4624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 4600 may read information from the mass storage device 4628 by detecting the physical states or characteristics of one or more particular locations within the physical storage units.

In addition to the mass storage device 4628 described herein, the computing device 4600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 4600.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 4628 depicted in FIG. 46, may store an operating system utilized to control the operation of the computing device 4600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 4628 may store other system or application programs and data utilized by the computing device 4600.

The mass storage device 4628 or other computer-readable storage media may also be encoded with computer-executable instructions, which, when loaded into the computing device 4600, transforms the computing device from a general-purpose computing system into a special-purpose computer capable of implementing the aspects described herein. These computer-executable instructions transform the computing device 4600 by specifying how the CPU(s) 4604 transition between states, as described herein.

A computing device, such as the computing device 4600 depicted in FIG. 46, may also include an input/output controller 4632 for receiving and processing input from a number of input devices, such as a keyboard, a mouse, a touchpad, a touch screen, an electronic stylus, or other type of input device. Similarly, an input/output controller 4632 may provide output to a display, such as a computer monitor, a flat-panel display, a digital projector, a printer, a plotter, or other type of output device. It will be appreciated that the computing device 4600 may not include all of the components shown in FIG. 46, may include other components that are not explicitly shown in FIG. 46, or may utilize an architecture completely different than that shown in FIG. 46.

As described herein, a computing device may be a physical computing device, such as the computing device 4600 of FIG. 46. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system comprising:
   at least one database associated with a service business;
   a plurality of user interface elements, wherein the plurality of user interface elements comprises:
     a coding management software element that enables a prospect code or an active code to be requested for a customer of the service business that does not have a host, wherein the prospect code indicates that the service business is seeking to establish a relationship with the customer and wherein the active code indicates that the service business has a relationship with the customer; and
     a comp management software element that issues a comp to a guest account, assigned either the prospect code or the active code, when a value of the comp is less than or equal to a maximum comp value associated with the guest account and generates a notification indicating that a manual override is required to issue the comp when the value is greater than the maximum comp value; and
   at least one computing device in communication with the at least one database and the plurality of user interface elements, the at least one computing device configured to:
   receive, from the at least one database, data associated with each of the plurality of user interface elements;
   receive, from a client device associated with the service business, a first indication to turn on at least one user interface element, but not all of the user interface elements among the plurality of user interface elements, the client device located remote to the at least one computing device; and populate the at least one user interface element with the respective data associated with the at least one user interface element.

2. The system of claim 1, wherein the at least one computing device is further configured to:

receive a second indication to turn on at least one additional user interface element of the plurality of user interface elements; and without retrieving additional data from the at least one database, populate the at least one additional user interface element with the data associated with the at least one additional user interface element.

3. The system of claim 1, wherein the plurality of user interface elements comprises a dynamic floor monitoring software element configured to provide an overview of assets that are located on at least one property associated with the service business.

4. The system of claim 1, wherein the plurality of user interface elements comprises an action management software element that enables one or more actions to be taken with respect to one or more assets of the service business.

5. The system of claim 4, wherein the one or more actions include at least one of the initiation of a text message, the initiation of a phone call, or the initiation of an email to a guest.

6. The system of claim 1, wherein the plurality of user interface elements comprises an asset profile management software element that enables profiles associated with assets of the service business to be managed.

7. The system of claim 1, wherein the data stored in the at least one database associated with the service business is in disparate formats, the system further comprising:

a content management software system configured to ingest the data stored in the at least one database associated with the service business and convert the data stored in the at least one database associated with the service business into a single format.

8. The system of claim 7, wherein the at least one computing device is configured to receive, from the at least one database, data associated with each of the plurality of user interface elements at least in part by receiving the data that has been converted into the single format.

9. The system of claim 1, wherein the at least one computing device is further configured to:

determine criteria associated with operations of the service business using the data associated with each of the plurality of user interface elements.

10. The system of claim 9, wherein the criteria associated with the operations of the service business comprises at least one of:

criteria indicating which customers of the service business are VIP customers;

criteria indicating when comps should be given to customers; and criteria indicating a value of comps that should be given to customers.

11. The system of claim 1, wherein the plurality of user interface elements comprises at least one of a player development element, a slot element, a marketing element, a food and beverage element, a sports book element, a hotel reservations element, an on-line element, or an artificial intelligence based recommendation engine associated with player development, slots and marketing.

12. A method comprising:

receiving, from at least one database associated with a service business, data associated with a plurality of user interface elements, wherein the plurality of user interface elements comprises:

a coding management element that enables a prospect code or an active code to be requested for a customer of the service business that does not have a host, wherein the prospect code indicates that the service business is seeking to establish a relationship with the customer and wherein the active code indicates that the service business has a relationship with the customer; and a comp management software element that issues a comp to a guest account, assigned either the prospect code or the active code, when a value of the comp is less than or equal to a maximum comp value associated with the guest account and generates a notification indicating that a manual override is required to issue the comp when the value is greater than the maximum comp value;

receiving, via at least one computing device and from a client device associated with the service business, a first indication to turn on at least one user interface element, but not all of the user interface elements among the plurality of user interface elements, the client device located remote to the at least one computing device;

populating the at least one user interface element with the data associated the at least one user interface element;

receiving, from the client device associated with the service business and located remote to the at least one computing device, a second indication to turn on at least one additional user interface element of the plurality of user interface elements; and without retrieving additional data from the at least one database, populating the at least one additional user interface element with the data associated the at least one additional user interface element.

13. The method of claim 12, wherein the plurality of user interface elements comprises at least one of:

a dynamic floor monitoring software element configured to provide an overview of assets that are located on at least one property associated with the service business, an action management software element that enables one or more actions to be taken with respect to one or more assets of the service business, and an asset profile management software element that enables profiles associated with assets of the service business to be managed.

14. The method of claim 12, wherein receiving, from the at least one database associated with the service business, the data associated with the plurality of user interface elements comprises:

receiving, from a content management software system configured to ingest the data stored in the at least one database associated with the service business and convert the data stored in the at least one database associated with the service business into a single format, the data that has been converted into the single format.

15. The method of claim 12, further comprising:

determining criteria associated with operations of the service business using the data associated with each of the plurality of user interface elements.

16. The method of claim 15, wherein the criteria associated with the operations of the service business comprises at least one of:

criteria indicating which customers of the service business are VIP customers;

criteria indicating when comps should be given to customers; and criteria indicating a value of comps that should be given to customers.

17. A system comprising:

at least one database associated with a service business;

a plurality of user interface elements, wherein the plurality of user interface elements comprises:

a coding management software element that enables a prospect code or an active code to be requested for a customer of the service business that does not have a host, wherein the prospect code indicates that the service business is seeking to establish a relationship with the customer and wherein the active code indicates that the service business has a relationship with the customer; and a comp management software element that issues a comp to a guest account, assigned either the prospect code or the active code, when a value of the comp is less than or equal to a maximum comp value associated with the guest account and generates a notification indicating that a manual override is required to issue the comp when the value is greater than the maximum comp value; and at least one computing device in communication with the at least one database and the plurality of user interface elements, the at least one computing device configured to:

receive, from the at least one database, data associated with each of the plurality of user interface elements;

populate at least one user interface element, but not all of the user interface elements among the plurality of user interface elements with the data associated the at least one user interface element;

receive, from a client device associated with the service business, an indication to turn on at least one additional user interface element of the plurality of user interface elements, the client device located remote to the at least one computing device; and without retrieving additional data from the at least one database, populate the at least one additional user interface element with the data associated the at least one additional user interface element.

18. The system of claim 17, wherein the at least one additional user interface element comprises at least one of:

a dynamic floor monitoring software element configured to provide an overview of assets that are located on at least one property associated with the service business, an action management software element that enables one or more actions to be taken with respect to one or more assets of the service business, and an asset profile management software element that enables profiles associated with assets of the service business to be managed.

* * * * *